(12) United States Patent
Smits

(10) Patent No.: US 11,709,236 B2
(45) Date of Patent: *Jul. 25, 2023

(54) SYSTEMS AND METHODS FOR MACHINE PERCEPTION

(71) Applicant: Samsung Semiconductor, Inc., San Jose, CA (US)

(72) Inventor: Gerard Dirk Smits, Los Gatos, CA (US)

(73) Assignee: Samsung Semiconductor, Inc., San Jose, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/790,592

(22) Filed: Feb. 13, 2020

(65) Prior Publication Data

US 2021/0011154 A1 Jan. 14, 2021

Related U.S. Application Data

(63) Continuation of application No. 16/384,761, filed on Apr. 15, 2019, now Pat. No. 10,564,284, which is a
(Continued)

(51) Int. Cl.
*G01S 7/4863* (2020.01)
*G01S 17/42* (2006.01)
(Continued)

(52) U.S. Cl.
CPC ............ *G01S 7/4863* (2013.01); *G01S 7/484* (2013.01); *G01S 7/4868* (2013.01); *G01S 17/04* (2020.01);
(Continued)

(58) Field of Classification Search
CPC ...... G01S 7/4863; G01S 17/931; G01S 17/04; G01S 7/484; G01S 7/4868; G01S 17/42;
(Continued)

(56) References Cited

U.S. PATENT DOCUMENTS 4,019,262 A 4/1977 Breglia et al.
4,340,274 A 7/1982 Spooner
(Continued)

FOREIGN PATENT DOCUMENTS

CN 1633801 A 6/2005
CN 1902530 A 1/2007
(Continued)

OTHER PUBLICATIONS

Savage, P., "GDC 2013: Valv's Michael Abrash on the challenges of VR—'a new world is emerging'," PCGamer, Apr. 2, 2013, 6 pages.
(Continued)

*Primary Examiner* — Luke D Ratcliffe

(57) ABSTRACT

A system to determine a position of one or more objects includes a transmitter to emit a beam of photons to sequentially illuminate regions of one or more objects; multiple cameras that are spaced-apart with each camera having an array of pixels to detect photons; and one or more processor devices that execute stored instructions to perform actions of a method, including: directing the transmitter to sequentially illuminate regions of one or more objects with the beam of photons; for each of the regions, receiving, from the cameras, an array position of each pixel that detected photons of the beam reflected or scattered by the region of the one or more objects; and, for each of the regions detected by the cameras, determining a position of the regions using the received array positions of the pixels that detected the photons of the beam reflected or scattered by that region.

20 Claims, 28 Drawing Sheets

Related U.S. Application Data continuation of application No. 15/853,783, filed on Dec. 23, 2017, now Pat. No. 10,261,183.

(60) Provisional application No. 62/606,879, filed on Oct. 10, 2017, provisional application No. 62/498,534, filed on Dec. 27, 2016.

(51) Int. Cl.

| | | |
|---|---|---|
| *G01S 17/89* | (2020.01) | |
| *G01S 7/486* | (2020.01) | |
| *G06T 7/70* | (2017.01) | |
| *G01S 7/484* | (2006.01) | |
| *G06T 7/521* | (2017.01) | |
| *G06T 7/55* | (2017.01) | |
| *H04N 13/344* | (2018.01) | |
| *H04N 13/239* | (2018.01) | |
| *H04N 13/383* | (2018.01) | |
| *G01S 17/04* | (2020.01) | |
| *G01S 17/931* | (2020.01) | |
| *H04N 23/90* | (2023.01) | |

(52) U.S. Cl.
CPC .............. *G01S 17/42* (2013.01); *G01S 17/89* (2013.01); *G01S 17/931* (2020.01); *G06T 7/521* (2017.01); *G06T 7/55* (2017.01); *G06T 7/70* (2017.01); *H04N 13/239* (2018.05); *H04N 13/344* (2018.05); *H04N 13/383* (2018.05); *H04N 23/90* (2023.01)

(58) Field of Classification Search
CPC ...... G01S 17/49; G01S 17/894; G01S 17/026; G01S 17/89; G01S 17/936; G06T 7/55; G06T 7/70; H04N 13/383; H04N 13/344; H04N 13/23; H04N 5/247
See application file for complete search history.

(56) References Cited

U.S. PATENT DOCUMENTS

| | | | |
|---|---|---|---|
| 4,820,041 A | 4/1989 | Davidson et al. | |
| 4,988,187 A | 1/1991 | Kuriyama | |
| 5,052,820 A | 10/1991 | McGinniss et al. | |
| 5,107,122 A | 4/1992 | Barkan | |
| 5,115,230 A | 5/1992 | Smoot | |
| 5,218,427 A | 6/1993 | Koch | |
| 5,245,398 A | 9/1993 | Ludden | |
| 5,455,588 A | 10/1995 | Lew et al. | |
| 5,506,682 A | 4/1996 | Pryor | |
| 5,521,722 A | 5/1996 | Colvill et al. | |
| 5,559,322 A | 9/1996 | Jacoby et al. | |
| 5,572,251 A | 11/1996 | Ogawa | |
| 5,580,140 A | 12/1996 | Katz et al. | |
| 5,661,506 A | 8/1997 | Lazzouni et al. | |
| 5,793,491 A | 8/1998 | Wangler et al. | |
| 5,812,664 A | 9/1998 | Bernobich et al. | |
| 5,914,783 A | 6/1999 | Barrus | |
| 5,930,378 A | 7/1999 | Kubota et al. | |
| 6,009,374 A | 12/1999 | Urahashi | |
| 6,115,022 A | 9/2000 | Mayer, III et al. | |
| 6,130,706 A | 10/2000 | Hart, Jr. et al. | |
| 6,195,446 B1 | 2/2001 | Skoog | |
| 6,307,526 B1 | 10/2001 | Mann | |
| 6,404,416 B1 | 6/2002 | Kahn et al. | |
| 6,535,182 B2 | 3/2003 | Stanton | |
| 6,535,275 B2 | 3/2003 | McCaffrey et al. | |
| 6,543,899 B2 | 4/2003 | Covannon et al. | |
| 6,545,670 B1 | 4/2003 | Pryor | |
| 6,670,603 B2 | 12/2003 | Shimada et al. | |
| 6,692,994 B2 | 2/2004 | Davis et al. | |
| 6,704,000 B2 | 3/2004 | Carpenter | |
| 6,710,767 B1 | 3/2004 | Hasegawa et al. | |
| 6,766,066 B2 | 7/2004 | Kitazawa | |
| 6,843,564 B2 | 1/2005 | Putilin et al. | |
| 6,843,568 B2 | 1/2005 | Schenk et al. | |
| 6,894,823 B2 | 5/2005 | Taylor et al. | |
| 6,982,683 B2 | 1/2006 | Stanton | |
| 7,006,142 B2 | 2/2006 | Seo | |
| 7,023,536 B2 | 4/2006 | Zhang et al. | |
| 7,027,222 B2 | 4/2006 | Takahashi et al. | |
| 7,116,455 B2 | 10/2006 | Yamoaka | |
| 7,119,965 B1 | 10/2006 | Rolland et al. | |
| 7,144,117 B2 | 12/2006 | Kojima | |
| 7,182,465 B2 | 2/2007 | Fuchs et al. | |
| 7,203,383 B2 | 4/2007 | Fisher | |
| 7,232,229 B2 | 6/2007 | Peeters et al. | |
| 7,262,765 B2 | 8/2007 | Brown et al. | |
| 7,278,745 B2 | 10/2007 | Engle | |
| 7,280,211 B2 | 10/2007 | Horibe et al. | |
| 7,283,301 B2 | 10/2007 | Peeters et al. | |
| 7,289,110 B2 | 10/2007 | Hansson | |
| 7,303,289 B2 | 12/2007 | Fujiwara | |
| 7,348,528 B2 | 3/2008 | Marshall | |
| 7,349,553 B2 | 3/2008 | Rodriguez | |
| 7,359,041 B2 | 4/2008 | Xie et al. | |
| 7,375,804 B2 | 5/2008 | Liebman et al. | |
| 7,377,656 B2 | 5/2008 | Nojima et al. | |
| 7,401,920 B1 | 7/2008 | Kranz et al. | |
| 7,440,691 B2 | 10/2008 | Beniyama et al. | |
| 7,511,847 B2 | 3/2009 | Silverbrook et al. | |
| 7,554,652 B1 | 7/2009 | Babin et al. | |
| 7,667,598 B2 | 2/2010 | Yenisch et al. | |
| 7,787,134 B2 | 8/2010 | Kohnen et al. | |
| 7,905,567 B2 | 3/2011 | Orsley | |
| 7,911,444 B2 | 3/2011 | Yee | |
| 8,115,728 B2 | 2/2012 | Feng | |
| 8,123,928 B2 | 2/2012 | Cayouette et al. | |
| 8,169,447 B2 | 5/2012 | Bhogal et al. | |
| 8,170,329 B2 | 5/2012 | Seko et al. | |
| 8,189,176 B2 | 5/2012 | Moir | |
| 8,213,022 B1 | 7/2012 | Riza et al. | |
| 8,259,239 B2 | 9/2012 | Hua | |
| 8,282,222 B2 | 10/2012 | Smits | |
| 8,297,758 B2 | 10/2012 | Choi et al. | |
| 8,330,942 B2 | 12/2012 | Nordenfelt et al. | |
| 8,355,117 B2 | 1/2013 | Niclass | |
| 8,430,512 B2 | 4/2013 | Smits | |
| 8,493,573 B2 | 7/2013 | Chinn et al. | |
| 8,558,810 B2 | 10/2013 | Guo | |
| 8,573,783 B2 | 11/2013 | Smits | |
| 8,636,367 B1 | 1/2014 | Callison et al. | |
| 8,665,435 B2 | 3/2014 | Hidaka | |
| 8,696,141 B2 | 4/2014 | Smits | |
| 8,711,370 B1 | 4/2014 | Smits | |
| 8,718,326 B2 | 5/2014 | Yoon et al. | |
| 8,773,512 B1 | 7/2014 | Rafii | |
| 8,780,161 B2 | 7/2014 | Samadani et al. | |
| 8,797,531 B2 | 8/2014 | Knox et al. | |
| 8,867,827 B2 * | 10/2014 | Yeatman, Jr. ........ | H04N 13/257 382/154 |
| 8,941,817 B2 | 1/2015 | Laudrain et al. | |
| 8,947,755 B2 | 2/2015 | Konuma et al. | |
| 8,953,242 B2 | 2/2015 | Larson et al. | |
| 8,957,847 B1 | 2/2015 | Karakotsios et al. | |
| 8,994,780 B2 | 3/2015 | Moore | |
| 9,026,596 B2 | 5/2015 | Perez et al. | |
| 9,045,226 B2 | 6/2015 | Piasecki et al. | |
| 9,080,866 B1 | 7/2015 | Dowdall et al. | |
| 9,131,192 B2 | 9/2015 | Ubillos et al. | |
| 9,134,799 B2 | 9/2015 | Mark | |
| 9,151,607 B2 | 10/2015 | Davies et al. | |
| 9,244,339 B2 | 1/2016 | Wang | |
| 9,323,055 B2 | 4/2016 | Baillot | |
| 9,366,519 B2 | 6/2016 | Danbury et al. | |
| 9,377,533 B2 | 6/2016 | Smits | |
| 9,392,225 B2 | 7/2016 | Eisenberg | |
| 9,454,014 B2 | 9/2016 | Kurashige et al. | |
| 9,562,764 B2 | 2/2017 | France | |
| 9,581,883 B2 | 2/2017 | Smits | |
| 9,599,713 B2 | 3/2017 | Giger et al. | |
| 9,618,610 B2 | 4/2017 | Kao et al. | |

(56) References Cited

U.S. PATENT DOCUMENTS

| | | |
|---|---|---|
| 9,703,473 B2 | 7/2017 | Schillings et al. |
| 9,813,673 B2 | 11/2017 | Smits |
| 9,842,514 B2 | 12/2017 | Hoelzer et al. |
| 9,854,196 B2 | 12/2017 | Liu et al. |
| 9,864,440 B2 | 1/2018 | Geller et al. |
| 9,939,233 B2 | 4/2018 | Scott et al. |
| 9,946,076 B2 | 4/2018 | Smits et al. |
| 9,952,033 B2 | 4/2018 | Martini et al. |
| 9,961,337 B2 | 5/2018 | Stroetmann |
| 10,037,017 B2 | 7/2018 | Wooldridge et al. |
| 10,052,927 B2 | 8/2018 | Maise et al. |
| 10,067,230 B2 | 9/2018 | Smits |
| 10,261,183 B2 * | 4/2019 | Smits ............... G01S 7/4868 |
| 10,331,021 B2 | 6/2019 | Smits |
| 10,564,284 B2 * | 2/2020 | Smits ............... H04N 13/383 |
| 10,614,734 B2 | 4/2020 | Peuhkurinen et al. |
| 10,962,867 B2 | 3/2021 | Smits |
| 2001/0043165 A1 | 11/2001 | Stanton |
| 2002/0011987 A1 | 1/2002 | Kitazawa |
| 2002/0036765 A1 | 3/2002 | McCaffrey et al. |
| 2002/0039138 A1 | 4/2002 | Edelson et al. |
| 2002/0040971 A1 | 4/2002 | Ono |
| 2002/0067466 A1 | 6/2002 | Covannon et al. |
| 2002/0089489 A1 | 7/2002 | Carpenter |
| 2002/0100884 A1 | 8/2002 | Maddock |
| 2002/0139920 A1 | 10/2002 | Seibel et al. |
| 2002/0145588 A1 | 10/2002 | McCahon et al. |
| 2002/0149694 A1 | 10/2002 | Seo |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0003409 A1 | 1/2004 | Berstis |
| 2004/0006424 A1 | 1/2004 | Joyce et al. |
| 2004/0041996 A1 | 3/2004 | Abe |
| 2004/0054359 A1 | 3/2004 | Ruiz et al. |
| 2004/0100508 A1 | 5/2004 | Hansson |
| 2004/0114834 A1 | 6/2004 | Fisher |
| 2004/0179254 A1 | 9/2004 | Lewis et al. |
| 2004/0218155 A1 | 11/2004 | Schenk et al. |
| 2004/0240754 A1 * | 12/2004 | Smith ............... G01B 11/024 382/154 |
| 2004/0263874 A1 | 12/2004 | Silverbrook et al. |
| 2005/0024586 A1 | 2/2005 | Teiwes et al. |
| 2005/0030305 A1 | 2/2005 | Brown et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195375 A1 | 9/2005 | Fujiwara |
| 2005/0195387 A1 | 9/2005 | Zhang et al. |
| 2005/0219530 A1 | 10/2005 | Horibe et al. |
| 2005/0254726 A1 | 11/2005 | Fuchs et al. |
| 2005/0273830 A1 | 12/2005 | Silver et al. |
| 2006/0028328 A1 | 2/2006 | Cresse |
| 2006/0028374 A1 | 2/2006 | Fullerton |
| 2006/0028375 A1 | 2/2006 | Honda et al. |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0103699 A1 | 5/2007 | Kohnen et al. |
| 2007/0138371 A1 | 6/2007 | Marshall |
| 2007/0182949 A1 | 8/2007 | Niclass |
| 2007/0211329 A1 | 9/2007 | Haase et al. |
| 2007/0273610 A1 | 11/2007 | Baillot |
| 2008/0018591 A1 | 1/2008 | Pittel et al. |
| 2008/0174516 A1 | 7/2008 | Xiao et al. |
| 2008/0266169 A1 | 10/2008 | Akita |
| 2008/0291213 A1 | 11/2008 | Bhogal |
| 2008/0309913 A1 | 12/2008 | Fallon |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0013860 A1 | 1/2010 | Mandella et al. |
| 2010/0014750 A1 | 1/2010 | Seko et al. |
| 2010/0045967 A1 | 2/2010 | Moir |
| 2010/0110385 A1 | 5/2010 | Choi et al. |
| 2010/0142856 A1 | 6/2010 | Takeuchi |
| 2010/0149518 A1 | 6/2010 | Nordenfelt et al. |
| 2010/0235006 A1 | 9/2010 | Brown |
| 2010/0246902 A1 | 9/2010 | Rowe et al. |
| 2010/0305857 A1 | 12/2010 | Byrne et al. |
| 2010/0326311 A1 | 12/2010 | Simon |
| 2010/0328054 A1 | 12/2010 | Yim et al. |
| 2011/0001793 A1 | 1/2011 | Moriyama et al. |
| 2011/0102763 A1 | 5/2011 | Brown et al. |
| 2011/0115747 A1 | 5/2011 | Powell et al. |
| 2011/0123113 A1 | 5/2011 | Berretty et al. |
| 2011/0211243 A1 | 9/2011 | Smits |
| 2011/0249157 A1 | 10/2011 | Fredembach et al. |
| 2011/0304842 A1 | 12/2011 | Kao et al. |
| 2012/0017147 A1 | 1/2012 | Mark |
| 2012/0050528 A1 | 3/2012 | Davies et al. |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0229818 A1 | 9/2012 | Chinn et al. |
| 2012/0236379 A1 | 9/2012 | da Silva et al. |
| 2012/0250152 A1 | 10/2012 | Larson et al. |
| 2012/0262696 A1 | 10/2012 | Eisele et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0135198 A1 | 5/2013 | Hodge et al. |
| 2013/0170006 A1 | 7/2013 | Kurashige et al. |
| 2013/0176561 A1 | 7/2013 | Hidaka |
| 2013/0215487 A1 | 8/2013 | Konuma et al. |
| 2013/0229669 A1 | 9/2013 | Smits |
| 2013/0239057 A1 | 9/2013 | Ubillos et al. |
| 2013/0258108 A1 | 10/2013 | Ono et al. |
| 2013/0293396 A1 | 11/2013 | Selevan |
| 2013/0293760 A1 | 11/2013 | Nisenzon et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0204385 A1 | 7/2014 | Ouyang et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0284457 A1 | 9/2014 | Smits |
| 2014/0285818 A1 | 9/2014 | Holz |
| 2014/0307248 A1 | 10/2014 | Giger et al. |
| 2014/0350836 A1 | 11/2014 | Stettner et al. |
| 2014/0354514 A1 | 12/2014 | Aronsson |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0160332 A1 | 6/2015 | Sebastian et al. |
| 2015/0169082 A1 | 6/2015 | Li et al. |
| 2015/0225783 A1 | 8/2015 | Mears et al. |
| 2015/0233703 A1 | 8/2015 | Martini et al. |

(56) References Cited

U.S. PATENT DOCUMENTS

| | | |
|---|---|---|
| 2015/0279114 A1 | 10/2015 | Yonekubo |
| 2015/0285625 A1 | 10/2015 | Deane |
| 2015/0286293 A1 | 10/2015 | Gruhlke et al. |
| 2015/0301180 A1 | 10/2015 | Stettner et al. |
| 2016/0004126 A1 | 1/2016 | Leister |
| 2016/0011312 A1 | 1/2016 | Leyva |
| 2016/0014403 A1 | 1/2016 | Stroetmann |
| 2016/0041266 A1 | 2/2016 | Smits |
| 2016/0047895 A1 | 2/2016 | Dussan |
| 2016/0050345 A1 | 2/2016 | Longbotham et al. |
| 2016/0139266 A1 | 5/2016 | Montoya et al. |
| 2016/0162747 A1 | 6/2016 | Singh et al. |
| 2016/0259038 A1 | 9/2016 | Retterath et al. |
| 2016/0259058 A1 | 9/2016 | Verheggen. et al. |
| 2016/0282468 A1 | 9/2016 | Gruver et al. |
| 2016/0306044 A1 | 10/2016 | Smits |
| 2016/0313553 A1 | 10/2016 | Song et al. |
| 2016/0335778 A1 | 11/2016 | Smits |
| 2016/0349526 A1 | 12/2016 | Kurashige et al. |
| 2017/0003392 A1 | 1/2017 | Bartlett et al. |
| 2017/0010104 A1 | 1/2017 | Aviel |
| 2017/0045358 A1 | 2/2017 | Masuda et al. |
| 2017/0097407 A1 | 4/2017 | Shpunt et al. |
| 2017/0108443 A1 | 4/2017 | Kurihara et al. |
| 2017/0131090 A1 | 5/2017 | Bronstein et al. |
| 2017/0176575 A1 | 6/2017 | Smits |
| 2017/0176596 A1 | 6/2017 | Shpunt et al. |
| 2017/0208292 A1 | 7/2017 | Smits |
| 2017/0242104 A1 | 8/2017 | Dussan |
| 2017/0299721 A1 | 10/2017 | Eichenholz et al. |
| 2017/0363724 A1 | 12/2017 | Reid |
| 2018/0039852 A1 | 2/2018 | Nakamura et al. |
| 2018/0113216 A1 | 4/2018 | Kremer et al. |
| 2018/0120931 A1 | 5/2018 | Shpunt et al. |
| 2018/0180733 A1 | 6/2018 | Smits |
| 2018/0189574 A1 | 7/2018 | Brueckner et al. |
| 2019/0011567 A1 | 1/2019 | Pacala et al. |
| 2019/0080612 A1 | 3/2019 | Weissman et al. |
| 2019/0285877 A1 | 9/2019 | Ogino et al. |
| 2020/0013185 A1 | 1/2020 | Yoshimura |
| 2020/0132984 A1 | 4/2020 | Tsao et al. |
| 2020/0133106 A1 | 4/2020 | Smits |
| 2020/0310114 A1 | 10/2020 | Tanabe |
| 2021/0157012 A1 | 5/2021 | Wajnberg et al. |

FOREIGN PATENT DOCUMENTS

| | | |
|---|---|---|
| CN | 201159795 Y | 12/2008 |
| CN | 101750012 A | 6/2010 |
| CN | 102084290 A | 6/2011 |
| CN | 102576156 A | 7/2012 |
| CN | 103608642 A | 2/2014 |
| CN | 103797328 A | 5/2014 |
| CN | 105066953 A | 11/2015 |
| DE | 102015205826 A1 | 10/2015 |
| EP | 0583060 A2 | 2/1994 |
| EP | 0722109 A1 | 7/1996 |
| EP | 1213597 A2 | 6/2002 |
| EP | 2148220 A1 | 1/2010 |
| EP | 2711667 A1 | 3/2014 |
| GB | 2510001 A | 7/2017 |
| JP | 11119184 A | 4/1999 |
| JP | 2000-304508 A | 11/2000 |
| JP | 200145381 A | 2/2001 |
| JP | 2001045381 A | 2/2001 |
| JP | 2003029201 A | 1/2003 |
| JP | 2004132914 A | 4/2004 |
| JP | 2005519338 A | 6/2005 |
| JP | 2010-197227 A | 9/2010 |
| JP | 2011197674 A | 10/2011 |
| JP | 2013097138 A | 5/2013 |
| JP | 2015-025901 A | 2/2015 |
| KR | 10-2011-0115752 A | 10/2011 |
| KR | 101665938 B1 | 10/2016 |
| WO | 1992/18971 A1 | 10/1992 |
| WO | 2000/034818 A1 | 6/2000 |
| WO | 2002004247 A1 | 1/2002 |
| WO | 2002037166 A1 | 5/2002 |
| WO | 2005010739 A1 | 2/2005 |
| WO | 2006/063577 A1 | 6/2006 |
| WO | 2008152647 A2 | 12/2008 |
| WO | 2009/049272 A2 | 4/2009 |
| WO | 2011/109402 A2 | 9/2011 |
| WO | 2012/054231 A2 | 4/2012 |
| WO | 2013079099 A1 | 6/2013 |
| WO | 2014141115 A2 | 9/2014 |
| WO | 2016033036 A2 | 3/2016 |
| WO | 2016130997 A1 | 8/2016 |
| WO | 2016168378 A1 | 10/2016 |
| WO | 2017040066 A1 | 3/2017 |
| WO | 2017106875 A1 | 6/2017 |

OTHER PUBLICATIONS

European Search Report for European Patent Application No. 08837063.0 dated Nov. 19, 2010, 8 pages.
Communication Pursuant to Article 94(3) EPC in European Patent Application No. 08837063.0 dated Dec. 27, 2011, 5 pages.
Communication Pursuant to Article 94(3) EPC in European Patent Application No. 08837063.0 dated Oct. 22, 2012, 6 pages.
International Search Report and Written Opinion in International Patent Application No. PCT/US2008/079663 dated Apr. 30, 2009, 5 pages.
International Search Report and Written Opinion in International Patent Application No. PCT/US2011/026691 dated Oct. 24, 2011, 7 pages.
International Search Report in International Patent Application No. PCT/US2011/054751 dated Jan. 30, 2012, 1 page.
International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S. Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/858,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Communication for U.S. Appl. No. 14/636,062 dated Sep. 25, 2015, 8 pages.

(56) References Cited

OTHER PUBLICATIONS

Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, 10 pages.
Official Communication for U.S. Appl. No. 14/218,643 dated Jun. 23, 2016, 11 pages.
Official Communication for U.S. Appl. No. 13/877,652 dated Aug. 12, 2016, 22 pages.
Official Communication for U.S. Appl. No. 15/194,502 dated Aug. 19, 2016, 12 pages.
Official Communication for U.S. Appl. No. 14/636,062 dated Aug. 24, 2016, 9 pages.
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. No. 14/218,643 dated Nov. 1, 2016, 10 pages.
Kanzawa, Y. et al., "Human Skin Detection by Visible and Near-Infrared Imaging," IAPR Conference on Machine Vision Applications, Jun. 13-15, 2011, Nara Japan, 5 pages.
Office Communication for U.S. Appl. No. 13/877,652 dated May 31, 2017, 23 pages.
Office Communication for U.S. Appl. No. 15/194,502 dated Mar. 9, 2017, 7 pages.
International Search Report and Written Opinion for International Application No. PCT/US2016/067626 dated Mar. 16, 2017, 12 pages.
Office Communication for U.S. Appl. No. 14/671,904 dated May 5, 2017, 11 pages.
Office Communication for U.S. Appl. No. 15/411,959 dated May 11, 2017, 9 pages.
International Search Report and Written Opinion for International Application No. PCT/US2017/014616 dated May 1, 2017, 11 pages.
Official Communication for U.S. Appl. No. 15/384,227 dated Feb. 7, 2017, 8 pages.
Official Communication for U.S. Appl. No. 15/384,227 dated Jul. 19, 2017, 5 pages.
Official Communication for U.S. Appl. No. 14/671,904 dated Aug. 18, 2017, 7 pages.
Official Communication for U.S. Appl. No. 15/194,502 dated Aug. 15, 2017, 7 pages.
Official Communication for U.S. Appl. No. 15/411,959 dated Aug. 29, 2017, 5 pages.
Official Communication for U.S. Appl. No. 13/877,652 dated Dec. 6, 2017, 8 pages.
Official Communication for U.S. Appl. No. 15/799,149 dated Jan. 10, 2018, 7 pages.
Official Communication for U.S. Appl. No. 15/444,182 dated Feb. 14, 2018, 8 pages.
Official Communication for U.S. Appl. No. 15/194,502 dated Feb. 12, 2018, 9 pages.
Official Communication for U.S. Appl. No. 15/804,392 dated Feb. 9, 2018, 10 pages.
Official Communication for U.S. Appl. No. 15/804,909 dated Feb. 12, 2018, 14 pages.
Official Communication for U.S. Appl. No. 15/098,285 dated Apr. 19, 2018, 69 pages.
International Search Report and Written Opinion for International Patent Application No. PCT/US2017/068377 dated Apr. 17, 2018, 12 pages.
Office Communication for U.S. Appl. No. 15/411,959 dated May 11, 2017, 8 pages.
Office Communication for U.S. Appl. No. 15/694,532 dated Jul. 10, 2018, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49.
International Search Report and Written Opinion for International Patent Application No. PCT/US2017/059282 dated Aug. 10, 2018, pp. 1-10.
Office Communication for U.S. Appl. No. 15/444,182 dated Sep. 13, 2018, pp. 1-11.
Office Communication for U.S. Appl. No. 16/049,380 dated Sep. 27, 2018, pp. 1-40.
Office Communication for U.S. Appl. No. 16/140,485 dated Nov. 23, 2018, pp. 1-58.
International Search Report and Written Opinion in International Patent Application No. PCT/US18/32078 dated Nov. 16, 2018; pp. 1-16.
Office Communication for U.S. Appl. No. 15/194,502 dated Jan. 3, 2019, pp. 1-15.
Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Office Communication for U.S. Appl. No. 15/444,182 dated Mar. 20, 2019, pp. 1-10.
Office Communication for U.S. Appl. No. 15/194,502 dated Mar. 6, 2019, pp. 1-11.
Office Communication for U.S. Appl. No. 16/223,043 dated Mar. 14, 2019, pp. 1-46.
Office Communication for U.S. Appl. No. 16/114,139 dated Apr. 19, 2019, pp. 1-50.
Office Communication for U.S. Appl. No. 16/165,631 dated Apr. 1, 2019, pp. 1-23.
European Supplementary Search Report for European Patent Application No. 16876940.4 dated May 8, 2019, pp. 1-8.
Office Communication for U.S. Appl. No. 16/398,139 dated Jun. 6, 2019, pp. 1-9.
Office Communication for U.S. Appl. No. 16/140,485 dated Jun. 3, 2019, pp. 1-22.
Office Communication for U.S. Appl. No. 15/976,269 dated Jul. 8, 2019, pp. 1-21.
Office Communication for U.S. Appl. No. 16/384,761 dated Jun. 21, 2019, pp. 1-28.
Office Communication for U.S. Appl. No. 16/261,528 dated May 17, 2019, pp. 1-23.
Office Communication for U.S. Appl. No. 16/165,631 dated Jul. 19, 2019, pp. 1-15.
International Search Report and Written Opinion for International Patent Application No. PCT/US18/056757 dated Mar. 11, 2019, pp. 1-12.
Office Communication for U.S. Appl. No. 16/140,485 dated Aug. 9, 2019, pp. 1-5.

(56) References Cited

OTHER PUBLICATIONS

Office Communication for U.S. Appl. No. 16/114,139 dated Aug. 2, 2019, pp. 1-21.
Office Communication for U.S. Appl. No. 16/140,485 dated Sep. 20, 2019, pp. 1-16.
Office Communication for U.S. Appl. No. 15/976,269 dated Sep. 6, 2019, pp. 1-30.
Office Communication for U.S. Appl. No. 16/443,702 dated Oct. 3, 2019, pp. 1-80.
Office Communication for U.S. Appl. No. 16/398,139 dated Sep. 27, 2019, pp. 1-17.
Office Communication for U.S. Appl. No. 16/530,818 dated Oct. 16, 2019, pp. 1-13.
Office Communication for U.S. Appl. No. 16/165,631 dated Oct. 8, 2019, pp. 1-11.
Official Communication for U.S. Appl. No. 16/114,139 dated Sep. 9, 2019, pp. 1-8.
Official Communication for U.S. Appl. No. 16/384,761 dated Nov. 29, 2019, pp. 1-39.
Official Communication for U.S. Appl. No. 15/976,269 dated Mar. 25, 2019, pp. 1-26.
Official Communication for U.S. Appl. No. 15/976,269 dated Oct. 8, 2019, pp. 1-14.
Official Communication for U.S. Appl. No. 16/165,631 dated Dec. 27, 2019, pp. 1-13.
Official Communication for U.S. Appl. No. 16/679,110 dated Feb. 13, 2020, pp. 1-9.
Extended European Search Report for European Patent Application No. 18797782.2 dated May 27, 2021, pp. 1-21.
Examination Report for European Patent Application No. 11834848.1 dated Jun. 7, 2019, pp. 1-6.
Examination Report for European Patent Application No. 17742125.2 dated Nov. 19, 2020, pp. 1-7.
Office Communication for Chinese Patent Appiication No. 201880030862.5 dated Jun. 9, 2321, pp. 1-23.
Examination Report for European Patent Application No. 16876940.4 dated Jul. 30, 2021, pp. 1-4.
Extended European Search Report for European Patent Application No. 17885850.2 dated May 25, 2020, pp. 1-8.
Examination Report for European Patent Application No. 17885850.2 dated Aug. 30, 2021, pp. 1-5.
Office Communication for U.S. Appl. No. 15/953,278 dated Oct. 5, 2021, pp. 1-20.
Office Communication for Japanese Patent Application No. JP 2019-535248 dated Nov. 17, 2021, pp. 1-7.
Kasai, Takeshi et al., "A Real Time Measurement System of 3-D Motion Using Multiple Cameras," Society of Biomechanisms Japan, 1986, vol. 8, pp. 1-32.
Office Communication for Chinese Patent Application No. 201680082143.9 dated Nov. 30, 2021, pp. 1-33.
Office Communication for U.S. Appl. No. 17/189,204 dated Jan. 11, 2022, pp. 1-24.
Office Communication for U.S. Appl. No. 16/435,392 dated Feb. 21, 2020, pp. 1-10.
Office Communication for Japanese Patent Application No. 2018551896 dated Oct. 26, 2020, pp. 1-11.
Office Communication for U.S. Appl. No. 16/659,513 dated Nov. 25, 2020, pp. 1-6.
Office Communication for U.S. Appl. No. 16/435,392 dated Dec. 1, 2020, pp. 1-13.
Office Communication for U.S. Appl. No. 16/679,110 dated Dec. 7, 2020, pp. 1-6.
Office Communication for U.S. Appl. No. 16/443,702 dated Dec. 18, 2020, pp. 1-3.
Partial Supplementary European Search Report for European Patent Application No. 18797782.2 dated Jan. 19, 2021, pp. 1-19.
Office Communication for U.S. Appl. No. 16/443,702 dated Feb. 8, 2021, pp. 1-12.
Office Communication for U.S. Appl. No. 16/659,513 dated Mar. 20, 2020, pp. 1-12.
Office Communication for Chinese Patent Application No. 201780018948.1 dated Mar. 27, 2020, pp. 1-7.
Office Communication for U.S. Appl. No. 16/530,818 dated Apr. 6, 2020, pp. 1-5.
Office Communication for U.S. Appl. No. 15/953,278 dated Apr. 9, 2020, pp. 1-5.
Office Communication for U.S. Appl. No. 16/820,523 dated Apr. 22, 2020, pp. 1-10.
Extended European Search Report for EP Patent Application No. 17742125.2 dated Jul. 29, 2019, pp. 1-13.
Li et al., "Facial Performance Sensing Head-Mounted Display." ACM Transactions on Graphics (TOG), vol. 34, No. 4, 2015, pp. 1-9.
Seymour, "Facing Second Son—fxguide," Feb. 2, 2015, https://www.fxguide.com/fxfeatured/facing-second-son/, retrieved on Jul. 19, 2019, pp. 1-18.
Rolland et al., "Development of Head-Mounted Projection Displays for Distributed, Collaborative, Augmented Reality Applications." Presence: Teleoperators & Virtual Environments, vol. 14, No. 5, 2005, pp. 528-549.
International Search Report and Written Opinion for International Patent Application No. PCT/US2019/015739 dated May 17, 2019, pp. 1-7.
Extended European Search Report for EP Patent Application No. 17878671.1 dated May 7, 2020, pp. 1-11.
Office Communication for Japanese Patent Application No. JP 2019-561820 dated Mar. 7, 2022, pp. 1-11.
Office Communication for U.S. Appl. No. 17/214,505 dated Mar. 16, 2022, pp. 1-12.
Office Communication for U.S. Appl. No. 15/953,278 dated May 2, 2022, pp. 1-10.
Office Communication for U.S. Appl. No. 17/189,204 dated May 2, 2022, pp. 1-14.
Office Communication for Japanese Patent Application No. JP 2019-535248 dated Jul. 4, 2022, pp. 1-5.
Office Communication for U.S. Appl. No. 15/953,278 dated Jul. 18, 2022, pp. 1-5.
Office Communication for U.S. Appl. No. 17/214,505 dated Aug. 26, 2022, pp. 1-13.
Office Communication for U.S. Appl. No. 16/708,198 dated Aug. 26, 2022, pp. 1-5.
Office Communication for U.S. Appl. No. 17/214,505 dated Sep. 12, 2022, pp. 1-2.
Examination Report for European Patent Application No. 20201393.4 dated Sep. 15, 2022, pp. 1-6.
Office Communication for U.S. Appl. No. 15/953,278 dated Nov. 10, 2022, pp. 1-7.
Office Communication for U.S. Appl. No. 17/187,069 dated Dec. 5, 2022, pp. 1-11.
Office Communication for Chinese Patent Application No. 201780084810.1 dated Nov. 22, 2022, pp. 1-21.
Mak, D.K., "Locating Flaws in Three-Dimensional Space Using a Transmitter-Receiver System," NDT, Nov. 1990, vol. 12, No. 11, pp. 1-9.
Gu, Liming, "Research on Key Technologies of Photon Beam Position Measurement at HLS," A dissertation for Doctor's degree, University of Science and Technology of China, May 2011, pp. 1-248.
Chen, Junqing et al., "Digital Camera Imaging System Simulation," IEEE Transactions on Electron Devices, Nov. 2009, vol. 56, Iss. 11, pp. 2496-2505.
Office Communication for Chinese Patent Application No. 201780076900.6 dated Dec. 5, 2022, pp. 1-15.
Office Communication for U.S. Appl. No. 16/938,968 dated Jan. 26, 2023, pp. 1-11.
Office Communication for U.S. Appl. No. 15/953,278 dated Mar. 17, 2021, pp. 1-10.
Office Communication for U.S. Appl. No. 16/679,110 dated Mar. 17, 2021, pp. 1-8.
Extended European Search Report for European Patent Application No. 20201393.4 dated Apr. 22, 2021, pp. 1-9.
Duchowski, Andrew T. et al., "Gaze-Contingent Displays: A Review," Cyberpsychology & Behavior, 2004, vol. 7, No. 6, pp. 621-634.

(56) References Cited

OTHER PUBLICATIONS

International Search Report and Written Opinion for International Patent Application No. PCT/US2021/020359 dated May 11, 2021, pp. 1-7.
Office Communication for U.S. Appl. No. 16/443,702 dated Jun. 1, 2021, pp. 1-5.
Examination Report, for European Patent Application No. 17878671.1 dated May 14, 2021, pp. 1-5.
Office Communication for Japanese Patent Application No. JP 2019-535248 dated Jan. 10, 2023, pp. 1-4.
Examination Report, for European Patent Application No. 16876940.4 dated May 28, 2020, pp. 1-5.
Office Communication for U.S. Appl. No. 16/435,392 dated Aug. 10, 2020, pp. 1-7.
Office Communication for U.S. Appl. No. 16/679,110 dated Aug. 18, 2020, pp. 1-9.
Office Communication for U.S. Appl. No. 16/443,702 dated Sep. 18, 2020, pp. 1-14.
Office Communication for U.S. Appl. No. 16/435,392 dated Oct. 23, 2020, pp. 1-4,.
Office Communication for U.S. Appl. No. 16/820,523 dated Nov. 2, 2020, pp. 1-6.
Office Communication for U.S. Appl. No. 15/953,278 dated Nov. 4, 2020, pp. 1-16.

\* cited by examiner

Ad Hoc (spontaneous) Camera Crew
6 or more cameras (e.g., mobile phones) (C1 ... C6)
observe a moving figure (F)

SYSTEMS AND METHODS FOR MACHINE PERCEPTION

CROSS-REFERENCE TO RELATED APPLICATIONS

This Utility patent application is a Continuation of U.S. patent application Ser. No. 16/384,761 filed on Apr. 15, 2019, now U.S. Pat. No. 10,564,284 issued on Feb. 18, 2020, which is a Continuation of U.S. patent application Ser. No. 15/853,783 filed on Dec. 23, 2017, now U.S. Pat. No. 10,261,183 issued on Apr. 16, 2019, which is based on previously filed U.S. Provisional Patent Application No. 62/606,879 filed on Oct. 10, 2017, and U.S. Provisional Patent Application No. 62/498,534 filed on Dec. 27, 2016, the benefit of the filing dates of which are hereby claimed under 35 U.S.C. § 119(e) and § 120 and the contents of which are each further incorporated in entirety by reference.

TECHNICAL FIELD

The present invention relates generally to an imaging system and to methods of making and using the imaging system. The present invention is also directed a sequential voxel imaging system with sequential illumination of each voxel and detection using multiple receivers.

BACKGROUND

Many conventional imaging systems attempt to capture 3D motion reality as a series of still images. Images are captured as frames, i.e. batched observations composed of millions of pixels captured in parallel over a shared time period. By treating images as frames, conventional multiview systems may be forced into a Hobson's choice between photon starvation and motion blur, resulting in spatio-temporal ambiguities and computational complexity. Examples of the legacy of conventional frame-based motion capture systems are stereo cameras, structured light 3D perceptual systems, and structure from motion systems.

To ensure that enough photons are available to satisfy the minimum signal requirements of millions of pixels in each camera, the frame exposure period, controlled by a shutter, is typically several milliseconds. Each pixel requires typically at least 100 photons; so to minimally expose a single frame in a 10-megapixel camera requires at least a billion photons, which under normal illumination conditions takes several milliseconds.

Any motion during this time period can cause significant motion blur. For example, for a 1 millisecond exposure, the edge of an object traversing a four meter field of view (FoV) of a 4K sensor at a modest speed of 10 m/sec (22.5 mph) will move 10 mm in 1 ms, causing a motion blur of 10 pixels (i.e. motion effectively reduces the spatial resolution of the system to $\frac{1}{10}^{th}$, or only 400 pixels across the camera's FoV, instead of 4k). Shorter exposures could reduce this blur, but they would result in an insufficiency of photons, which would in turn significantly reduce contrast so that edges and shapes become harder to detect. For example, a $\frac{1}{10}^{th}$ exposure time would reduce the photon budget to ten photons ($\frac{1}{10}^{th}$ of 100 photons) with an inherent (for example, Poisson fluctuation) noise of three photons (i.e., 33% signal-to-noise ratio). Larger apertures typically include larger, more expensive sensors and optics and reduce the depth of focus of the system.

Conventional multiview systems may create blurry or underexposed, noisy motion images, which critically lack edge contrast. This can result in speculative, often erroneous feature matches. The latter form statistical gross-outliers that inhibit traditional feature matching algorithms, such as SIFT and Gradient Descent methods and require computationally intense outlier rejection algorithms such as RanSaC. The frame-by-frame approach in many conventional multiview perceptual systems has a second major disadvantage: It results in an inherent computational complexity, which increases second order exponentially, on the order of $(M^N)$ with the number of cameras (N) and the number of pixels per camera (M).

In frame-based multi-view systems, adding views or pixels can quickly result in a computational overload and comes with enormous set-up and calibration challenges. The computational problem arises particularly when establishing accurate pixel level correspondences between multiple images. For example, establishing accurate, dense (pixel level) correspondences in a 3-camera system (N=3) may require sorting and finding up to one million three-way correspondences between overlapping 10 megapixels, which is computationally complex (e.g. searching and sorting through $10^{21}$ possible pixel-pixel-pixel combinations ($M^N=10^{7\times 3}$).

Similar computational complexity of order $(M^N)$ arises in Structure from Motion (SfM) systems where image (or pixel) correspondences between successive frames need to be discovered and tracked over multiple frames.

DETAILED DESCRIPTION OF THE INVENTION

Figure 1:
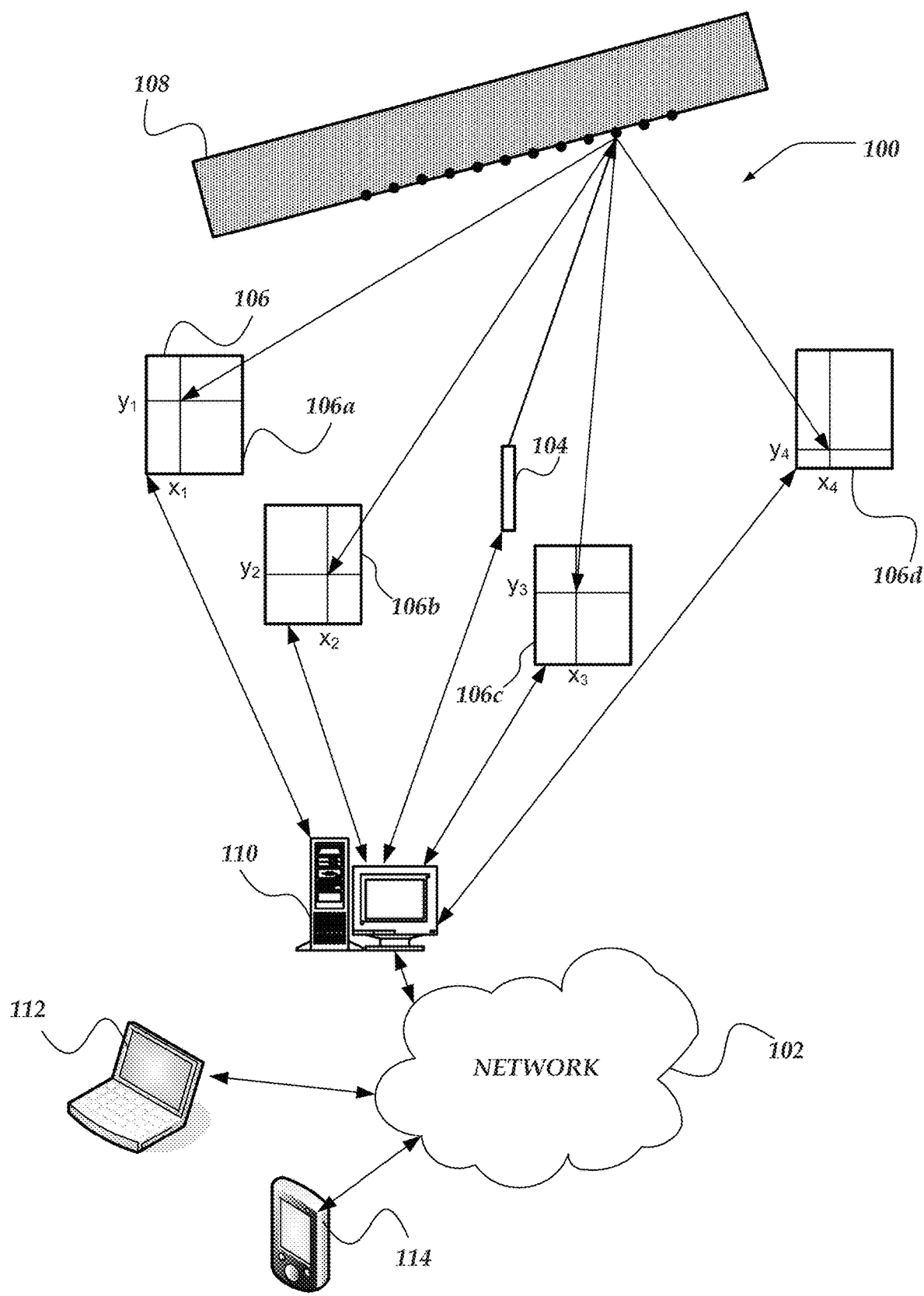
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), an organic light emitting diode (OLED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "receiver," "photon receiver," "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of one or more photons. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), complementary metal-oxide-semiconductor (CMOS) devices, silicon photomultipliers (SiPM), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. The target may also be referred to as an "object." For instance, a target or object may scatter or reflect an outgoing light beam that is transmitted by various ones of the various embodiments disclosed herein. In the various embodiments described herein, one or more light sources may be in relative motion to one or more of receivers and/or one or more targets or objects. Similarly, one or more receivers may be in relative motion to one or more of light sources and/or one or more targets or objects. One or more targets or objects may be in relative motion to one or more of light sources and/or one or more receivers.

As used herein, the term "voxel" is a sampled surface element of a 3D spatial manifold (for example, a 3D shaped surface.)

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to methods or systems for determining a position of one or more objects. The methods or systems utilize a beam arrangement to emit a beam of photons to sequentially illuminate regions (or voxels) of the objects. The methods and systems also include multiple cameras that are spaced-apart from each other with each camera having an array of pixels to detect photons received by the pixel and, in particular, to detect photons from the beam that are reflected or otherwise scattered by the illuminated objects. (Although the term "reflect" is used herein, it will be understood that this term is also intended to encompass other light scattering mechanisms, unless otherwise indicated.) The system directs the beam arrangement to sequentially illuminate the regions or voxels of the objects with the beam of photons. For each of these illuminated regions, one or more (preferably, at least two or three) of the cameras detect the photons reflected or otherwise scattered by that region and then the cameras provide an array position of the pixels that detected the photons of the beam reflected or scattered by the region of the one or more objects. These array positions can then be used to determine the position of the region of the object.

In at least some embodiments, this pixel/voxel sequential imaging approach utilizes receivers (e.g., cameras) that observe reality as a very rapid sequential stream of voxels (of the illuminated object(s)). In at least some embodiments, the system (e.g., a PhotonJet VoxelFlow system) observes each voxel during a unique nanosecond illumination interval, one voxel-at-the-time. In at least some embodiments, this approach can result in a flow of precise 3D position data for hundreds of millions of voxels per second.

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 100 of FIG. 1 includes a transmitter 104 including a light source, multiple receivers (e.g., cameras) 106a, 106b, 106c, 106d, and a system computer device 110. Photons from the transmitter 104 illuminate regions (i.e., voxels) on one or more objects or targets 108 which reflect a portion of the photons back towards the receivers 106a, 106b, 106c, 106d. In some embodiments, system 100 may include, or be coupled to, a network 102 and one or more other computers, such as but not limited to a laptop computer 112 and/or a mobile computer, such as but not limited to a smartphone or tablet 114. In some embodiments, the transmitter 104 and/or receivers 106a, 106b, 106c, 106d may include one or more components included in a computer, such as but not limited to various ones of computers 110, 112, or 114. The transmitter 104 and receivers 106a, 106b, 106c, 106d can be coupled directly to the computer 110, 112, or 114 by any wireless or wired technique or may be coupled to the computer 110, 112, or 114 through a network 102.

The object 108 may be a three-dimensional object and may be any number of individual objects. The object 108 is not an idealized black body, i.e. it reflects or scatters at least a portion of incident photons.

The transmitter 104 may include one or more light sources for transmitting light or photon beams. Examples of suitable light sources includes lasers, laser diodes, light emitting diodes, organic light emitting diodes, or the like. For instance, the transmitter 104 may include one or more visible and/or non-visible laser sources. In at least some embodiments, the transmitter 104 includes one or more of a red (R), a green (G), or a blue (B) laser source. In at least some embodiment, light source includes one or more non-visible laser sources, such as a near-infrared (NIR) or infrared (IR) laser. A light source may provide continuous or pulsed light beams of a predetermined frequency, or range of frequencies. The provided light beams may be coherent light beams. The transmitter 104 may include various ones of the features, components, or functionality of a computer device, including but not limited to mobile computer 200 of FIG. 2 and/or network computer 300 of FIG. 3.

The transmitter 104 may also include an optical system that includes optical components to direct or focus the transmitted or outgoing light beams. The optical systems may aim and shape the spatial and temporal beam profiles of outgoing light beams. The optical system may collimate, fan-out, or otherwise manipulate the outgoing light beams. The transmitter 104 may include a scanning arrangement that can scan the photons as a beam over the object 108.

The transmitter 104 individually scan regions (e.g., voxels) on the one or more objects 108. A voxel can be described as a sampled surface element of a 3D spatial manifold (for example, a 3D shaped surface.) In at least some embodiments, the voxel is relatively small and may be described as "pixel-sized." Sequential illumination of the voxels, coupled with sequential real-time pixel location detection by the receivers (e.g., cameras), can improve multiview 3D sensing systems. The performance of the systems is "turbo-charged" by the arrangement of a synchronized confluence of parallel streams of time-sequential pixel data flowing from multiple cameras. In at least some embodiments, these sequential pixel data flows are synchronized to the beat of a temporal reference provided by the reflections of a scanning laser probe beam of the transmitter 104.

Figure 15:
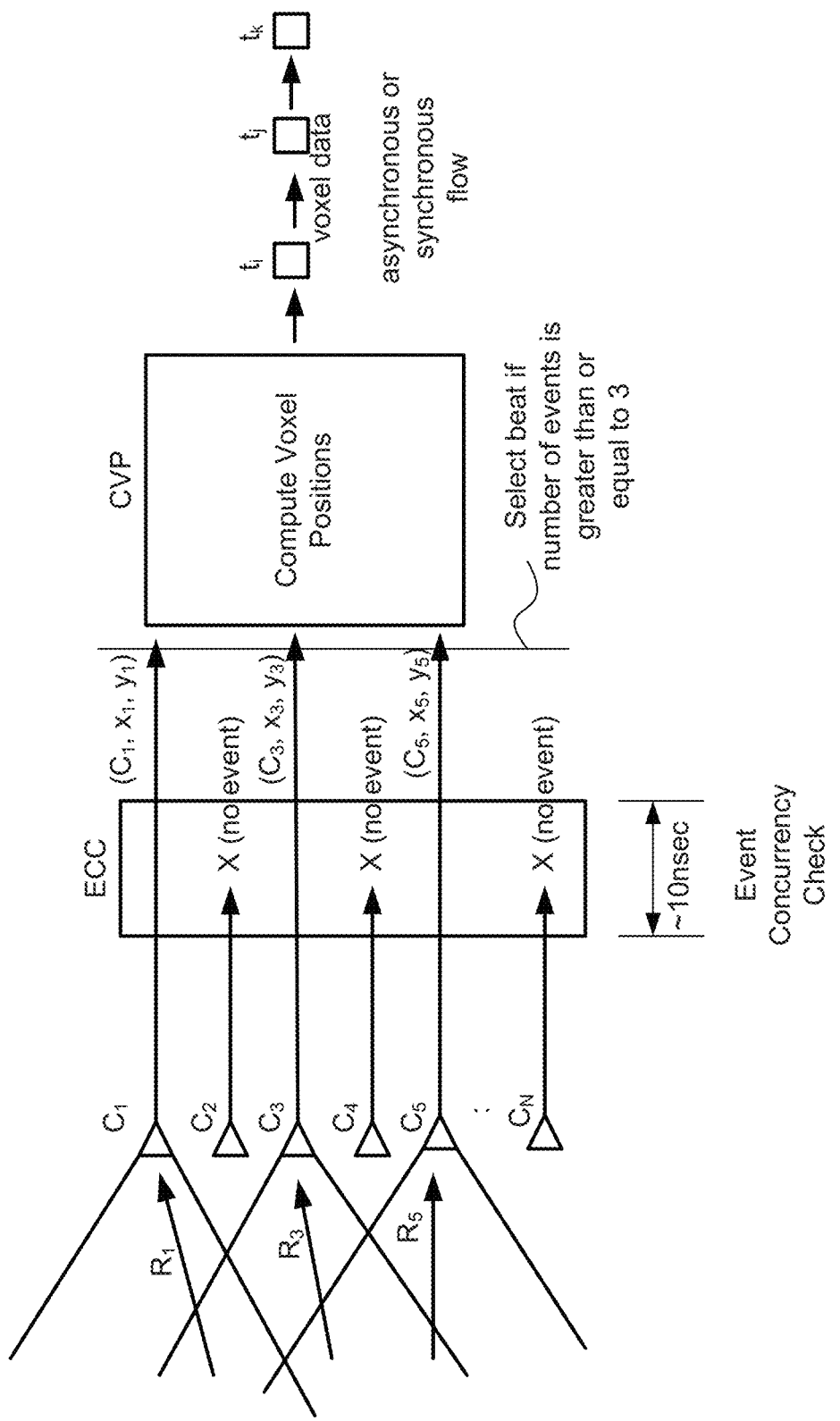
FIG. 15 illustrates an embodiment of an exemplary stochastically informed multi-view camera overlap system.

In at least some embodiments, optionally during calibration a sequence of short pulses are emitted by the transmitter, so that when the reflected signal is detected by the cameras, the "jitter" of the signal paths (for example, due to differences in sensors or the signal chain) can be determined by comparing the differential arrival times of each detection signal path at a central location (for example, in the event concurrency check (ECC) circuit illustrated in FIG. 15.)

The receivers 106a, 106b, 106c, 106d may include one or more photon-sensitive, or photon-detecting, arrays of sensor pixels. An array of sensor pixels detects continuous or pulsed light beams reflected from target 108. The array of pixels may be a one dimensional-array or a two-dimensional array. The pixels may include SPAD pixels or other photosensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by transmitter 104 and relatively insensitive to other frequencies. Receivers 106a, 106b, 106c, 106d can also include an optical system that includes optical components to direct and focus the received beams, across the array of pixels. Receivers 106a, 106b, 106c, 106d may include various ones of the features, components, or functionality of a computer device, including but not limited to mobile computer 200 of FIG. 2 and/or network computer 300 of FIG. 3.

Various embodiment of computer device 110 are described in more detail below in conjunction with FIGS. 2-3 (e.g., computer device 110 may be an embodiment of mobile computer 200 of FIG. 2 and/or network computer 300 of FIG. 3). Briefly, however, computer device 110 includes virtually various computer devices enabled to perform the various position determination processes and/or methods discussed herein, based on the detection of photons reflected from one or more surfaces, including but not limited to surfaces of object or target 108. Based on the detected photons or light beams, computer device 110 may alter or otherwise modify one or more configurations of transmitter 104 and receivers 106a, 106b, 106c, 106d. It should be understood that the functionality of computer device 110 may be performed by transmitter 104, receivers 106a, 106b, 106c, 106d, or a combination thereof, without communicating to a separate device.

In some embodiments, at least some of the position determination functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including transmitter 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In one or more of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between transmitter 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Mobile Computer

Figure 2:
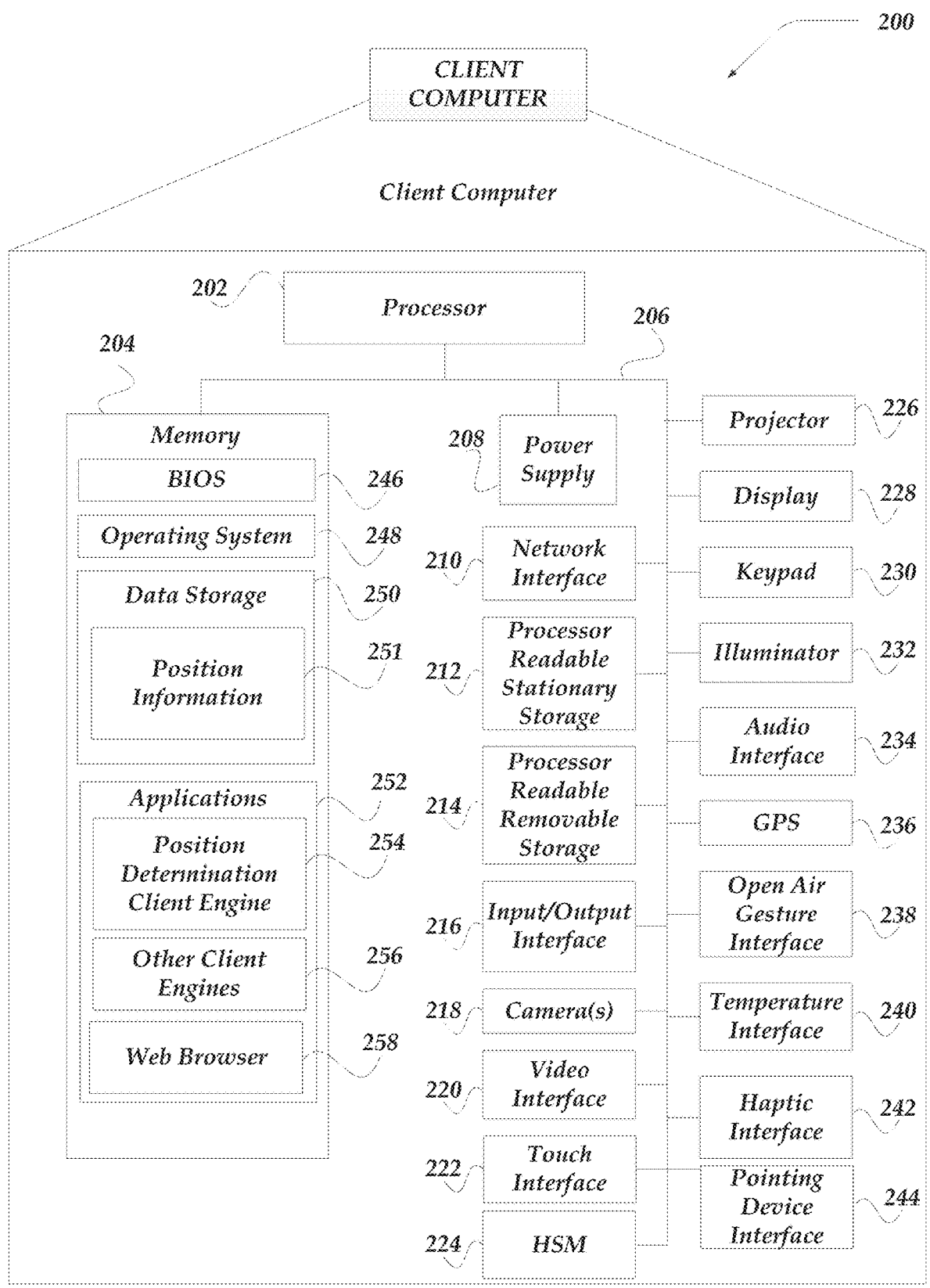
FIG. 2 illustrates an embodiment of an exemplary mobile computer that may be included in a system such as that shown in FIG. 1.

FIG. 2 shows one embodiment of an exemplary mobile computer 200 that may include many more or less components than those exemplary components shown. Mobile computer 200 may represent, for example, one or more embodiment of laptop computer 112, smartphone/tablet 114, and/or computer 110 of system 100 of FIG. 1. Thus, mobile computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer. And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (NIC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200. Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store position information 251. The information 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, position determination client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
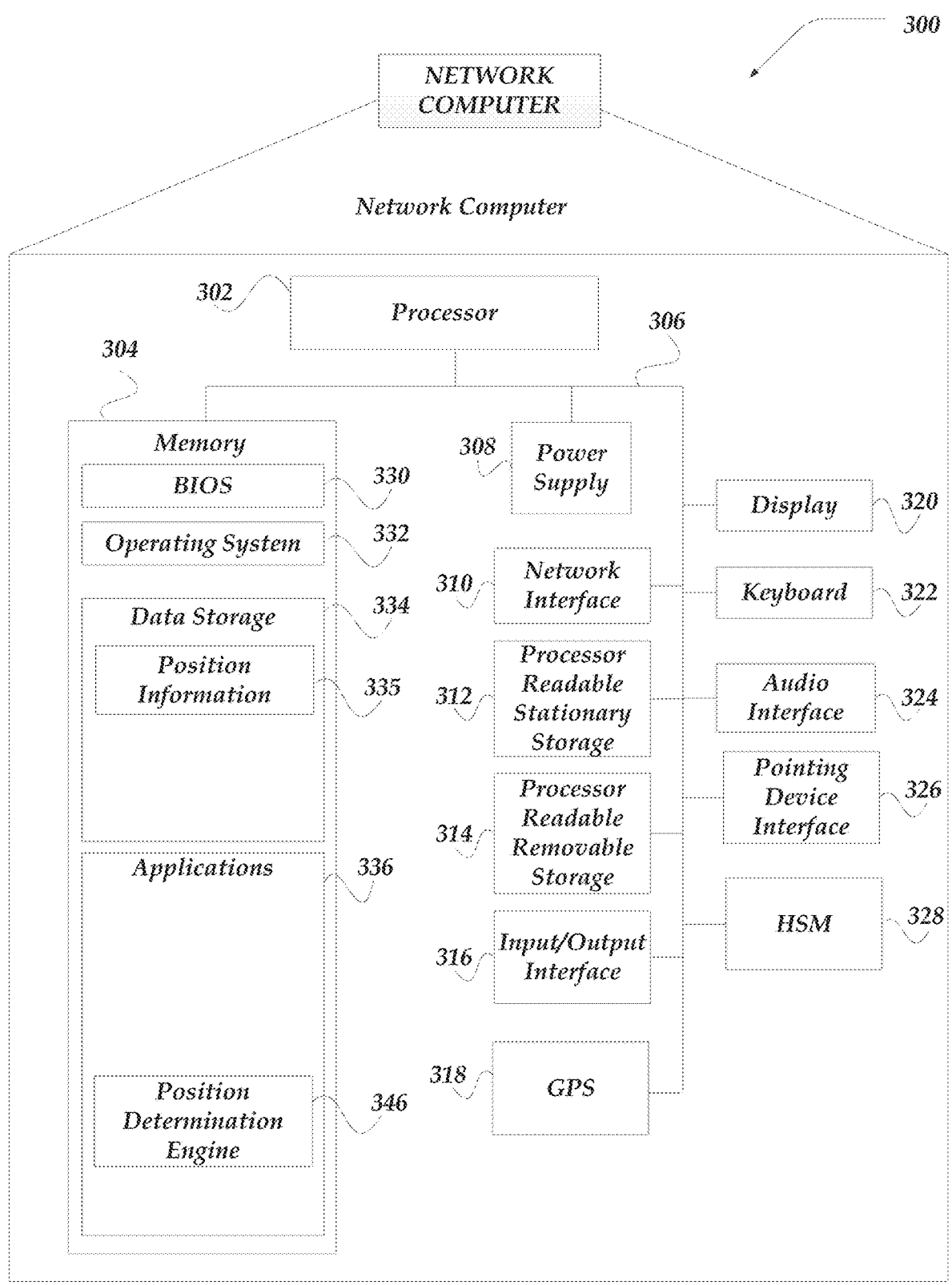
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store position information 335. The position information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include position determination engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, position determination engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to position determination engine 346 may be provisioned and de-commissioned automatically.

Also, in one or more of the various embodiments, position determination engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrated Systems

Figure 4A:
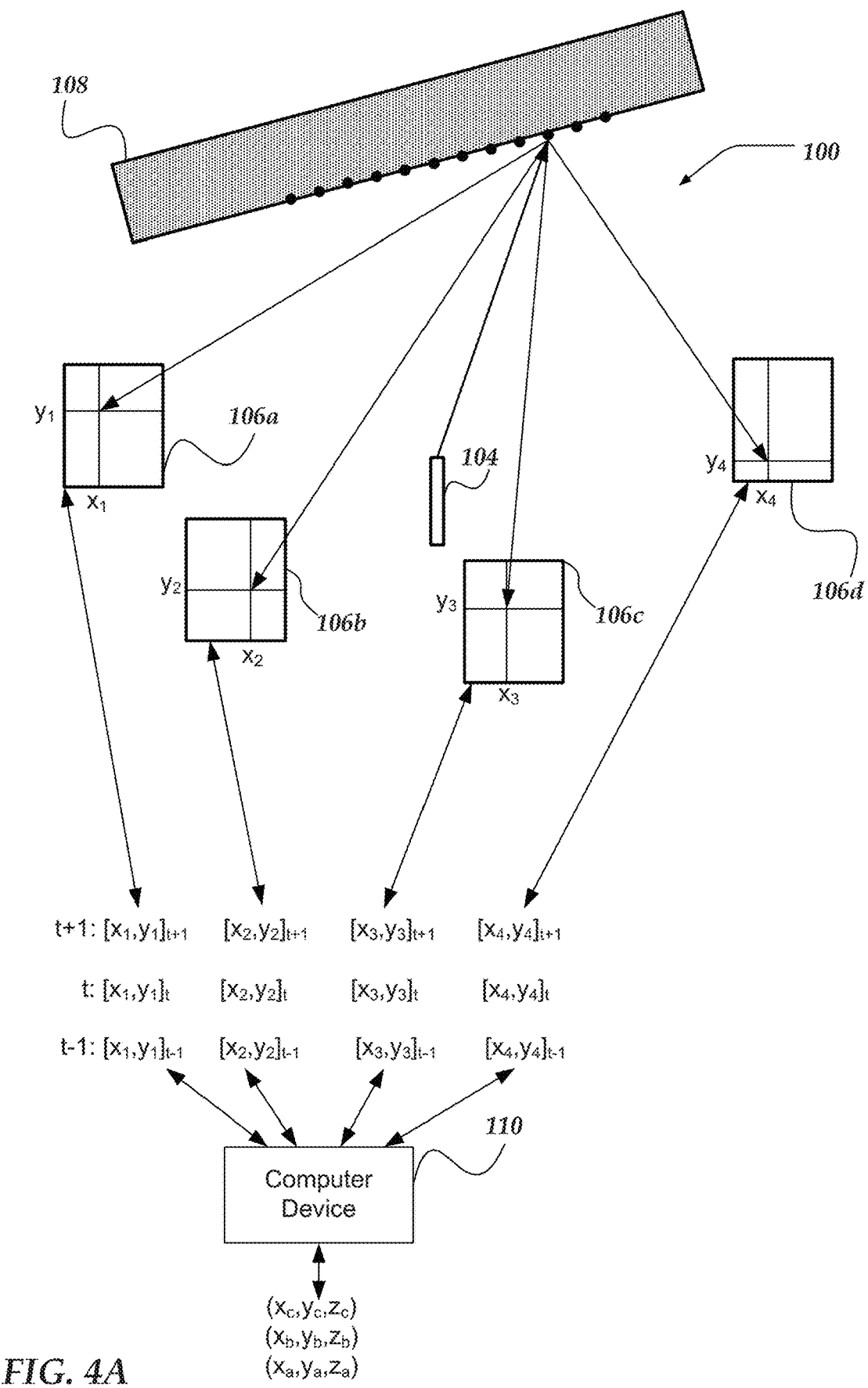
FIG. 4A illustrates an embodiment of a two-dimensional view of a portion of an exemplary position determination system.

FIG. 4A illustrates a portion of the system 100 including the transmitter 104 and cameras 106a, 106b, 106c, 106d. (The terms "camera" and "receiver" are used interchangeably herein unless indicated otherwise.) The system 100 sequentially illuminates one voxel of the one or more targets 108 at a time. As illustrated in FIG. 4A, the scanned voxel illuminations are captured or detected by multiple cameras 106a, 106b, 106c, 106d and cause several voxel-illumination-synchronized streams of pixel data to flow to a central processing system, such as system computer device 110 (FIG. 1). At each time period, t (or t+1 or t−1), which is associated with the illumination of a single voxel of the object 108, each of the cameras 106a, 106b, 106c, 106d detects light scattered from the voxel of the target 108 and provides a detection position, for example, $(x_i, y_i)$ for the i-th camera, in the array of the camera at which the light is detected. For example, at time t, four cameras 106a, 106b, 106c, 106d can produce a set of positions $[x_1,y_1]_t$; $[x_2,y_2]_t$; $[x_3,y_3]_t$; $[x_4,y_4]_t$ with similar sets at t+1 and t−1 and other time periods, as illustrated in FIG. 4.

Each time period, t, corresponds to a length of time during which illumination of a single voxel of the object 108 is expected to be received by each of the cameras. The length of the time period, t, may be selected based, at least in part, on a distance between the cameras. For example, a time period of 10 nanoseconds could be used for a set of cameras where the relative distances between the 4 camera centers is less than 10 feet (or less than 3 meters). In some embodiments, the time period, t, is selected so that a set of close-in-time detection events at multiple cameras can be associated with the illumination of a single voxel by the transmitter 104. In at least some embodiments, the time period, t, is at least 1, 5, 10, 15, 20, 25, 40, 50, or 100 nanoseconds or more. By sequentially and individually illuminating each voxel of object 108, each illuminated voxel is temporally associated with a set of spatially separated detection instances at multiple cameras. These detection instances can then be used to determine the position of the voxel. The voxels can be observed rapidly and individually.

The sets of detection positions are sent to a central processing system, such as system computer device 110, that combines these streams of detection positions from the multiple cameras and combines them computationally (for example, by a series of matrix multiplications) fusing the multiple pixel streams from the cameras (preferably with minimal latency) into a single voxel flow (for example, a flow of positions of the illuminated voxels of object 108 such as $(x_a, y_a, z_a)$ for voxel a of the object 108) which can then be directly fed into, for example, a down-stream perception system.

Figure 4B:
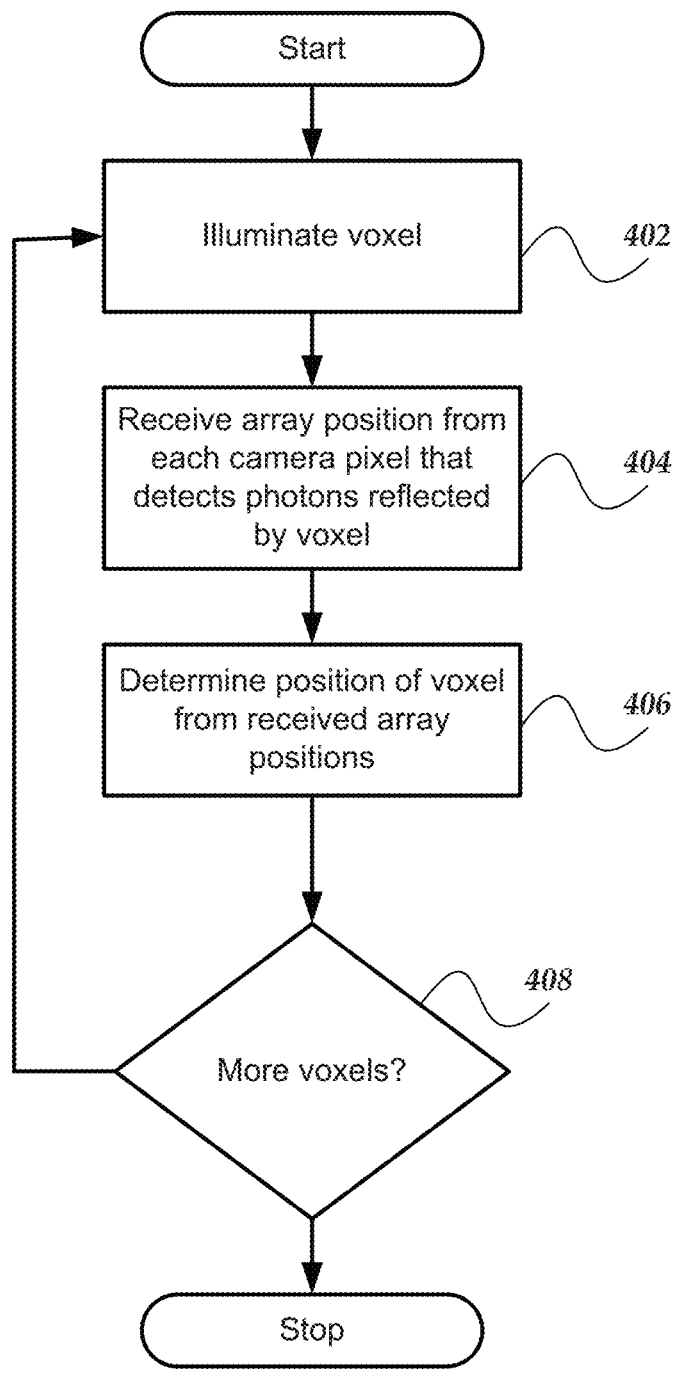
FIG. 4B illustrates an embodiment of a logical flow diagram for an exemplary method of position determination using sequential illumination.

FIG. 4B illustrates one embodiment of a method of determining the position of voxels. In step 402, the transmitter 104 illuminates the voxels of the object 108. The voxel reflects (or otherwise scatters) the light which is then received by the cameras 106a, 106b, 106c, 106d. In step 404, the system computer device receives array positions from the cameras for the pixels that detected photons reflected by the voxel. In step 406, the position of the voxel is determined from the received array positions. In step 408, it is determined whether additional voxels are to be observed. If so, steps 402-406 are repeated for each of the voxels. The process may automatically continue repeating as long as a sufficiency of pixels events (for example, three or more pixels twitching within the time period) are detected by the cameras.

Figure 5:
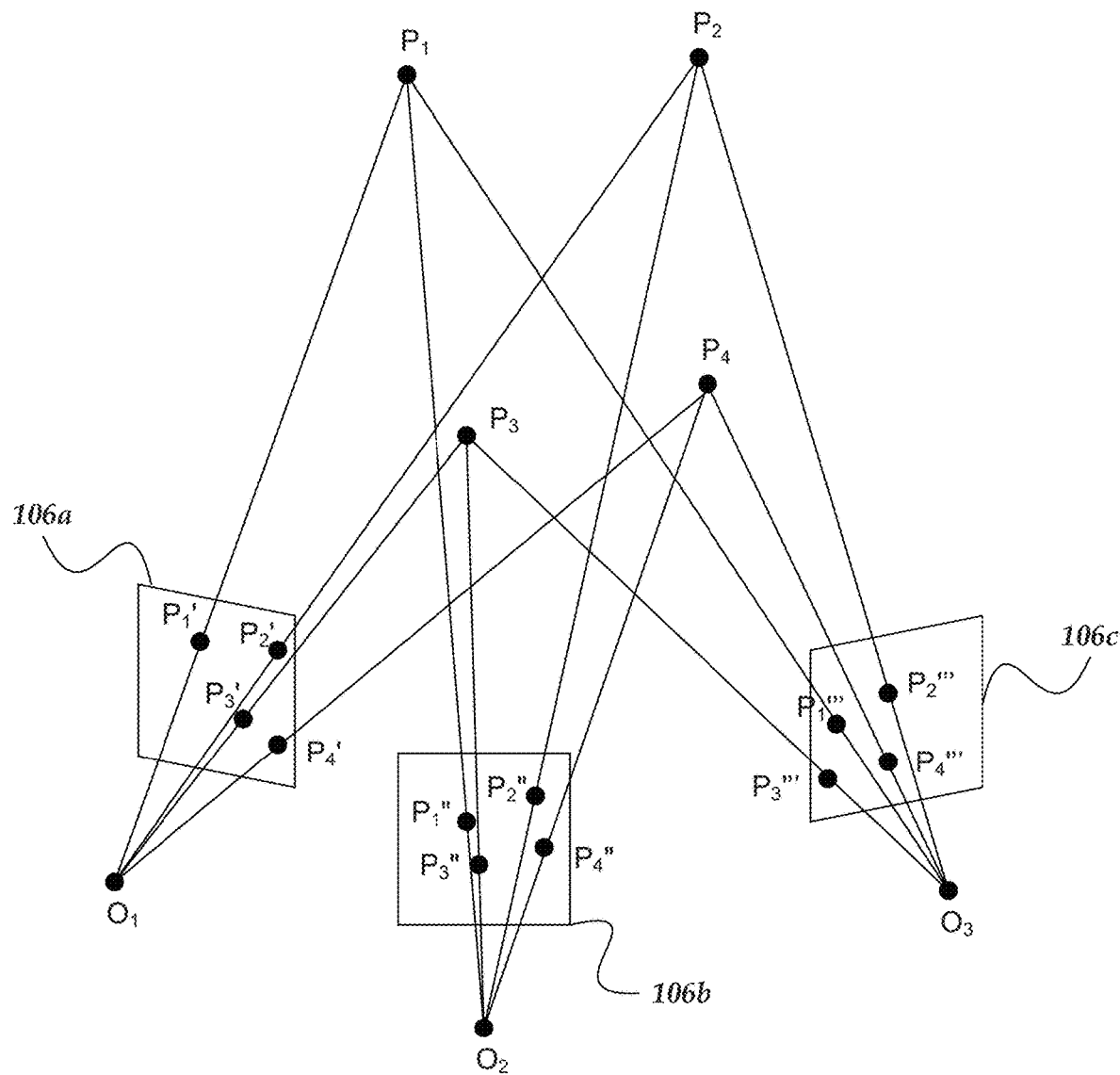
FIG. 5 illustrates an embodiment of illumination of four points and detection using three cameras.

FIG. 5 illustrates an arrangement with three cameras 106a, 160b, 106c where a scanning beam from a light source (for example, a narrowly collimated, pixel sized laser beam) scans across a certain volumetric spatial section (a scanning cone). A spatial manifold (a 3D shaped surface) of an object reflects at least a portion of the scanned trajectory. In FIG. 5, the scanning beam illuminates four points $P_1$, $P_2$, $P_3$ and $P_4$, at times $t_1$, $t_2$, $t_3$ & $t_4$ respectively. The four points on the 3D surface reflect a portion of the beam towards three cameras positioned with camera projection centers $O_1$, $O_2$ & $O_3$. From each point P there is one chief ray to each of these camera centers. There are twelve such chief rays. These chief rays project onto the cameras in twelve pixel locations: $P_1'$, $P_2'$, $P_3'$, $P_4'$, $P_1''$, $P_2''$, $P_3''$, $P_4''$, $P_1'''$, $P_2'''$, $P_3'''$ & $P_4'''$. These twelve discrete positions captured by three cameras are sufficient to derive the full positions of the camera centers and the four 3D points $P_1$, $P_2$, $P_3$ and $P_4$. As an example, these twelve sensor coordinates pairs are sufficient to derive a full trifocal tensor's 27 elements (a 3×3×3 matrix.)

This sequential illumination opens up a complexity-solving computational shortcut, as compared to conventional viewing, by eliminating the dense correspondence challenge, which has up until now been a computational bottleneck in multiview systems. In at least some instances of this voxel sequential system 100, adding additional cameras (or even redundant observers) may actually reduce computational complexity, increase system robustness and improve system accuracy, because the extra sensor data favor statistical and AI methods for determining the salient structural aspects of 3D reality, such as the appearance, motion, or shape of objects and surfaces, or any combination thereof. Note that by adding cameras to the system results in additional observations, making the system more robust and more accurate, while not requiring more illumination.

In at least some embodiments, the system 100 can deliver sharply defined 3D edges, as well as an object's 3D location, speed and acceleration, and can yield fine-grained voxel motion data that can be matched (for example, fused) with equally fine-grained image pixel data (for example, RGB image contrast functions) at state of the art camera resolutions.

In at least some embodiments, more pixels & perspectives (e.g., cameras or receivers) result in a more robust perception of 3D reality. The extra data streams provided by the incremental perspectives can enable a new level of computational determinism. In at least some embodiments of the system 100, adding additional views (e.g., cameras or receivers) results in a high degree of overlap between views. This overlap can reduce occlusions, improve camera pose estimation and object motion tracking, improve motion continuity and reduce system noise, such as quantization errors and other sampling artifacts.

By streamlining the dataflow and removing bottlenecks upstream, the system 100 can utilize higher resolution cameras and employ a greater degree of overlap in camera perspective. The degree of overlap, i.e. number of cameras simultaneously viewing an illuminated voxel in the 3D view space, is automatically established for each illuminated voxel. The system's perceptual advantage over many conventional systems makes intuitive sense: in traditional multiview set ups, each of the digital cameras reduces subtle, continuous (analog) 3D light fields into simplistically discrete and coarsely rastered Bayer pattern mosaics of 2D color contrast, thereby inherently introducing a host of quantization errors along the way. In addition, any high-speed relative motion between sensed objects and the cameras causes blur and sensor noise. Calibration drift or imperfect optics will introduce further systematic errors.

In a pixel sequential illuminated system, such as system 100, each voxel is illuminated by the scanning laser for only a limited time, for example, 1-10 nanoseconds. This ultra-short intense illumination exposure may eliminate motion blur and photon starvation, allowing the system to track features with high spatial as well as temporal resolution. For example, in at least some embodiments it is possible to observe rotational speeds of up to 1 million degrees per second ($\frac{1}{100}^{th}$ Degree Rotation/observed over a period of 10 nanoseconds).

The matching of the observed pixel locations across multiple cameras yields N simultaneous (or nearly simultaneous) perspectives for every sequentially illuminated voxel. Using this arrangement, the system 100 can efficiently achieve extremely accurate 3D position detection at high voxel data rates.

Adding more cameras adds additional perspectives. These additional simultaneous observations can reduce sampling errors. In at least some embodiments, the added cameras do not require set-up or any particular alignment or calibration. In at least some embodiments, the camera positions are not required to be geometrically stable over time. They may be, for example, attached to deformable or vibrating structures, such as wings or frame struts.

In at least some embodiments, internal calibration of the cameras can be achieved with additional point observations. In at least some embodiments, internal (intrinsic) characteristics of the cameras (optics and distortions) do not need to be known in advance. With more observations, such characteristics can be determined.

In at least some embodiments, the system 100 enables moving observers as the cameras or receivers (for example, small swarm of flying camera-equipped quadcopters). These moving cameras can be used to observe a complex dynamic 3D scene lit up by a scanning probe beam (where spots of the 3D scene are sequentially illuminated) and to accurately map such a 3D scene in detail at a detection speed of, for example, 100 million voxels per second (or faster or slower detection speeds which may be related to the time period, t, associated with each voxel).

In general, the system 100 contains N cameras (or other light receivers or detectors) where N is at least two or three and can be four, five, six, seven, eight, ten, twelve, fifteen, twenty, or more or any other number. The system 100 includes a transmitter 104 with a light source, such as one laser beam, illuminating a field of view using a ray of photons beaming out and traversing a section of space. This ray or beam of photons has an instantaneous pointing direction, for example, defined by two coordinates, an azimuth angle ($\alpha$) and an elevation angle ($\varepsilon$). These two angular coordinates might be (i) controlled by the scanning system or (ii) they might be observed (tracked) by some kind of visual feedback loop such as described in, for example, the U.S. Pat. Nos. 8,282,222, 8,430,512 and 8,696,141, all of which are incorporated herein by reference in their entirety, or (iii) these coordinates might neither be controlled nor tracked. In at least some embodiments, in any camera's view at any one time there is only one illuminated spot which arises as a reflection of the laser beam by a region (e.g., a voxel) on the surface of the object 108. The system preferably operates so that at any one instant at most one position P(t) in space (for example, on region or voxel on the object 108) reflects the probing beam. Any of the N cameras might observe this reflecting beam at point P, if that point falls within this camera's field of view and assuming the light reflected in its direction is strong enough to be detected, i.e. a sufficiency of photons reaches at least one of the camera's pixels.

In at least some embodiments, each camera is configured to detect the light instantaneously or nearly instantaneously (for example, in a time that is no more than $\frac{1}{10}$ or $\frac{1}{100}$ of the time period, t, described above.) Any suitable camera can be used including any suitable pixelated camera. Examples of pixelated cameras include, but are not limited to, pixels arranged as a Spatio-temporal Sorting Array (SSA), for example, an array of fast asynchronous SPAD (single-photon avalanche diode) pixels, that record both the direction and the time of arrival. Examples of SSA arrays can be found in U.S. Pat. Nos. 8,282,222; 8,430,512; and 8,696, 141, all of which are incorporated herein by reference in their entirety. A Spatio-temporal Sorting Array can be analogized to a camera having a detector array positioned in the focal plane of an imaging system that spatially quantizes incoming ray directions, matching small bundles of incoming directions with individual pixels. The SSA may in fact he a camera with a 2D array of pixels or alternatively any of the asynchronous sensing arrays as described in U.S. Pat. Nos. 8,282,222; 8,430,512; 8,696,141; 8,711,370; 9,377,553; 9,753,126 and U.S. Patent Application Publications Nos. 2013/0300637 and 2016/0041266, all of which are incorporated herein by reference in their entirety. A camera includes at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), complementary metal-oxide-semiconductor (CMOS) devices, silicon photomultipliers (SiPM), photovoltaic cells, phototransistors, twitchy pixels, or the like. A photon detector may detect one or more incoming light beams. U.S. Pat. No. 9,753,125, incorporated herein by reference in the entirety, describes "twitchy pixels" as sensor array pixels that provide a nearly instantaneous signal output once a photo current exceeds a minimal level. For example, in at least some embodiments, a "twitchy pixel" can be a photodiode connected to a source follower or other circuit that instantly amplifies the photodiode's current. The amplified signal is in turn connected to a sensing line. The sensing line may be a shared function between a whole column or row of such "twitchy pixels." The basic 'twitch' function of the pixel is binary; its primary function is to report when and/or where signal photons have arrived in the camera. Preferably, the pixels of the camera are "twitchy pixels" or CCD, APD, SPAD type pixels that are highly sensitive can detect, or "trigger on" the arrival of a few photons or even a single photon.

The beam may be illuminated continuously, scanning the surfaces of objects within the beam's FoV to traverse these 3D manifolds in space. In at least some embodiments, the scanning beam may scan 3D surfaces very rapidly, optionally in a pseudo-random fashion, but traversing space in the FoV in a continuous smooth scanning fashion.

Alternatively, the illumination of the beam might be pulsed in a rapid and intense fashion. For example, non-continuous sweeps might be used, probing "pinpricks" or pulses of light randomly in space or in specifically chosen directions or using foveation around a certain direction of interest, such as, for example, a quad copter's flight path, or using any other regular or irregular pattern. An example of a fast non-continuous scanning system is a phased array (for example, a MEMS ribbon Optical Phased Array)

As an example, at 10 nanosecond intervals a short 100 ps burst of photons might be sent out by a scanning mechanism (Transmitter $T_x$), such as transmitter 104. The reflected pulses are confined to a known interval (for example, 100 picoseconds (ps)) and are matched uniquely to a single pixel in the array.

The cameras sequentially report the locations of the pixels as the pixels detect the light reflected from successive illuminated voxel locations. In some embodiments, the reported data from the pixel or camera might be minimal and binary, such as, for example only reporting the pixel location (for example, a column number and a row number). In other embodiments, the data flow can be richer including, for example, a time stamp for when individual pixels detected the photons. In at least some embodiments, these time stamps would facilitate out-of-order post-processing of the data downstream or provide for more accurate motion interpolation.

Additional data that might be obtained from the cameras could include intensity or other information for each primary color (or for some other set of colors). This additional information might be captured in the form of, for example, analog values, such as amplified photo diode voltages or currents serving as proxies for light intensities (photon number or instantaneous peak photon current intensity or "grey scale"), and, optionally, observed color intensity values (R, G, B, and/or M, C, Y, and/or one or more NIR wavelength(s)).

In at least some embodiments, the receiving system, such as computer device 110, receives this data or information nearly in real time (for example, within nanoseconds) after each observation event. As an example, camera 1 detects the arrival of a sufficiency of photons at a pixel at row j, column i of the camera at time t, with, optionally, primary color intensities for red, green, and blue (or other set of colors or wavelengths). In at least some embodiments, the data from the camera may consist of detection vectors [camera #, i, j, t, r, g, b] where the six values might be one or more bytes of data each.

Figure 6A:
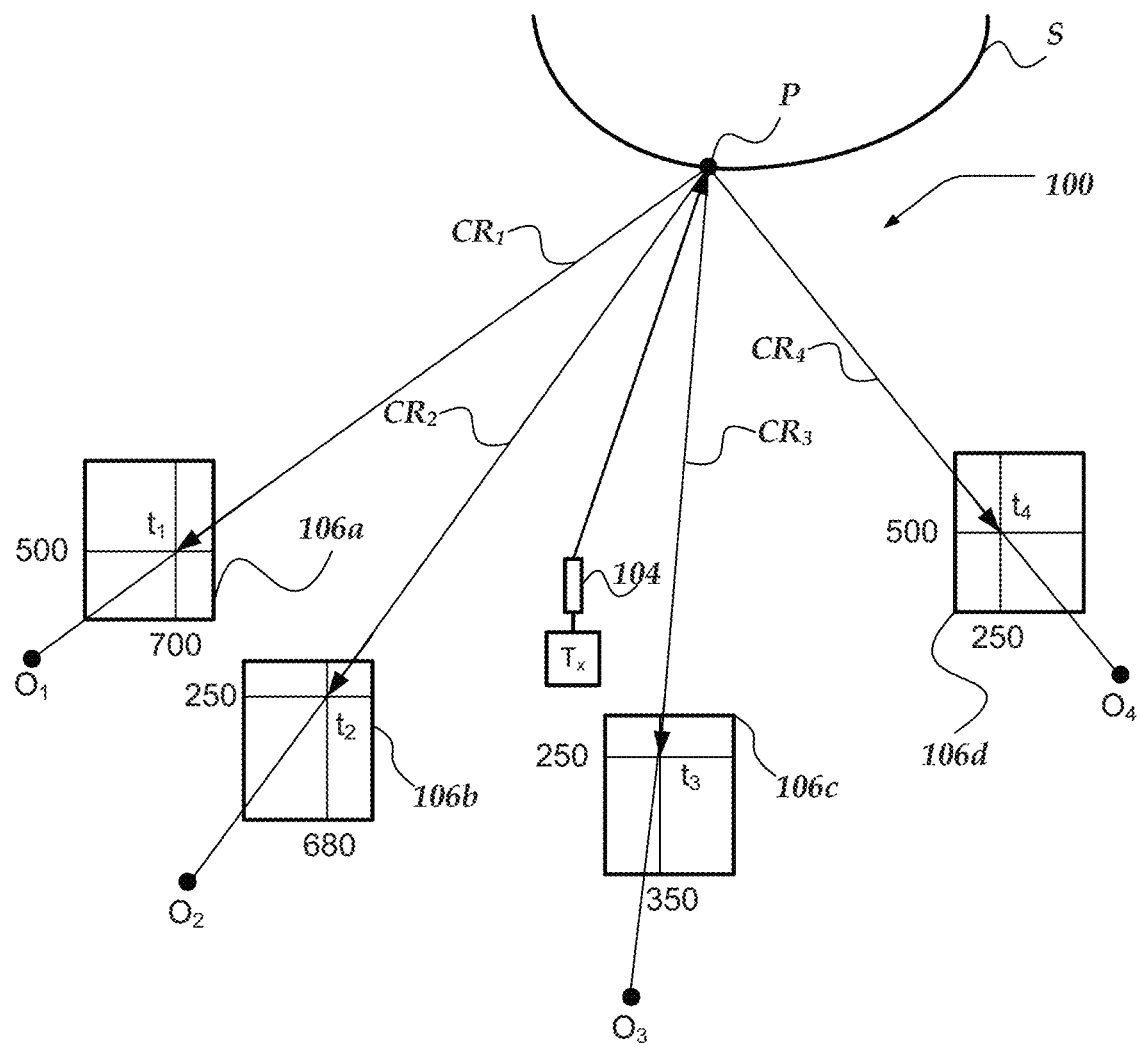
FIG. 6A illustrates an embodiment of a two-dimensional view of a portion of an exemplary position determination system showing exemplary array position vectors.

FIG. 6A illustrates one embodiment of a portion of system 100. A tightly collimated laser probe beam (or other light source), generated by a scanning transmitter 104, intersects a position P on surface S. Photons delivered by the beam reflect (for example, in a Lambertian fashion) in all directions at t=0. Four cameras positioned at projection centers $O_1$, $O_2$, $O_3$, and $O_4$ each capture a small bundle of photons from each of these reflections a few nanoseconds later. Each bundle has a chief ray (CR) entering the center of the aperture of each of the four cameras. $CR_1$ enters the first camera and lands on column number 700 & row number 500, at $t_1$. The other three cameras similarly record events within a 10-nanosecond window.

Thus, light reflected from spot P on surface S is detected by four cameras generating four vectors:

Camera 1: (#1, 700, 500, $t_1$)
Camera 2: (#2, 680, 250, $t_2$)
Camera 3: (#3, 350, 250, $t_3$)
Camera 4: (#4, 250, 500, $t_4$)

The first value is the camera number, the second value is the column number, the third value is the row number, and the fourth value is the time-of-arrival. The four time stamps in this example are within 10 nanoseconds from each other because the relative distances between the 4 camera centers is less than 10 feet. Note that such a four-camera configuration inter-camera differential-time limit would most likely hold for a system arranged on even a large vehicle. In most cases the relative distance between cameras would be less than 5 feet, so that photons observed can be associated with a unique voxel illumination period of 5 nanoseconds. So, any photons observed in the four cameras can be unambiguously associated with individually, sequentially illuminated voxels even at a rate of 100 million voxel per second.

The relative orientation and positions of the cameras determine all three variables. The cameras' relative orientation towards the observed point P is given by the azimuth and elevation of the chief ray reflecting from point P with respect to the cameras' current central optical axis. In FIG. 6A, pixel positions are counted from the top-left pixel indicated (0,0) in each of the sensors. Any relative time delays which are observed represent the difference in ToF (Time of Flight) times (feet per nanosecond) required for the photons to travel from the reflection voxel at point P on the surface S to the pixels in each of the four cameras. Even without knowing the departure time of the photons that ended up illuminating the voxel at point P, the relative ToF differentials may inform directly on the relative distances of each of the cameras from point P.

Note that in the specific case of a simple fast scanning LIDAR (as described in, for example, U.S. patent application Ser. No. 15/799,149, which is incorporated herein by reference in its entirety), the distances from point P to the cameras can be estimated because the orientation of point P is known and thus the implicit departure time of a pulse during the most recent fast scan trajectory of the light source as driven by the scanning transmission system $T_x$ is also known. The particular departure time can be estimated. It is the most recent moment of transmission of light transmitted by the light source and the transmission system $T_x$ in the direction of point P. Conversely, if, for example, SPADs are used in the cameras, then very accurate pulse arrival times would be available, with picosecond precision. The relative distances can be determined with great accuracy, in centimeters, rather than in feet. This would inform on the whereabouts of each of the cameras at the time of observation. As a practical matter, the relative motion between the four observers may be negligible over the nanosecond observation interval.

Figure 6B:
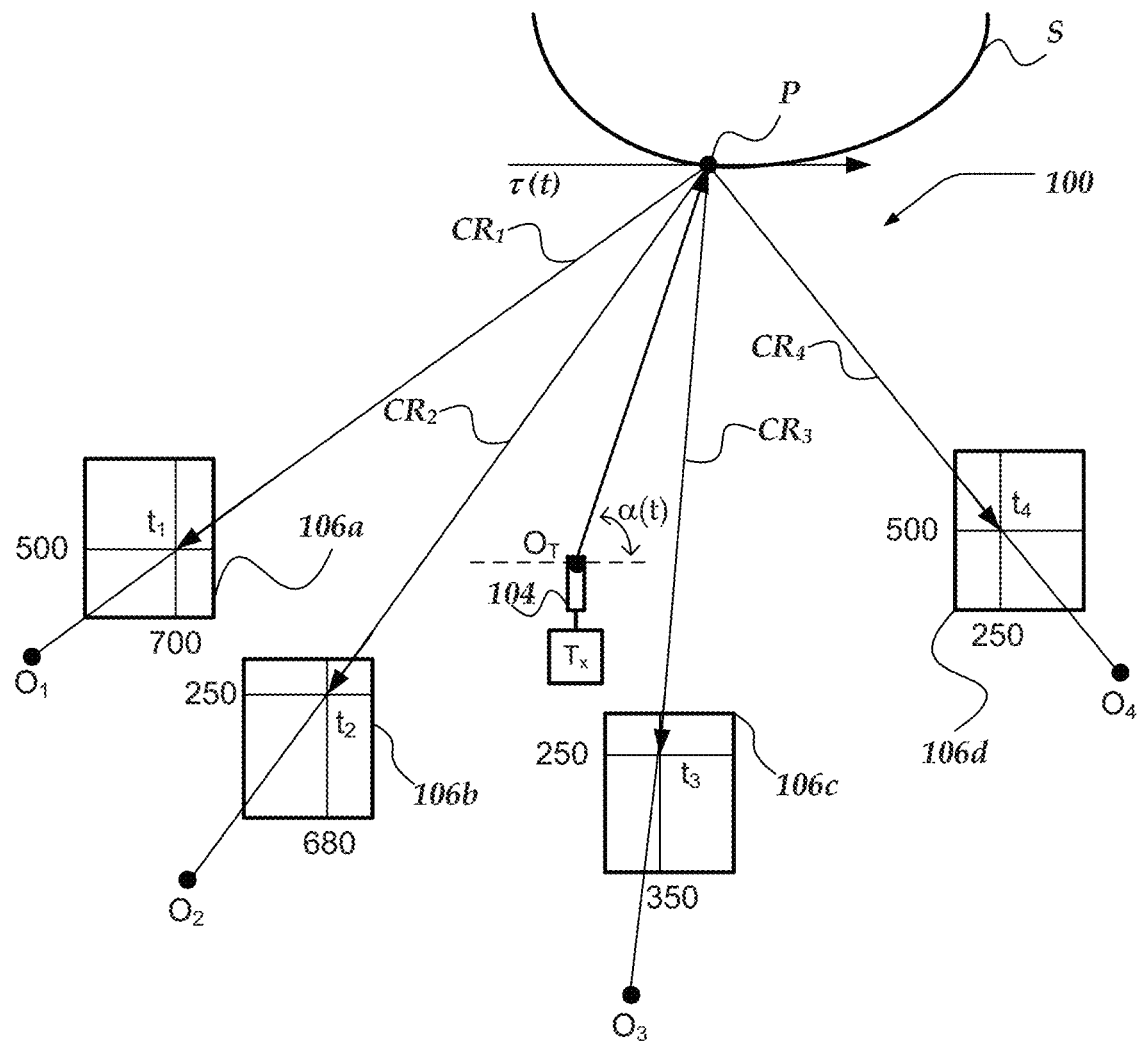
FIG. 6B illustrates another embodiment of a two-dimensional view of a portion of an exemplary position determination system showing exemplary array position vectors.

In the four view system denoted in FIG. 6B, the scanning transmission system $T_x$ 104 and its light source scans a spatial trajectory $\tau(t)$ as a function of time t. The position of Tx 104 and the light source is either known ex-ante or can be calculated with geometric methods such as the Trifocal tensor method, treating $T_x$ 104 and the light source as the equivalent of a fifth camera with a projection center $O_T$, where the direction of each transmitted ray is known from electronic feedback and controls of $T_x$ (as compared to a camera where the direction of each received ray is determined by a pixel position in the sensor). Thus, by geometric methods as described elsewhere the position of $T_x$, $O_T$ can be determined, as well as the position of P, $O_1$, $O_2$, $O_3$ and $O_4$. For the most recent scan trajectory $\tau(t)$ there is a unique scan direction $O_tP$ corresponding to a certain fast optical scan angle $\alpha(t)$ at a certain unique time t. The latter time t is the time of departure $t_d$ for any of the photons later observed by the four receiving cameras, arriving at times $t_1$, $t_2$, $t_3$ and $t_4$.

If the relative location of P, and thus the direction $O_tP$ is known from the geometric calculation, these calculations can be refined by a very precise ToF method as follows: by pulsing the light source with picosecond precision coinciding with the moment the scan direction of $T_x$ happens to be aligned optically precisely with the known position of point P. The light source brief (picosecond duration) pulse burst departure time will be known in picoseconds, and after reflection at point P the four arrival times will be equally resolved in picoseconds (for example) by the firing of four 'twitchy pixels" (SPADs or new SiPM type APS avalanches can be timed accurately in picoseconds).) Therefore, the distances travelled by the four chief rays ($CR_{1-4}$) can be calculated to the inch (ToF clock accuracy in 1 ns≈1 foot (about 0.3 m), in 100 ps≈1 inch (about 2.54 cm))

In at least some embodiments, a pixel sequential illuminated system, such as system 100, can eliminate or reduce the observational ambiguity inherent in many conventional illuminated systems (such as structured light or passive stereo systems employing a full 2D frame or 1D whole scan line with structured i.e. coded illumination). In at least some embodiments, each additional point observation (for example, each additional camera or other receiver) adds knowledge that can be used to enable the system to self-calibrate the camera's position, orientation and intrinsics.

In at least some embodiments, with millions of scan points per second, the point sequential illumination system, such as system 100, may rapidly converge on and rapidly and efficiently reveal, the observable invariance—the observable patterns, the rigid or deformable structures—of reality.

In at least some embodiments, for the purpose of machine vision, computational approaches such as Convolutional Neural Nets (CNNs) can learn easily from these resulting rich, unambiguous data streams from the cameras. Training these CNNs with millions of sequential observations of invariant spatial geometry, these novel machine vision approaches will rapidly converge on a 3D solution with precision.

In at least some embodiments, advantages of point sequential illumination, such as obtained using system 100, may include one or more of a) the elimination or reduction of motion blur, which in conventional systems severely limits spatial measurements, and b) the additional degree of motion estimation precision due to the fact that time is measured at a much higher degree of resolution, to the order of nanoseconds (the exposure time of a single individual pixel). Thus, a procedure or algorithmic approach for tracking moving objects or estimating non-rigid (deformable) time-variant 3D surface geometry and motion may be more precise when voxel sequential illumination is added.

In at least some embodiments, adding additional cameras eliminates or reduces occlusion problems. More observers (e.g., cameras or other receivers), resulting in more observations, make the system more robust to occlusions. Intuitively, the more viewpoints there are in the system, the more likely it is that there will be a sufficiency of cameras to observe any one point of the surface. It is possible that deep crevices and craters may still end up occluded.

In at least some embodiments, a pixel sequential illuminated system, such as system 100, establishing precise pixel-level correspondences may be relatively easy. Over a short enough instance of time all incoming rays originate from the same voxel in 3D space. In at least some instances, simultaneously observed events or nearly simultaneously observed events, within a span of a few nanoseconds, yield a complete coordinate set with the positions and orientations of the cameras and the 3D coordinates of the observed points (i.e., voxels on the object).

In at least some embodiments, as more cameras are added to the system, more perspectives are simultaneously captured, less occlusions occur, surfaces may be scanned faster and with greater motion fidelity, and details may be scanned at shorter and shorter intervals. With more cameras, more photons are captured from the same voxel illumination which may yield greater signal accuracy and greater certainty or confidence to the observation. 3D scans of non-deformable surfaces, such as interior walls, buildings and streets, cumulatively add finer details and therefore their resulting 3D point cloud images rapidly gain fidelity.

Figure 7A:
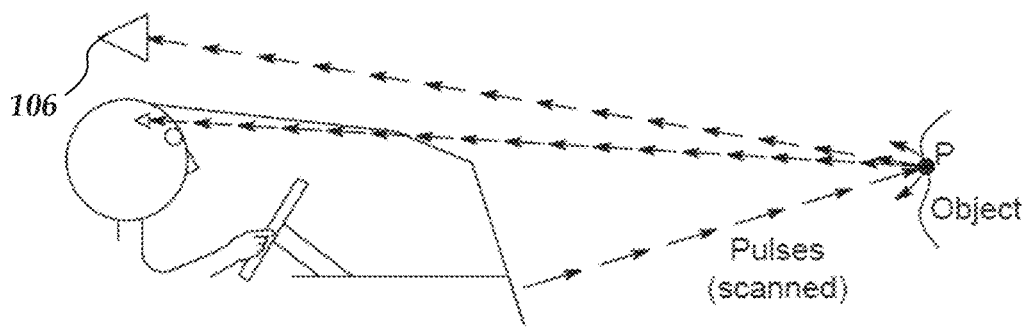
FIG. 7A illustrates an embodiment of an exemplary position determination system in a motor vehicle.
Figure 7B:
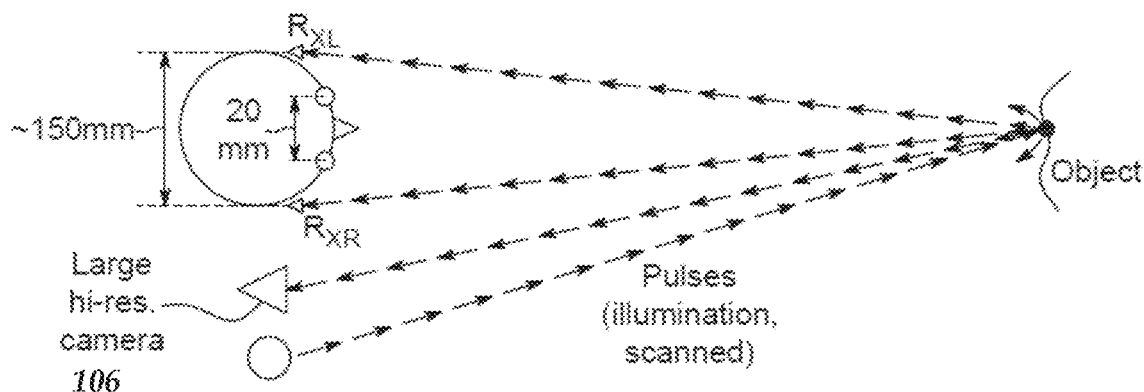
FIG. 7B illustrates another embodiment of an exemplary position determination system in a motor vehicle.
Figure 7C:
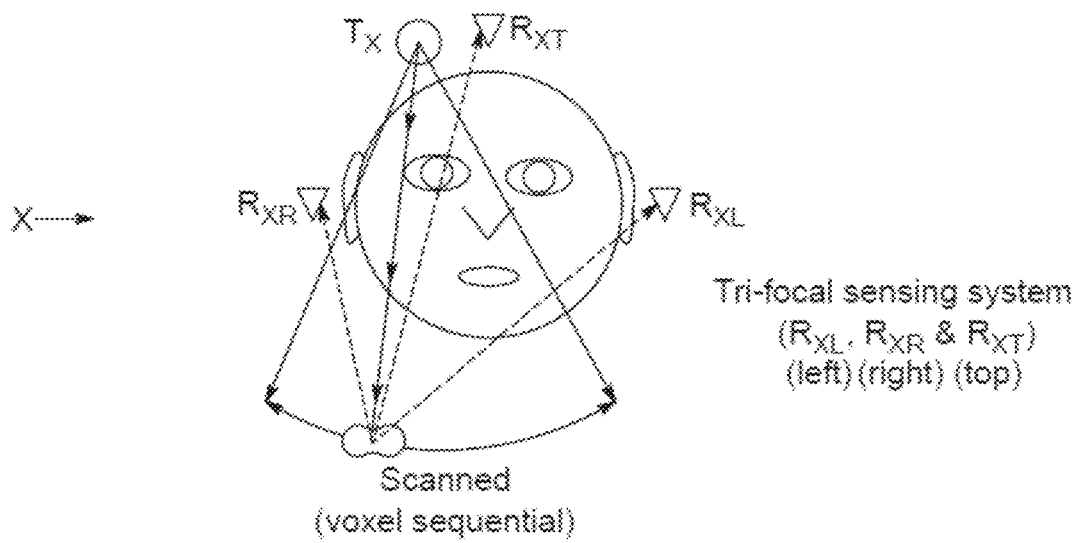
FIG. 7C illustrates a third embodiment of an exemplary position determination system in an Augmented Reality (AR) type Head Mounted Display (HMD) system.

FIGS. 7A-7C illustrate one exemplary embodiment of a pixel sequential illuminated system. In FIG. 7A (a side view) the driver is looking through his vehicle's window at an object in the path ahead. A scanning laser beam (from a transmitter) illuminates a point P on the object. The driver is wearing a head-mounted display device (HMD) such as a headset which may project stereoscopic images onto a retro-reflective surface visible via reflection on the inside of the vehicle's driver side window. (The projected stereo imaging path is not shown in FIG. 7A). This use of a wearable device to create an AR HUD, is analogous to a configuration shown in, for example, FIG. 15E of U.S. Patent Application Publication No. 2017/0208292, which is incorporated herein by reference in its entirety. The wearable device in that figure depicts head tracking with fiducials inside the driver's cabin, and uses a Hi-RES machine vision camera to observe the road ahead. The new system described herein has beams that illuminate the world outside voxel-by-voxel.

Two cameras ($R_{xL}$ and $R_{xR}$, FIG. 7B) also mounted on either side of the driver's eyes see a wide-baseline view of illuminated voxel P on the object. Above the driver is a third high-resolution camera 106 that also can see the road ahead. The third camera also notes the position of Voxel P in its high-resolution sensor's reference plane. There are in total three views of voxel P, thus after four such points have been illuminated on object, both the objects position (the position of a series of voxels on the surface of the object) and the position of the headset and the hi-resolution camera are known, rendering a fairly accurate orientation of the head gaze of the driver and his/her instantaneous perspective (the perspective of his HMD) of the object. Thus, the system can position labels such as warnings (for example, "Look out here!") accurately in the 3D view volume of the user. It will be recognized that other camera arrangements can be used.

FIG. 7B shows a top view of the same arrangement with the high-resolution camera mounted in a high central location such as in front of the rear-view mirror. Alternatively, this camera or an array of cameras might be mounted on top of the vehicle for a more unobstructed view of the environment. FIG. 7C shows an Augmented Reality type headset with a built-in 3D camera, ($R_{xT}$), so that there are in fact three cameras observing the view ("looking along" with the wearer) and this view might be foveated, the scanning system's foveation being driven by the wearer's attention and gaze, being tracked by eye tracking sensors in the headset.

Figure 22:
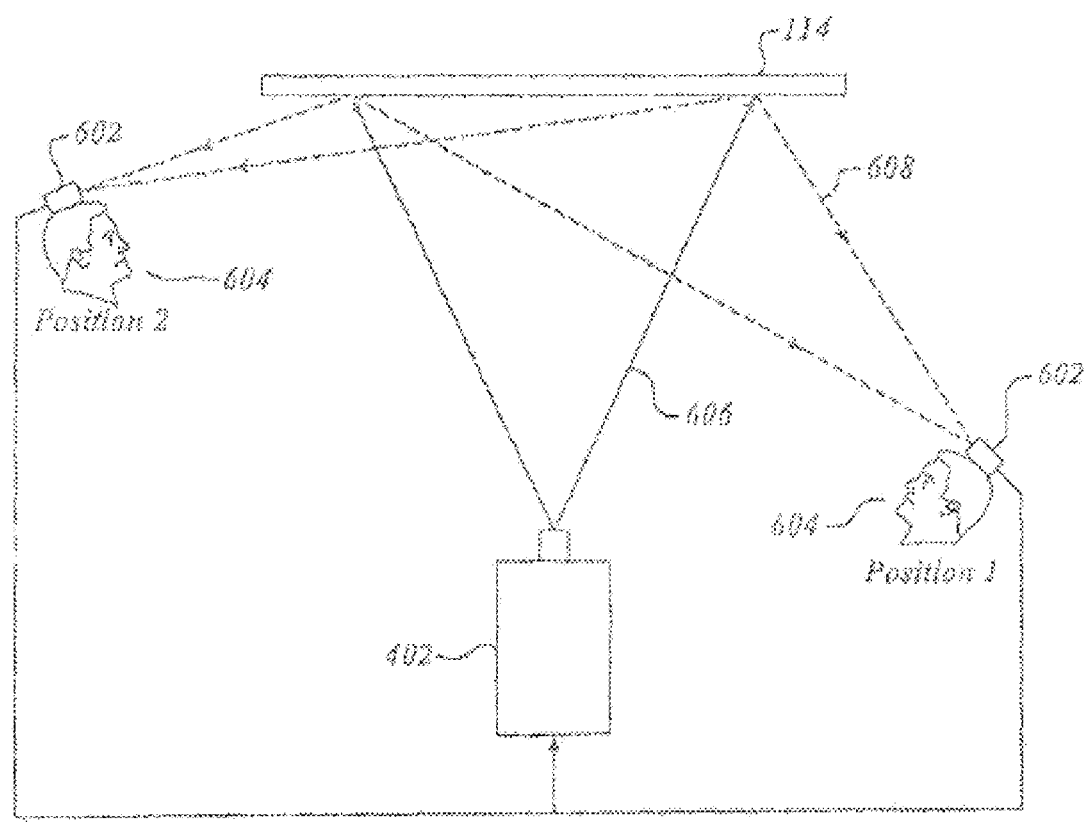
FIG. 22 illustrates an embodiment of an application of a projector that projects a scanned pattern on a surface and the pattern being observed from different camera perspectives.

FIG. 22 illustrates a head worn camera 602, which enables the determination of the relative position of a viewer 604 in space with respect to the projection from a projector 402 (and projected image beam 606) on a surface 114 using reflected beams 608.

It is possible to employ multiple scanning beams. In at least some embodiments, care is taken to avoid ambiguity of two or more spots simultaneously appearing in relatively close proximity on any part of a manifold (object) surface, causing the scan trajectories to overlap in space and time, the reflections of two spots being harder to distinguish in the cameras' planes. In some embodiments, when using multiple illumination spots, the search beam-like trajectories should not scan the same surface locally; the scanned spot trajectories should not cross each other. When and where trajectories overlap, causing "collisions" in the camera plane, these "collisions" can be detected, and one of the beams can be temporarily extinguished, e.g. by a control system feedback loop. Multiple beams can be employed to reach and reflect from the object's surface at different angles, e.g. to avoid shadows or occlusions. In order to fully avoid the multi-beam detection ambiguity, they may be, for example, duty cycled (for example, given alternating time slots or any other suitable temporal arrangement.)

Figure 8:
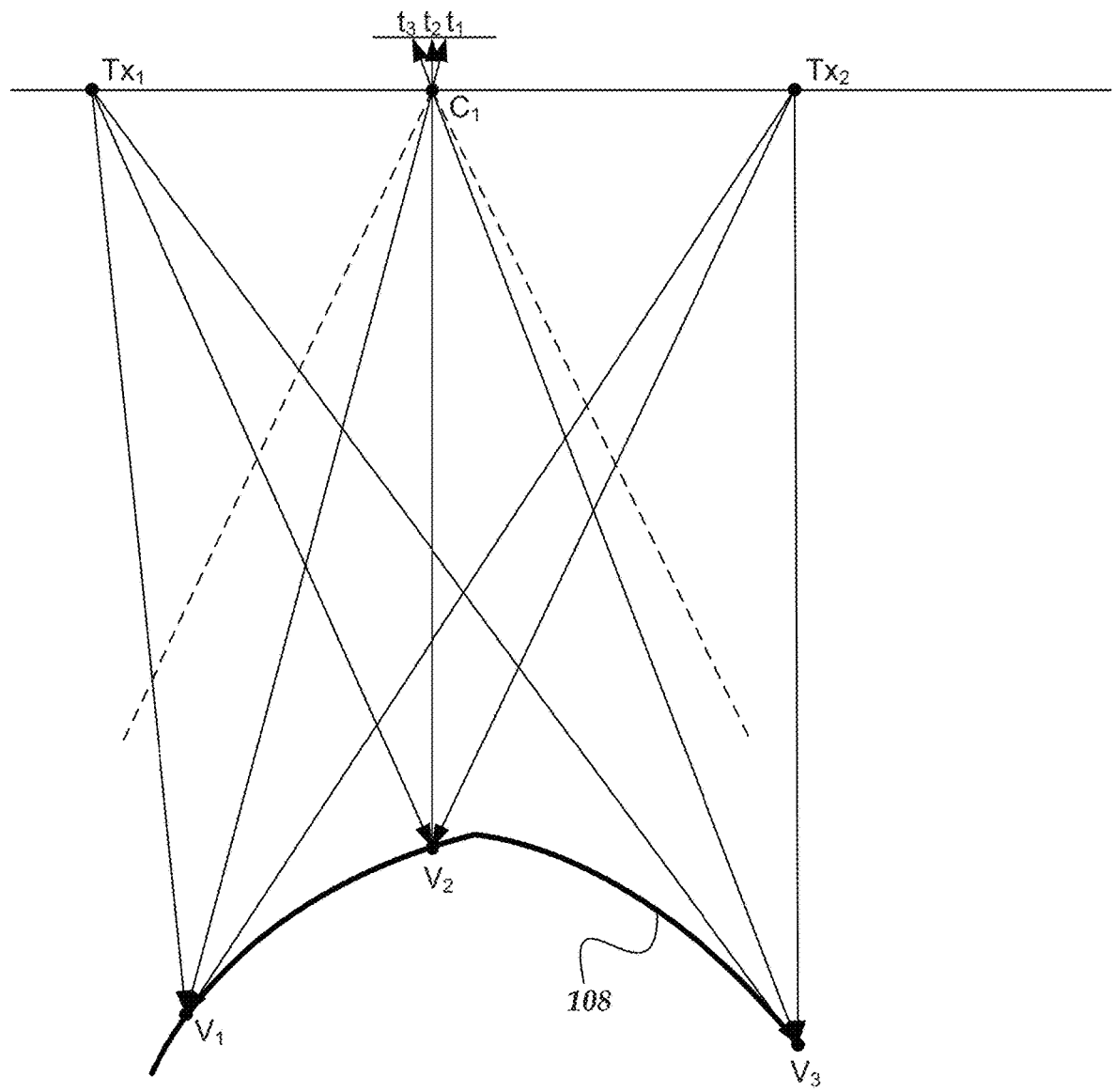
FIG. 8 illustrates an embodiment of a portion of an exemplary position determination system using two transmitters.

In FIG. 8, two laser beams (or other light beams) generated by two transmitters $Tx_1$ and $Tx_2$ are scanning along the same linear scan trajectory on the surface of an object 108 (side view) from voxel position $V_1$ at time $t_1$ to voxel positions $V_2$ and $V_3$ at times $t_2$ and $t_3$ respectively. The beam from $Tx_1$ may illuminate the entire trajectory from $V_1$ to $V_3$ or, alternatively, $Tx_1$ may illuminate positions along this trajectory up to reaching voxel position $V_2$ at $t_2$ and $Tx_2$ illuminates from $V_2$ to $V_3$, completing the trajectory. $Tx_2$ may take over instantaneously at instance t and continue along the same trajectory, or, alternatively, source $Tx_2$ maybe scheduled to complete at a later time. (In this example the two scan sources, and their scanning motion are arranged to be co-planar). In at least some embodiments, this arrangement of alternating scanning laser sources may result in brighter reflections, to be observed by the cameras positioned around the object. Further, the arrangement allows for the system to scan objects with significant surface curvature with far fewer occlusions.

Figure 9:
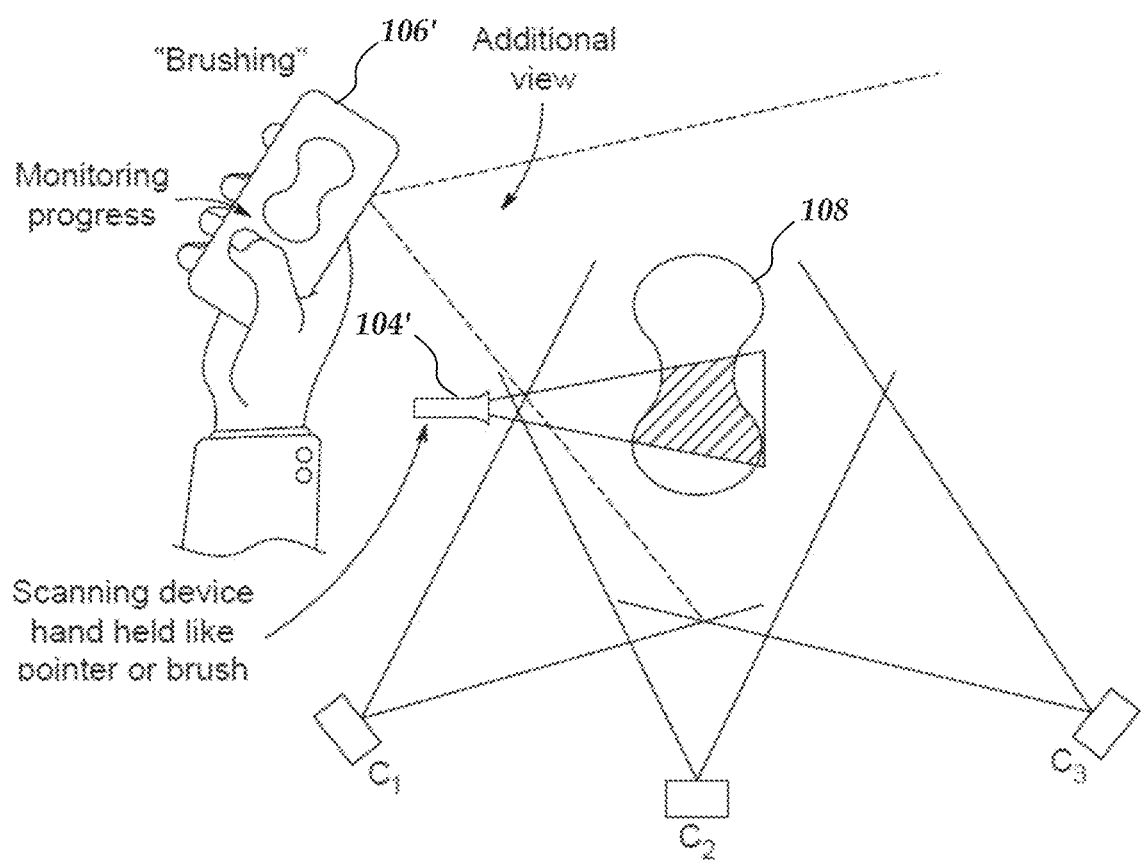
FIG. 9 illustrates an embodiment of an exemplary position determination system using a handheld transmitter and handheld monitoring device.

As illustrated in FIG. 9, when scanning a room or detailed 3D artifact, a handheld laser scanner 104' can be used to add "detailing" voxels to the accumulated set. The handheld tool may be a simple laser pointer or a "laser brush" (for example, a laser that sequentially illuminates along fixed or quasi random scan patterns), and it may include a second handheld device 106' such as smart phone, as shown in FIG. 9, which shows the "brushwork" in progress. The second handheld device 106' itself may contain one or more cameras, or the cameras $C_1$, $C_2$, $C_3$ may be separately positioned loosely around the space (as shown in FIG. 9) in an arrangement where each voxel illuminated by the laser pointer 104' can be seen by at least 3 cameras.

Three cameras $C_1$, $C_2$, $C_3$ may directly observe fine "brushwork" (the successive illuminated points around the brush) from nearby while other cameras placed around the object (or face) to be scanned are arranged in the surrounding areas. These other cameras may not be handheld, but they need not be stationary. So, a set of cameras surrounding an object to be scanned, even flying quad copters or cameras mounted on robot arms, may be employed to catch as many laser point illuminated positions as possible (for each voxel a minimum of three observed perspectives).

In the example illustrated in FIG. 9, the three cameras, $C_1$, $C_2$, and $C_3$, can be positioned in a tri-focal arrangement around an object. A handheld monitoring device 106' enables monitoring progress of the "brush work," revealing fine structural details of the object being scanned. The handheld monitoring device might be a mobile phone. A laser brush device, also hand held, illuminates the object with a scanning laser beam which creates thousands of "brush strokes" of laser lights on the surface of the object. The three or more cameras track each brushstroke. As noted, the cameras might be of a "twitchy pixel" or SPAD array sensor type, capable of finely triangulating, or otherwise e.g. by ToF methods that locate the instantaneous position of the laser beam(s) on the surface of the object. Alternatively, the laser brush might emit a spatio-temporal coding scheme that enables the cameras to disambiguate, identify and match each illuminated voxel, observed from different perspectives by three or more cameras. Optionally, DeBruin or other color type coding schemes might be employed, as described in more detail below.

Figure 10A:
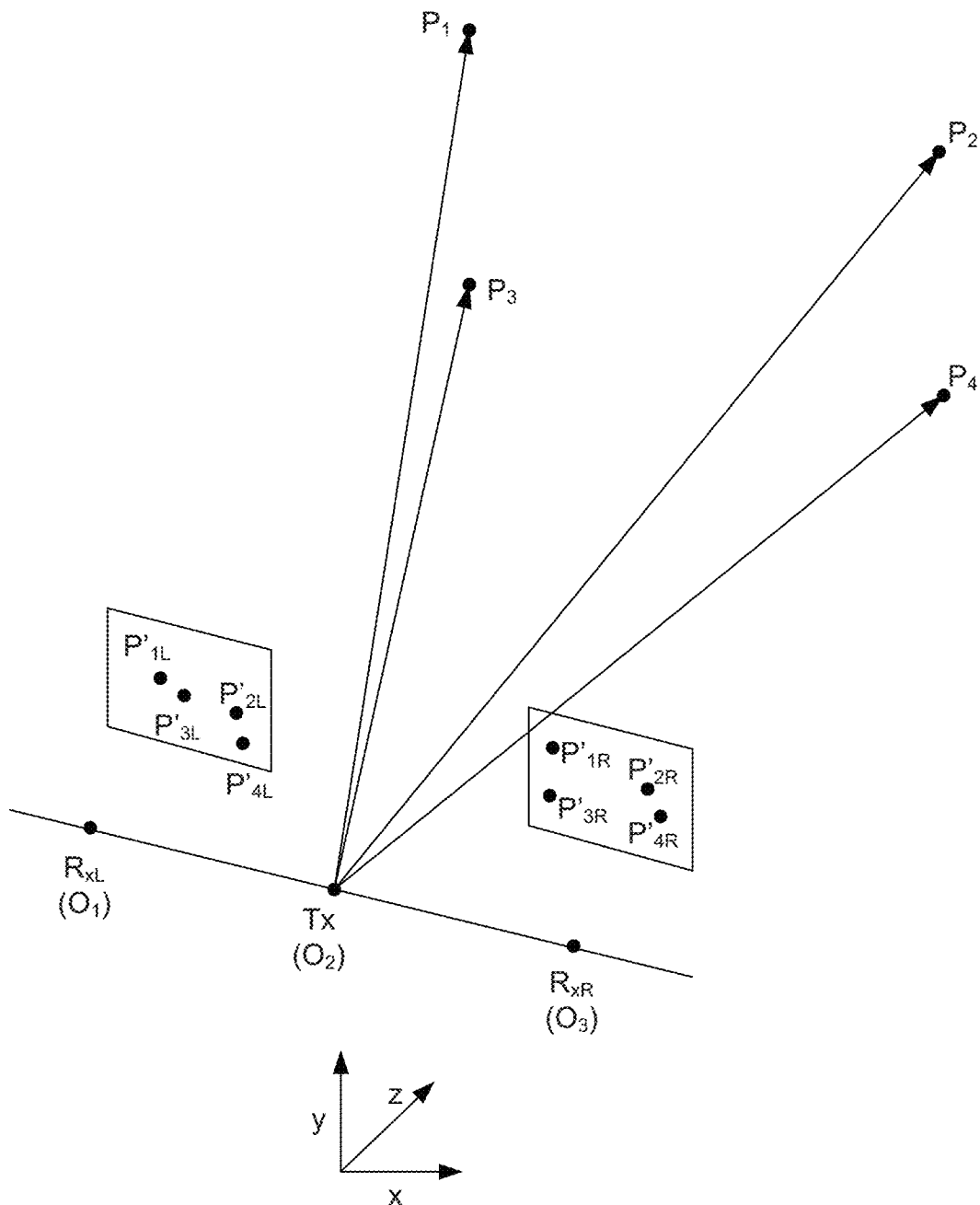
FIG. 10A illustrates an embodiment of an exemplary position determination system in an assisted stereo configuration.

Assisted stereo arrangements have three collinear devices, for example, an image projector on the base line of a stereo pair of cameras, as illustrated in FIG. 10A. This "stereo" configuration may be a special case of image triplet geometry: The projected image being observed by two cameras, results in a total of three 2D images and one projected reality. The relative orientation of the three images is fully captured in the trifocal tensor.

In FIG. 10A, there are three views in "assisted stereo" arrangement: one projector (i.e., transmitter) $T_x$ and a stereo pair of cameras, $R_{xL}$ and $R_{xR}$. In a resonant scanning system of a transmitter $T_x$, the instantaneous pointing direction of the scanning beam bouncing off the scan mirror is a periodic function, and at any instance, t, in time the exact pointing direction can be estimated accurately by an electrical or optical feedback loop from the mirror mechanism. Thus, four points $P_1$, $P_2$, $P_3$ and $P_4$ are sequentially illuminated by the scanning beam at times $t_1$ to $t_4$ successively. The two cameras observe these four illuminated voxel positions. The four laser beam pointing directions and the four pairs of projections of the four illuminated voxel positions are reflected and imaged onto each of the sensor planes of the two cameras. These twelve 2D observations are fully captured in the trifocal tensor T which can then be used to determine the positions of the points $P_1$, $P_2$, $P_3$ and $P_4$.

Figure 10B:
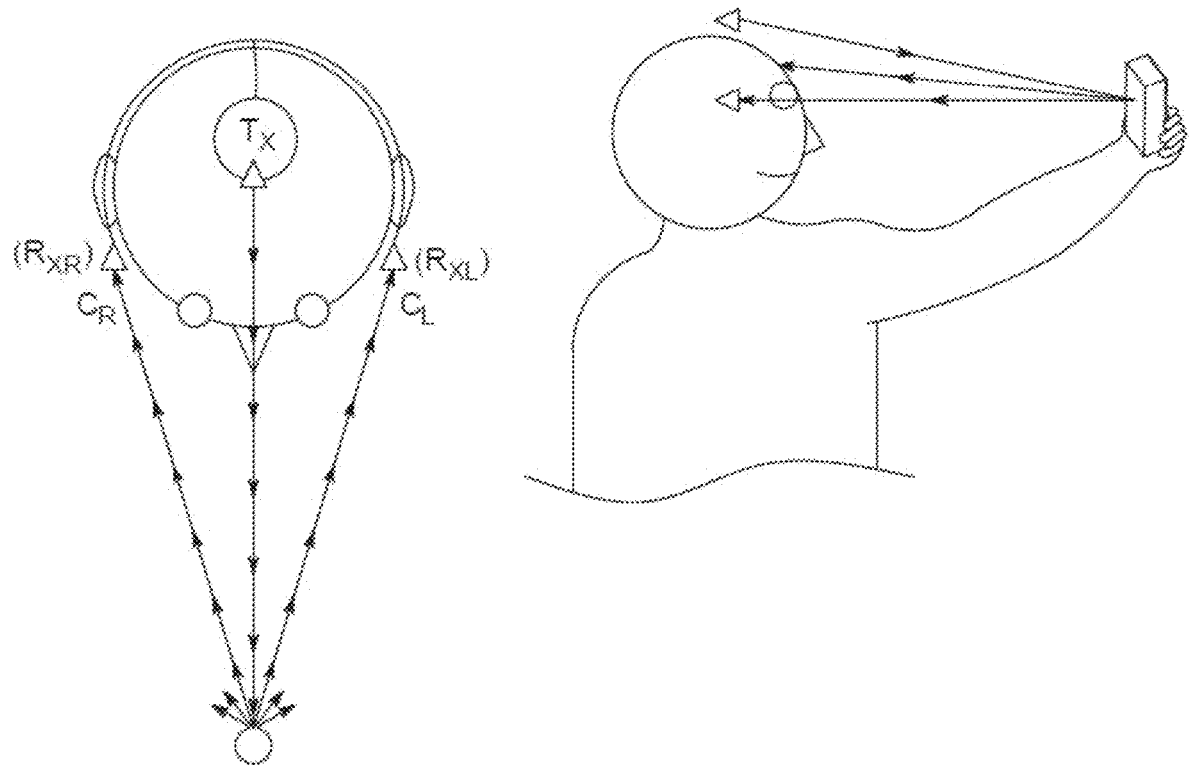
FIG. 10B illustrates an embodiment of an exemplary position determination system in a head-mounted arrangement.

State of the art assisted stereo systems typically employ a stereo pair of rolling shutter RGB cameras in an epipolar aligned configuration with the laser scanning projector. A simple alternative arrangement for use in system 100 includes a pair of hi-resolution monochrome twitchy pixel cameras and a single primary laser scanner. Additional options, such as "anticipatory" activation (see, for example, U.S. patent application Ser. No. 15/799,149, which is incorporated herein by reference in its entirety) and narrow band pass filters, make such an arrangement robust enough for daylight, even without requiring the rolling shutter, epipolar alignment. A system, such as system 100, can consist minimally of two twitchy pixel cameras and a single monochrome projector. In at least some embodiments, each of these three can be fitted in a volume of a few cubic millimeters, and each of the three components can be mounted at a different position in an HMD enabling a flexible, adjustable non-rigid comfortable and ultra-light head worn device, as illustrated in FIG. 10B.

As described in, for example, U.S. Patent Application Publications Nos. 2015/0278992 and US2017/028292, both of which are incorporated herein by reference, a head-mounted display system can have 2 image projection devices $T_{xL}$ and $T_{xR}$ which are positioned near each of the user's eyes. The projection devices project images onto a retro-reflective projection surface, the retro-reflected images, providing the left and right eye view perspectives. There are two separate "eye boxes" that are angularly and narrowly confined and separated by the narrow retro-reflections of the retro reflective display surface. In principle even though the user wears projectors close to the eyes, no filters, lenses or optics of any sort obscures the user's view. The same scanned projection system can be used in an "assisted stereo mode" to scan an object which might be in the user's hand to be scanned as part of a virtual collaboration session.

FIGS. 11A-11F shows that the two projectors can be arranged to have fast scanning motions at around, for example, 25 kHz so that a scan line across the FoV takes less than 20 microseconds. Other scanning rates can also be used. The fast axis of scanning of each projector can be set in opposing directions so that it will track the outline of objects such as fingers accurately in both lateral directions.

Figure 11A:
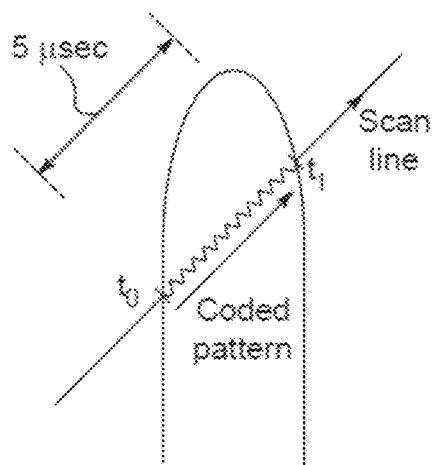
FIGS. 11A-11F illustrates an embodiment of an exemplary position determination method using two scanners or projectors.
Figure 11B:
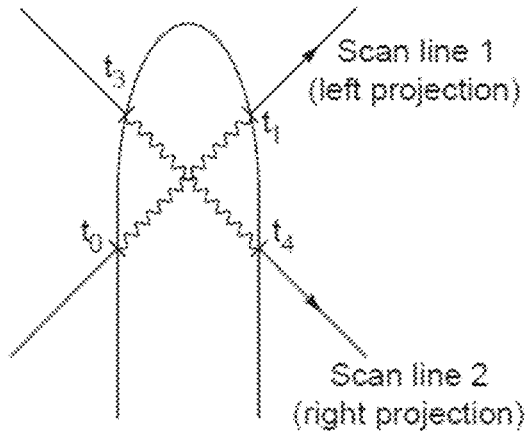
Figure 11C:
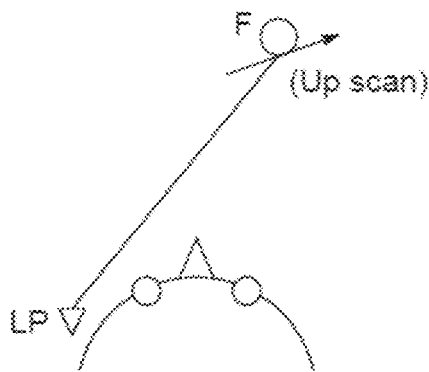
Figure 11D:
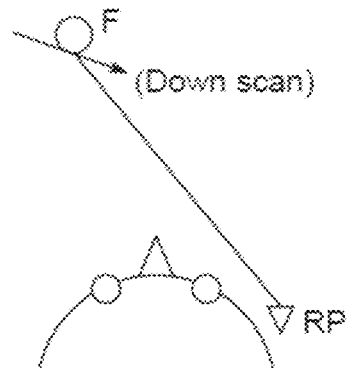
Figure 11E:
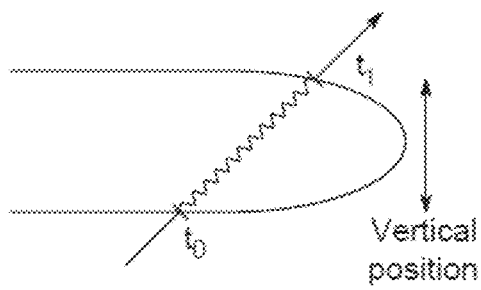
Figure 11F:
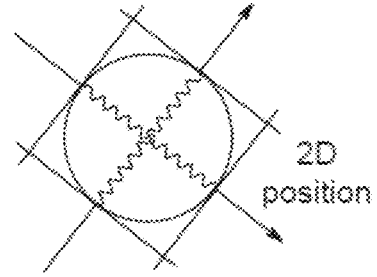

In FIG. 11A the left side projector beam traverses a user's finger in 5 microseconds, sharply marking the edge contour points at $t_0$ and $t_1$, approx. 5 microseconds apart. A pattern of up to 500 light codes or voxels (approx. 10 nanoseconds each for each illumination) are generated across the finger. An instant later, in FIG. 11B, during a second time interval beginning at time $t_3$ and ending at time $t_4$, a second beam traverses the finger in the diagonally opposite direction spreading another series of approximately 500 light codes or voxels. Using the systems and methods described herein, in at least some embodiments, the tracking system thus noted of approximately 1000 highly accurate 3D voxel positions can be scanned in approximately $1/100,000^{th}$ of a second, and achieved sub-millimeter accurate finger position and motion data is all three dimensions, with nearly zero latency. FIG. 11C shows a top view of the user's head, with a left projector LP scanning diagonally up, and in FIG. 11D a right projector RP scanning diagonally down.

Figure 12:
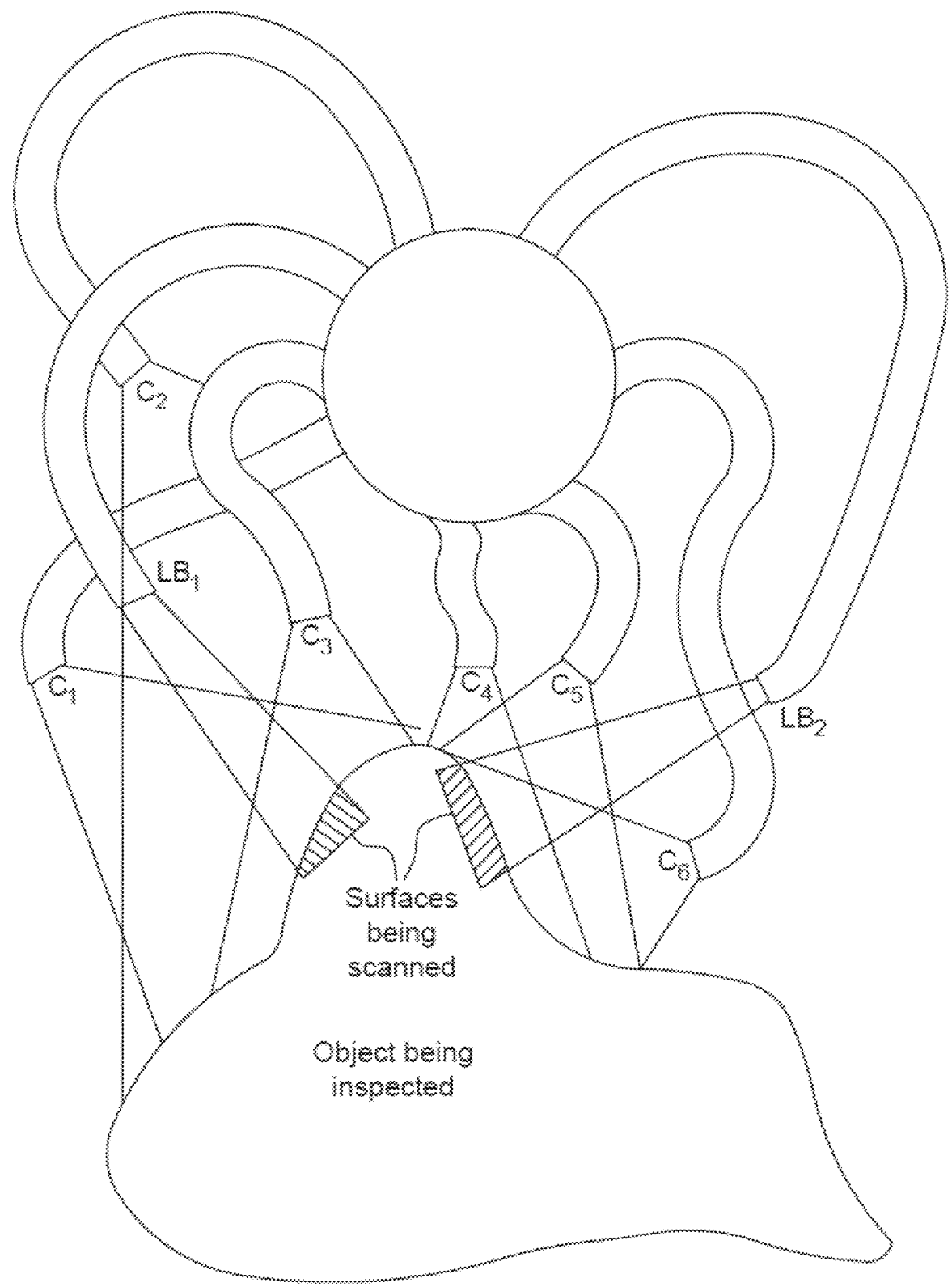
FIG. 12 illustrates an embodiment of an exemplary robot or other device incorporating a position determination system.

Another embodiment is a multi-armed robot (or other device) with cameras $C_1$, $C_2$, $C_3$, $C_4$, $C_5$, $C_6$ (for example, cameras with a "twitchy pixel" sensor array) mounted in multiple hands or grippers or other appendages, as illustrated in FIG. 12. These cameras are on stalks and are highly movable. The appendages can translate and rotate the cameras in six degrees of freedom, so these tracking cameras can be positioned optimally around an object being inspected. Furthermore, they can be moved continuously during the inspection, enabled by the real time and constant recalibration feature of the system.

The object being inspected might be moving itself. Its surface might be deformable or it might even be alive! In at least some embodiments, one or more of the appendages $LB_1$, $LB_2$ holds a transmitter, a light source, or a light brush that can be dexterously manipulated by its control system, so as to be able to illuminate each and every nook and cranny of the surface of an object (optionally, without touching it), in a way that at least three cameras detect the reflections. Alternatively or additionally, the device might include a transmitter or light source disposed on a body or other non-appendage portion of the device. In at least some embodiments, ensuring that at least three reflections are observed for each laser illuminated surface point (for each voxel to be recorded) can include a reiterative process of trial and error. For example, the light source (e.g., a laser) can be turned on to scan a small area. One or more of the cameras can be moved until at least three cameras detect photons within the expected time period relative to each other (e.g., for example, the cameras may detect "twitching" of sensors with "twitchy" pixels, or alternatively, nearly simultaneous avalanching of pixels in SPAR arrays.) Soon after, a stream of event data is observed with events that have nearly identical time stamps. "Nearly" in each case may be events within an interval of, for example, 1, 5, 10, 15, 20, or 25 nanoseconds.

It may be desirable to have more than three cameras and more than one light source. For example, an inspection robot (which may be useful for underwater inspection or other uses) might be outfitted to employ six cameras and two light sources simultaneously or any other number of cameras and light sources. FIG. 12 illustrates a robot with six arms equipped with cameras $C_1$-$C_6$ and 2 laser brushes $LB_1$ and $LB_2$ (i.e., light sources) for scanning separate patches of the area under inspection.

In at least some embodiments, it may be advantageous that the multi-arm robot can find, inspect and track structural features on multiple surfaces simultaneously. Since any known structure might be used as a six degrees-of-freedom (DoF) spatial fiducial reference, using photogrammetry, allowing the robot to track its own position and orientation very precisely in 6 DoF with respect to any suitable positional reference (preferably, stationary) in the environment (for example, an anchor on the bottom of a harbor.) Similarly, the extra set of arms may be used for very precise micro maneuvering around oddly shaped obstacles, where the robot uses one set of arms to optically anchor itself with respect to an object while the second set of arms rapidly scans fine 3D close ups of the object.

In some embodiments, any robot arm or other appendage of a device may have both a light source and a camera and during operation deploy these features interchangeably, directing laser beams or pulses to the surface and observing the reflections. In at least some embodiments, a processor based central control system monitors the inspection-in-progress. In at least some embodiments, the process uses CV algorithms and control software.

Surfaces can be inspected for defects, such as wear, corrosion or other damage. In at least some embodiments, the inspection process may be entirely autonomous and self-directed, with close inspections that zoom in on areas where anomalies are detected, using, for example, an AI (Artificial Intelligence) based computer vision system. As an example, untethered inspections might include one or more highly maneuverable underwater robots or devices for checking the structural integrity of a ship's hull or drilling platforms, pipelines, or well-heads in mid-ocean. Other applications can also include so-called "Smart Pigs" used in intelligent "pigging" of pipelines. "Smart Pigs" are inspection devices that record information about the internal conditions of a pipeline. During inspection, "Smart Pigs" are inserted into a pipeline and are pushed along by the flowing product in the pipeline.

These applications are examples of agile actionable intelligence perception, where real time observations may lead to immediate "on-the-spot" action (for example, closer inspection, possibly cleaning away debris, and making repairs). Actionable and agile machine perception preferably utilizes sufficiently powerful and low latency on-board computing resources.

With sufficient processing power, provided by, for example, a 100+ TeraFlop (TeraOP) class of GPUs and dedicated AI accelerators, when combined with ultrafast scanning using the system 100 describe above with trifocal laser perception, robots, such as that illustrated in FIG. 12, can work autonomously, fast and efficiently, preferably without requiring supervision or intervention. The latter is advantageous in places where data connections are limited or non-existent.

Agile, actionable 3D perception is of importance for stealth surveillance applications and when operating in extremely remote locations, such as planetary explorers (extreme latency by limitations of speed of light, and all signaling), or for remote autonomous satellite inspections.

In at least some embodiments of the system 100, every millimeter of an object or surface can be inspected at rates of 100 million voxels a second or more resulting in a complete, detailed "fine-grained" 3D structural maps. Such maps might include precise motion observations revealing high-velocity dynamics such as tremors and structural resonance and deformations.

If each voxel is one square mm then at least some embodiments of the system 100 can scan up to 100 square meters per second. During the scan process, only data events from three or more simultaneous detections of the reflected photons originating from the light source progress to the next computational stage. These N-tuple (where $N>=3$) event observations are processed and then (at least in some embodiments, nearly instantaneously) result in a stream of accurate voxel data. With accurate observations, all of the sections of a 3D scan can quickly and accurately be stitched together and, at least in some embodiments, efficiently stored in onboard memory. In contrast, many conventional systems today have to store raw unprocessed multiview video streams, requiring excessively large storage and/or multiple trips to the objects being inspected.

The system can use the real-time data stream as part of a feedback loop to move its arms continuously and automatically to ensure a continuous high-speed flow of voxel data and thus an efficient, fast and complete inspection of the 3D surface.

In at least some embodiments, the computed voxels are provided with time stamps with the accuracy of nanoseconds. The time stamps achieve this nanosecond precision because they are synchronized with the sequential illuminations of the voxel positions in the 3D manifold.

In at least some embodiments, this precise timing of individually observed voxels enables an inspection robot system to merge, fuse, and stitch together observations of patches of surface observed from different perspectives, and to keep an accurate record of motions and accelerations—in at least some embodiments, on a nanosecond precise time scale—but it also allows observations of one system in real time or later to be merged (stitched or fused—i.e. via a process of data fusion) with any other such voxel sequential system without loss of this accuracy. In at least some embodiments, the observations of two or more of such systems should agree about the position, velocity, acceleration and color of every mm of surface observed to a millionth of a second. This unique temporal and spatial accuracy greatly simplifies the process of fusing the data of two or more of the systems.

In at least some embodiments, after four successfully observed voxels, further observations enable the robot utilizing the perception system 100 to calibrate the position and orientation, velocity and acceleration (in six DoF) of each of the moving arms, and possibly on elbow joins, and enable it to recalibrate its own orientation, velocity, and trajectory in the work space. So within microseconds of operation a suitably equipped robotic inspection and manipulation system attains a version of bodily awareness called proprioception. Proposed as the $6^{th}$ sense in the time of Aristotle, proprioception is the exact sense of limb position and movement, the cognitive awareness of the body in space.

Because each camera (or eye, for example, a twitchy pixel or SPAD array) in the robot informs on its own positions at rates up to a million times per second, all moving parts and sections of a robot can use shared observations to orient and coordinate all of the parts instantly (or nearly instantly) in six DoF. Thus, tracking each joint position and pose of the robot may obviate the need for extra hardware IMUs or rotary decoders.

The proprioception may enable or enhance dexterity, agility and collision avoidance and improve the fundamental, agile maneuverability required for navigating in crowds as expected from, for example, a pizza delivery robot (or other robot or device in places with many customers or other individuals or hazards). This extra dexterity, maneuverability, kinetic agility, and proprioception, poise and grace make the perception system 100 suited for a robot waiter or waitress in a restaurant and other similar uses.

Laser "brushing" may be applied to AR (augmented reality) position sensing systems, to accurately detect and to quickly and efficiently check shapes, but also to be able to fit realistic looking augmentation seamlessly to the detected reality. The latter is particularly important when attaching augmentations to living deformable things such as life faces or fingers (jewelry, crowns, nose rings, tattoos, mustaches, hats, horns, or the like.)

Using the system 100, a head mounted display (HMD) may use a trifocal sensor arrangement to efficiently track objects in the real world for augmentation. It may use an end-to-end pixel sequential system, such as system 100 (for example, employing "twitchy pixel" sensors), or alternatively it may be a hybrid system architecture with pixels sequentially illuminated by a laser but using conventional frame based RGB sensors and, for example, DeBruijn type color and/or intensity light coding structured light techniques, tracking the coded laser light scan progression, as described below.

Machine vision scientists are increasingly relying on novel "AI" based computational approaches, such as Convolutional Neural Networks (CNNs or "CovNets"). It has recently been shown by researchers at UC Berkeley that when training CNNs for an autonomous driving RC model car, it is sufficient to treat the stereo pair of cameras as just two individual camera data streams. The CNN ends up learning the equivalent of stereo geometry implicitly when it is trained on visual motion images captured during driver training sessions of the RC car. This obviates the need for geometry transformations (such as right and left stereo pixel pair matching which can be a compute intensive operation). Going from raw pixels directly to driver actions results in faster response and a leaner compute budget at drive time. After training, the trained neural net then implicitly uses stereovision inferences to inform its actions.

By analogy, the data flow output from an N camera system 100 could be used to train CNNs to function like a visual cortex for robots, autonomous driving systems, and other devices and systems. The first few layers of the neural net perceptual system provide effective fine-grained low-latency 3D spatio-temporal perception ability.

This suggests that, like the human brain, neural networks can master the essential saliency for high-speed navigation in an unknown 3D reality landscape, without explicitly being told about (or trained for) the spatial geometry based on mathematically explicit rules informed by photogrammetry, visual odometry or SLAM directly and drive by "intuiting" the net effect with trained neural nets.

It appears that explicit rule-based geometry transforms are not required in remote control cars with stereo cameras and that there is no need to explicitly extract 3D voxels from two cameras capturing 3D reality in a series of stereo image pairs. Binocular humans survive rather nicely with a pair of low-resolution eyes that are in constant motion. It is therefore plausible that for maneuvering at high speed in an unknown 3D environment a robot with cameras, as described above, with a sufficiency of viewpoints (N+ views) would be effective. Evolution suggests a biomimetic pseudo-random scanning vision system analogous to the vision system of a jumping spider.

Bundle adjustment is a unified method to simultaneously estimate the internal and external camera parameters and the 3D coordinates of the scene points in a statistically optimal matter. The number of cameras and scene points can be arbitrary large. Conceptually, it solves the inverse problem to computer graphics: given the images of an unknown scene the task is to recover the scene structure, i.e., the visible surface together with the parameters describing the cameras used for taking the images, thus exploiting all available information. See, for example. Chapter 15 in W Forstner and B. P. Wrobel, Photogrammetric Computer Vision, which is incorporated herein by reference in its entirety.

In, for example, SfM (structure from motion) there is a series of observations (for example, sequential video frames, taken by a moving camera.) Each frame is a quasi-instantaneous observation when time is supposed to be standing still during the observation. The changed perspective between the frames, caused by the motion of the camera itself relative to objects in the scene informs both on the underlying 3D geometry of the scene and the trajectory of the camera.

In the trifocal tensor approach described above, four or more 3D scene points are observed by at least three cameras. The scene points, their 3D space manifold surfaces, and the cameras might be in motion. The plurality of simultaneous views, like moving stereo camera in LSD SLAM (Large-Scale Direct Monocular Simultaneous Localization and Mapping), enables an advanced form of SLAM (Simultaneous Localization and Mapping).

In at least some embodiments, the system 100 sequentially illuminates a trajectory of voxel locations, causing nearly instantaneous, simultaneous detection events to occur in three or more cameras (a plurality N of cameras, with N equal or greater than 3). This instantly establishes the correspondence between pixel locations in the three (or more) cameras: coordinate pairs, for example, [column number and row number], of the pixels that detect the photons in three different cameras. In principle that means for each instance of illumination (say every 10 nanoseconds) an update can be made to all prior estimations (surfaces, objects, and the trajectory of the camera centers).

Basically, with each successive voxel illumination, the system can more accurately derive these parameters, and consequently this method and system enables the determination of very accurate past, present and future (predicted) 3D motion trajectories (assuming inertial kinetics) based on a large number of successive trifocal observations.

The trifocal (multiview) application or system 100 with the simultaneous observation from N perspectives—where the number N is greater than or equal to 3—of a series of successively illuminated voxels enables an even more sophisticated SLAM than the frame-based conventional approaches. Calculating camera system extrinsics can be done efficiently, where one doesn't have to recalculate the entire set of parameters each time, or, if one does have to recalculate, the procedure can be made fast and efficiently, seeded with values from prior, recent observations. Motions "freeze," that is, changes are minimal, at the time scale of microseconds. Predictions based on recent observations—for example, Kalman filter estimations—are likely to be extremely close.

Figure 13:
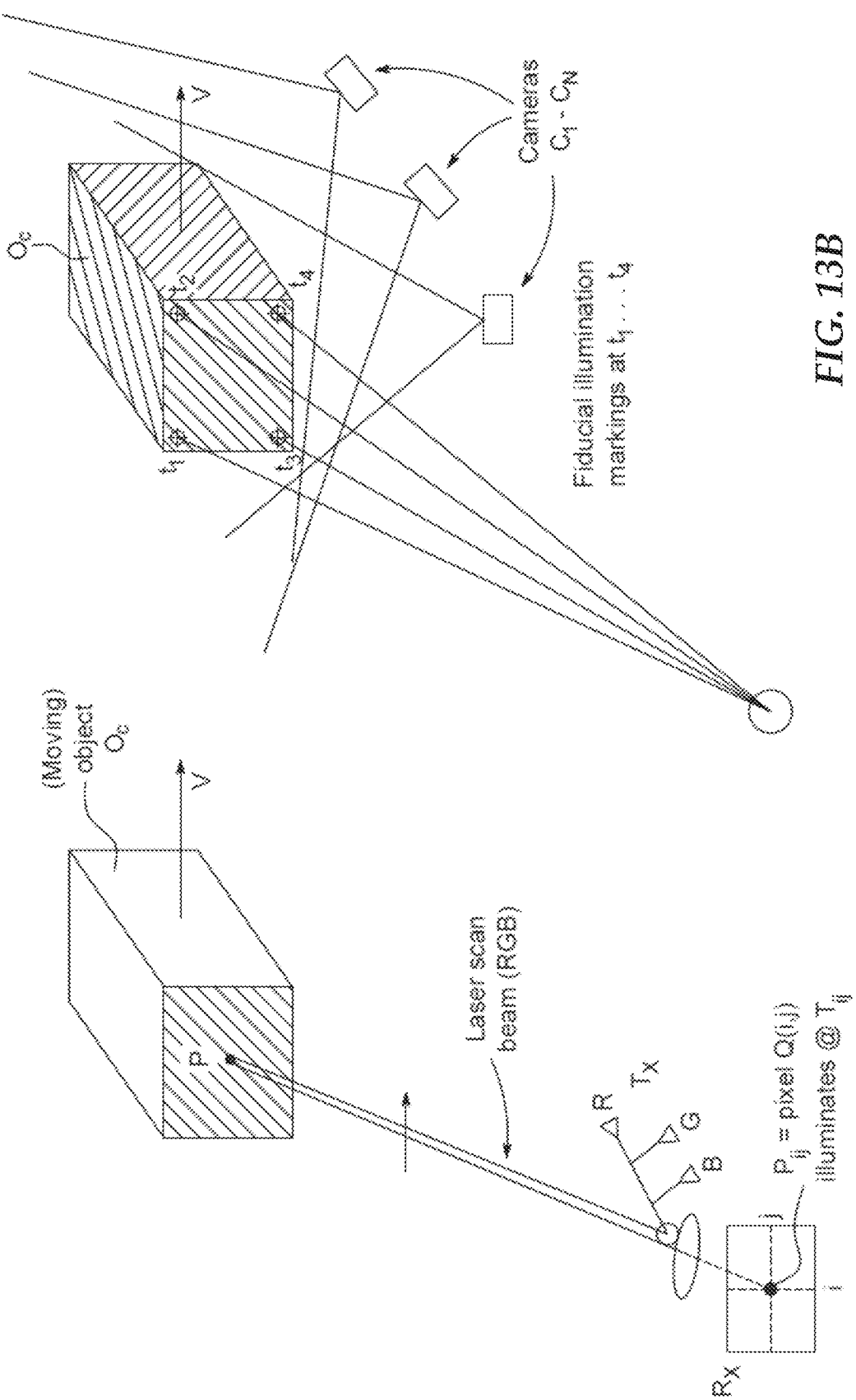
FIGS. 13A and 13B illustrates an embodiment of an exemplary fiducial tracking system.

Turning to FIGS. 13A and 13B, a normal camera image is processed as a 2D image or as an initial coarsely scanned 3D scan, for example, by conventional stereo or structured light methods which are used to identify points of interest in the 3D world. The scanner laser source Tx is used to illuminate the view of a conventional rolling shutter camera and this camera's perspective is co-located with the scanning laser illuminator, so that the illumination moment $T_{ij}$ for each pixel $P_{ij}$ in the camera can be determined with great accuracy. In FIG. 13A, the light from a scanning laser beam transmitted by Tx reflects off surface point P of an object Oc. A pixel $P_{ij}$ in co-located camera Rx receives the reflected pulse at time $T_{ij}$, marking the time, location and color (object's albedo for the transmitted colors, R, G, B) values of the surface at point P. In FIG. 13B, the system marks fiducial marks t1, . . . t4 at, for example, the four spots on the object. Now other cameras C1 . . . Cn can see (detect) those illuminated marks also and "crop" select the object in their views. Optionally, three or more cameras detecting four (or more) of the marks can quickly calculate the 3D locations of the marked points, using a trifocal tensor calculation as described above with respect to system 100. Optionally the object may be selectively illuminated, and/or selectively recorded ("3D cropped") so as to reduce the data flow from the N cameras.

The pixel-sized RGB laser beam would thus confine the whereabouts of each recorded pixel temporally to the $T_{ij}$, (in nanoseconds) and spatially to the limit of resolution of the camera. The latter can be as fine as $1/100^{th}$ of a degree in either azimuth or elevation, e.g. with an economical 8M pixel "4k" sensor, with a 40 by 20 degree FoV, as 40 degrees/4000 columns is $1/100^{th}$ degree per column, assuming good optics.

The pixel sequential illumination of system 100 eliminates or reduces motion blur, even for high-speed motion video recording. A sequence of laser illuminated frames enable a computer system to identify, track and predict the locations of points of interest. The system may then insert a special illumination frame (or just a few scan lines) where only those points of interest are illuminated (or alternatively, a specially equipped camera may selectively activate or read out only the pixels "bracketed" by the illuminated reference points).

Other cameras (C1 . . . Cn) in the observation system may then record the locations of these selected points of interest. Because these illuminations can be sparse and in order, objects of interest, such as the cubic shaped object $O_c$ in FIGS. 13A and 13B, can more easily be identified, and selectively tracked.

One exemplary embodiment for a procedure for a closed loop system 3D fiducial tracking system includes:

1. Start illumination of the entire frame of the first camera. (Optionally, use the system 100 for removal or reduction of all motion blur and enabling high velocity high fidelity motion capture).

2. Identify points of interest in the frame, pixel by pixel.

3. Re-identify the point of interest in a later frame. (This later frame may be the next frame, possibly confining the search to a small area around the previous identified object location)

4. Repeat the above step 3 for a series of frames, until an adequate set of points (2D, pixel camera locations) and time stamps for each point have been acquired.

5. Determine the motion trajectory (if any) of the points of interest.

6. Predict their position(s) for the next (few) passes) of the scanning beam.

7. Illuminate just these points of interest along their predicted trajectories. (These may be 2D trajectories and 2D positions viewed from the transmitter and first camera's perspective.)

8. Mark the pixel locations of as many illuminated points as possible in each of a series of camera positions.

9. Optionally, points may be color code illuminated (assuming the additional observer cameras are conventional RGB cameras which can identify the point locations by color.)

10. Using known metrology techniques (for example, triangulation, PnP and bundle adjustment) compute the 3D locations of the observing cameras and 3D trajectories of the points of interest.

Due to the absence of pixel blur and the extremely fine-grained temporal resolution of each observation, a world-class 3D perception system is created.

At greater distances, pulsed or other ToF ranging methods may, optionally, be employed to further inform on the 3D geometry of the scene, e.g. at distances where the base separation between the observers is too limiting (for example, when there is an insufficient distance between the camera centers.)

Fast scanning can reduce motion error. Assuming that three cameras see four successive points over a period of time, across the widest FoV space (for example, four extreme scan points, in two directions azimuth and elevations) during a time span of 1 millisecond and the relative transverse (tangential) velocity between the cameras is of the order of magnitude of 10 meters per second (36 km/h) then by the end of the fourth extreme observation, the true moving camera positions (with regard to the points observed) might have shifted by one centimeter. Over that observation period of 1 millisecond, there might be 100,000 intermediary scan illuminations (one every 10 nanoseconds) yielding 300,000 [x,y] camera coordinate observations (100,000 simultaneous observations in each of three "twitchy" cameras), so given sufficient real-time computer power the camera trajectories, and their relative positions can be accurately estimated.

Scans across 3D manifolds can form trajectories as the intersection of two surfaces to better model, observe, track and predict the trajectories across surfaces, from contiguous 3D surfaces but also dealing with temporary occlusions, "drop-offs' and other discontinuities. The goal is to achieve anticipatory gating of individual pixels (for example, "twitchy pixels" or SPAD pixels) along the predicted 2D trajectories in the arrays so as to make the system more sensitive and more robust to ambient light. An objective is to derive a level of a mathematical function of probabilistic confinement of the 3D scan trajectory immediately ahead, to be able to express in a function where the beam will appear next, in which 3D spatial manifold subsections and in which 2D camera subsections.

Figure 14:
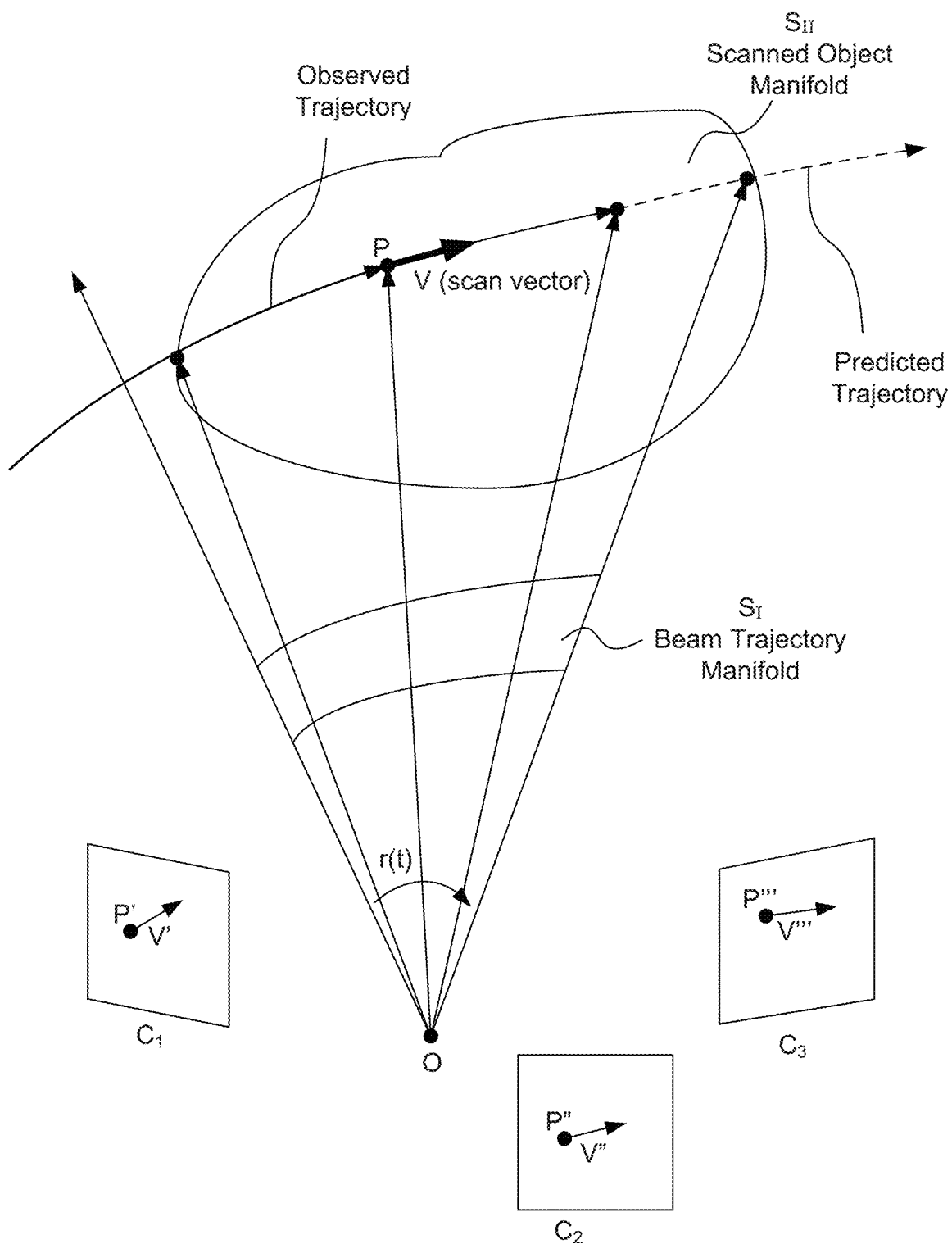
FIG. 14 illustrates an embodiment of an exemplary position determination system with a Beam Trajectory Manifold and a Scanned Object Manifold.

Based on observed trajectories in the three or more cameras, and based on the computed trajectories, these trajectories are kinetically (for example, mathematically) predictable assuming smooth non-random motions: relative motions (six DoF) between the surface being scanned, the laser source and each of the observing cameras. One embodiment is illustrated in FIG. 14. The scan line is the intersection of two surfaces: Surface I is the Beam Trajectory Manifold (BTM) and Surface II is Scanned Object Manifold (SOM).

Three cameras C1, C2 and C3 observe the reflections of the scan beam's trajectory. A first section is the observed actual trajectory and a second section is the predicted future trajectory. At any point P along the observed trajectory the laser illumination point is moving at velocity vector V along the trajectory. This motion is projected into the three cameras as three 2D vectors, V', V" and V'" in the sensor planes of cameras C1, C2 and C3 respectively. Over very short intervals of a few hundred nanoseconds, the future positions where pixels may "twitch" next can be predicted, anticipated, and if desired activated, in a "just-in-time" fashion ahead of the arriving beam. Therefore, SPADS may be reverse biased to maximum gain, and the sensor dark noise, and ambient light noise can be suppressed to the maximum, as individual pixels along the predicted trajectory in the sensor may be activated (exposed) over period of less than 1 microsecond.

Surface I: Beam Trajectory Manifold (BTM): The scanning beam scans through 3D space in a continuous smooth fashion. By definition (according to the laws of classical physics, i.e. in absence of very large gravitational fields) the emitted laser beam's photons travels in free space in a straight line from a mirror M towards a distant object or surface to be detected and tracked. Mirror M is rotating around an instantaneous axis of rotation r(t).

The incoming highly collimated laser beam reflects off the minor, pivoting i.e. rotating at twice the angular velocity of the mirror (following the optics of specular reflection). The incoming beam itself may be pre-rotated by the actions of a prior scan mirror e.g. in a scan system consisting of a series of scanning mirrors linked by a relay optics such a described in, for example, U.S. Pat. Nos. 8,282,222; 8,430,512; 8,696, 141; 8,711,370, 9,377,553; 9,753,126 and U.S. Patent Application Publications Nos. 2013/0300637 and 2016/0041266, all of which are incorporated herein by reference in their entirety. For example, an ellipsoidal relay may relay the scan motion in one dimension (e.g. azimuthal horizontal direction) from a mirror placed in the first focal point $F_1$ of an ellipsoidal mirror relay to a second focal point $F_2$ (an ellipse having two focal points $F_1$ and $F_2$). At the second focal point of this relay a rotation in a second direction is imparted to the scan beam, typically in a direction orthogonal to the effect of the first scanning mirror (e.g. in a vertical direction, or "elevation").

Thus, over a short time period measured in microseconds the beam will be moving substantially in a fast scan direction which is the result of the fast rotation imparted by the scan mechanism.

With a good multi-mirror relay system, or a well-designed bi-axial mirror, the net effect will be that the beam leaves the scan mechanism as if originating from a singular point origin O. So when the beam pivots (rotates) around the minor's center, O would appear to be at that position. In other systems the beam origin O might move laterally (translate) slightly across the last scanning surface onto which it is reflecting before leaving the laser scan mechanism. However, this translation is almost negligible when viewed at a distance.

The net result is that the beam scans smoothly through space, traversing that space within a thin envelope shaped along a 3D surface, a slightly curved spatial manifold. Another way to model it is as a bundle of rays originating from the mirror O, where in time in small increments each successive ray rotated a small step (e.g. $\frac{1}{100}$ of a degree every nanosecond) in a substantially, constant direction (the fast scan direction). Highly collimated laser beams traversing though free space in a short period form a tight bundle of rays, progressing as a time series, where with each infinitesimally small step the ray advances by a small rotational fraction.

So, at least in some embodiments, the first surface, the BTM surface, is smooth and curved only slightly and only in one dimension at any one point. For each point P on the BTM surface there is at least one straight dimension, and orthogonal to this there is a second planar dimension which is at most slightly curved. At any point P on the BTM surface the straight dimension is formed by one of the rays originating from the origin O. This ray is one of a bundle of straight lines formed by the laser beam at different points in time originating from the point O in the scan mechanism. Orthogonal to it is the scanning direction. The scan direction at any point P is tangential (therefore, orthogonal) to the ray direction. BTM could be described as slightly "undulating" (like a spatial ribbon; or an undulating surface, spreading fan-like from O).

Surface II: Scanned Object Manifold: The second surface is that which is being scanned and tracked by the system; the "Scanned Object Manifold" ("SOM"). It is the surface or 3D spatial manifold which belongs to any object of non-zero size that the beam illuminates. We assume here that the object's surface is substantially contiguous and smooth (no gaps; no hairs, dendrites, or the like).

The intersection of BTM and SOM is a line that is smooth itself, because locally if both surfaces are smooth (i.e., "differentiable"), then their intersection is a line shared by both surfaces, and therefore this intersection of two smooth surfaces must be smooth (differentiable) also. So the observable scan line trajectory must be smooth, and that implies that the locations of successive spots are predictable along the defined linear trajectory from prior observations.

Figure 21A:
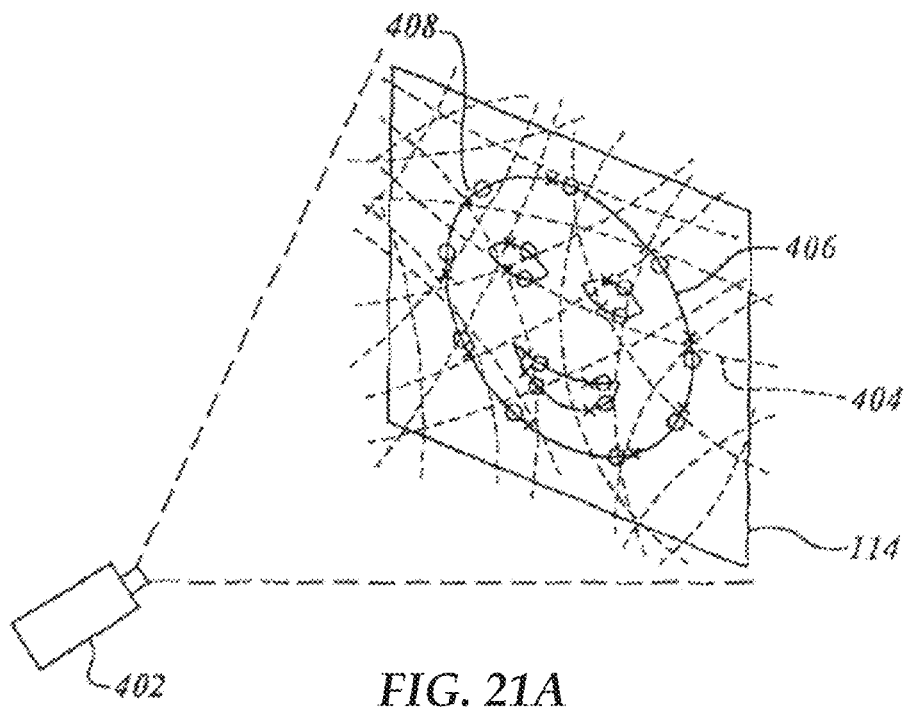
FIG. 21A illustrates one embodiment of light beam trajectories generated by a projector.
Figure 21B:
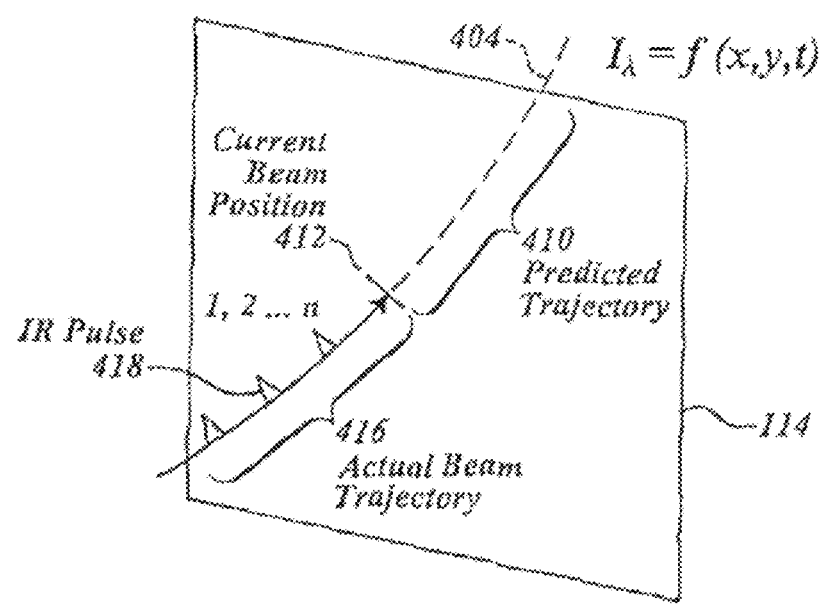
FIG. 21B illustrates an embodiment of one light beam trajectory with scanned and predicted trajectory portions.

FIG. 21A shows an illustrative example of a "pseudo-random" laser system with a projector 402 and a surface 114, on to which the system is scanning a patterned image 406. Each screen position 408 on the image 406 may fall on one or more scan lines 404. FIG. 21B shows an embodiment of one pseudo random beam trajectory with scanned and predicted trajectory portions. The process of projecting an image may be divided into two distinct phases: a feedback phase during which an already-scanned portion of scanline 404 is detected, and a projection phase during which combined image beam is projected onto a predicted portion of scanline 404. Correspondingly, scanline 404 has two distinct portions, one, scanned beam trajectory portion 416, and two, predicted trajectory portion 410. Scanned beam trajectory portion 416 of scanline 404 ends at current beam position 412 and, in this embodiment, includes a sequence of pulses 414, typically generated on the basis of nano-second timing. The predicted trajectory portion 410 is the portion that is predicted by processor 116 based on the data associated with the sequence of pulses 414. Combined image beam 120 is generally projected on predicted trajectory portion 410 of scanline 404.

Figure 23:
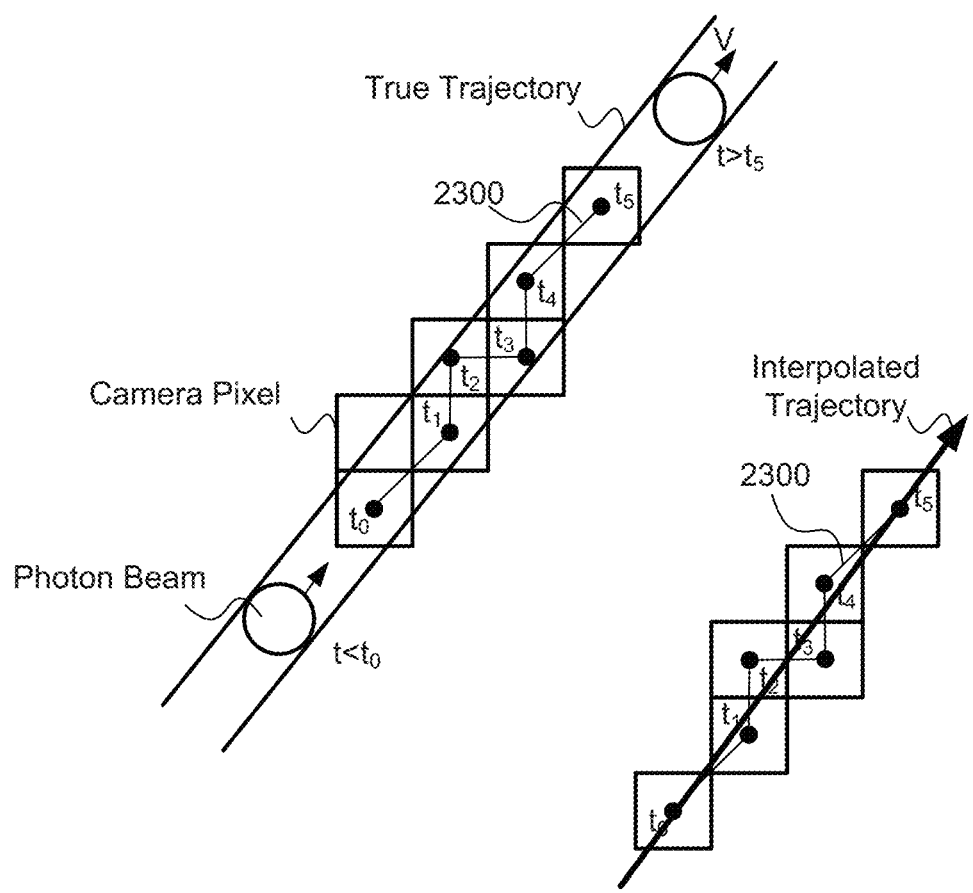
FIG. 23 illustrates an embodiment of a trail of detection events by pixels of a camera and interpolation of the trajectory of a photon beam based on that trail.

FIG. 23 illustrates a trail 2300 of detection events observed by pixels of a camera as a reflected or scattered photon beam, as the beam's image traverses the camera along the true trajectory. This trail 2300 can be refined by linear interpolation (for example, by line fitting) so that the resulting trajectory is more precise in both spatial accuracy (for example, 1/10 pixel dimensions) and temporally (for example, 1/10 temporal resolution of events (roughly equivalent to the transit time across the average pixel.)) FIG. 23 illustrates a six pixel trail, but a trail of any number of pixels can be used.

For example, if 100 samples are taken over 1 microsecond (i.e., a scan rate of 100,000,000 raw voxels/second (one event roughly every 10 nanoseconds)) and if the scan is smooth and continuous, then spatial resolution in the camera can be as good as 1/10 th pixel dimension and instantaneous trajectory positions can be temporally interpolated to nanoseconds.

Figure 24A:
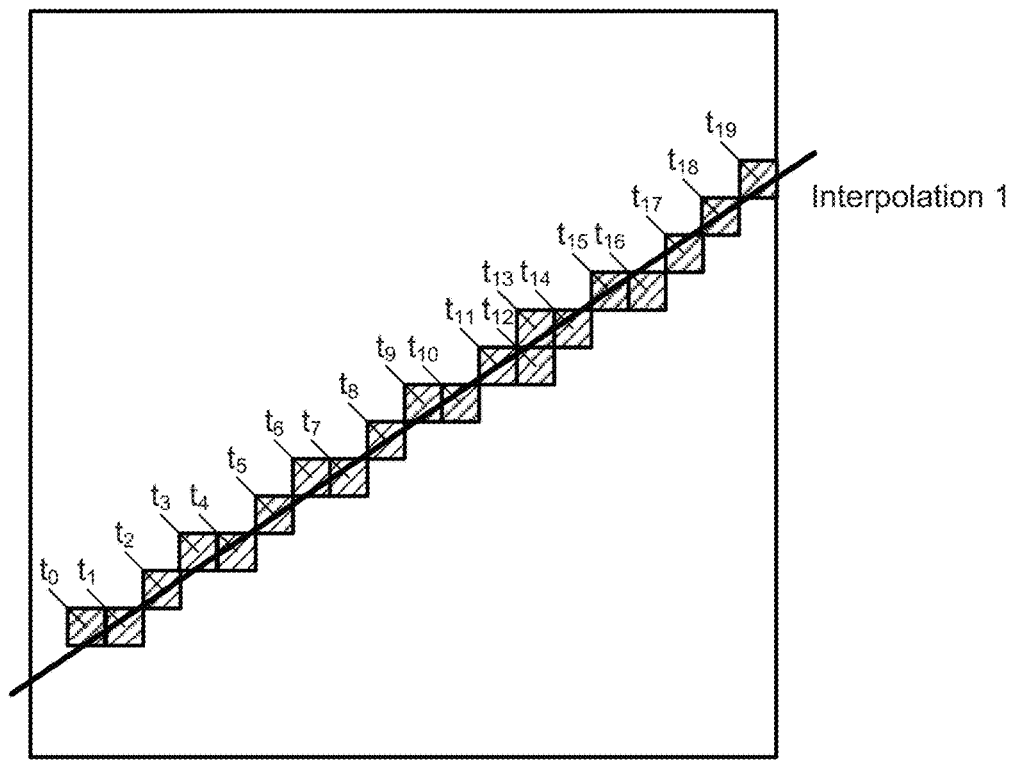
FIG. 24A illustrates another embodiment of a trail of detection events by pixels of Camera 1 and interpolation of the trajectory of a photon beam based on that trail.
Figure 24B:
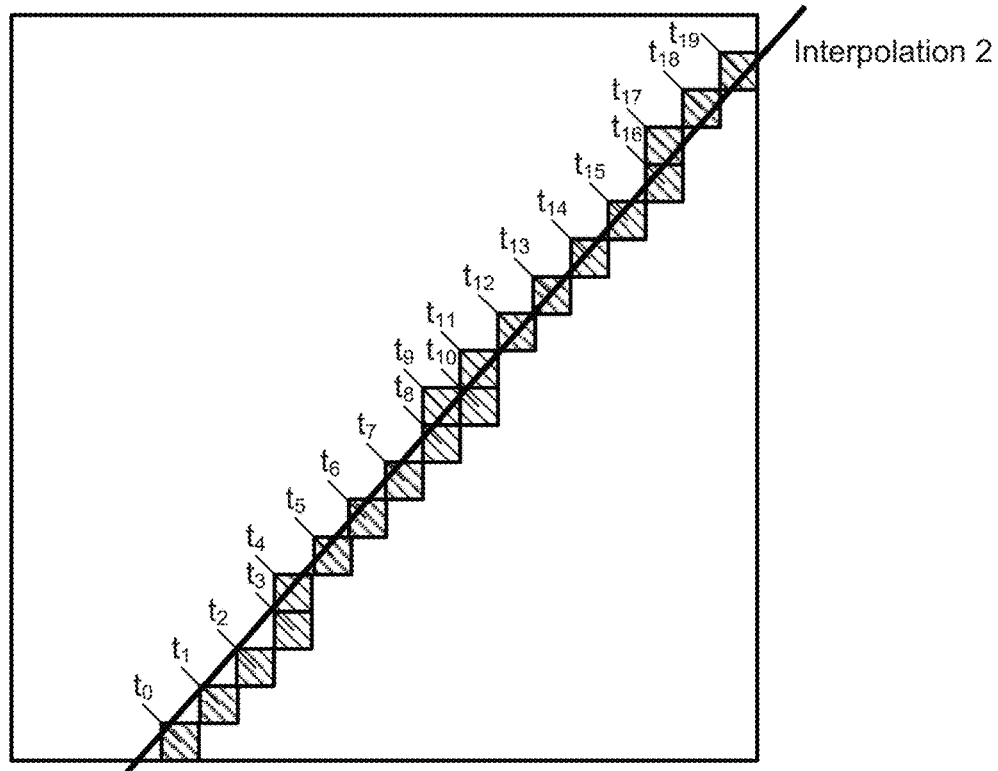
FIG. 24B illustrates another embodiment of a trail of detection events by pixels of Camera 2 and interpolation of the trajectory of a photon beam based on that trail.
Figure 24C:
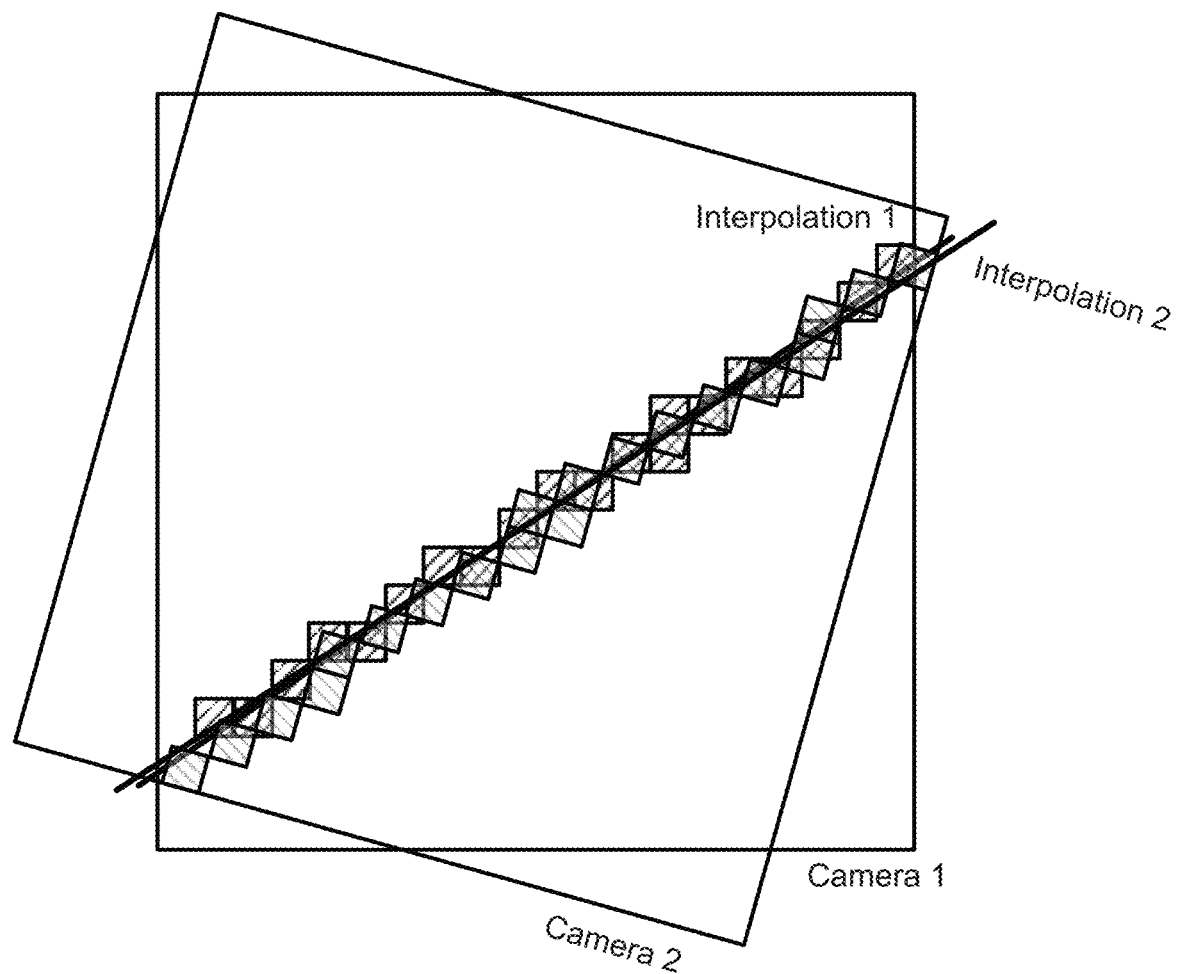
FIG. 24C illustrates overlay of the trails and trajectories of FIG. 24A and FIG. 24B (rotated).

FIGS. 24A and 24B illustrate a trail of detection events observed by pixels of Camera 1 and Camera 2, respectively. The trajectory of pixel illuminations is seen from two different orientations because it is imaged onto the pixel array of two cameras (in two different positions or orientations (of a set of N cameras, each camera may be positioned and oriented—e.g. rotated around its central optical axis—differently from all the others.)) Each trail is jagged and arises from sequentially twitching pixels in each of the cameras. Further, the "twitches" of the pixels are not entirely regular intervals. But each trail can be interpolated to fit closely to a 2D camera projection of the actual 3D trajectory, and the two interpolations can statically be combined in FIG. 24C. A superposition of N such interpolations for small subsections of the voxel illumination trajectory on the manifold therefor can be a very close fit and provide an accurate estimation if the observed 3D trajectory and a close, highly-resolved observation of the ground truth.

Although each pixelated array inherently has some spatial and temporal quantization errors, as the image of the beams traverse across each of the cameras differently, the more cameras, the more diverse viewpoints observe the photon beam's 3D trajectory on the spatial manifold, the more accurately the true instantaneous position of the beam, its true trajectory can be determined. It is possible to find beam positions at features smaller than those observable by individual pixels, and see motion in shorter time intervals than it takes for the beam's reflection (imaged as a moving spot in each of the N cameras) to move across any one pixel.

Similarly, feedback from observing cameras and/or position sensors enables the system 100 to predict the trajectory ahead and render a scan pattern adjusted for the expected trajectory of scanned illuminations (on a screen that is a manifold in space). The same pseudo random non-repeating scanning method (e.g. open Lissajous), yields an accurate low latency motion accurate tracking system.

It follows that any observing camera C that can observe at least in part some of the object's surface—any part that is in the process of being illuminated, either continuously or as series of rapid "tracer bullets" or tracking spots—that any such camera will be able to observe a current as well as a part of a prior trajectory of the reflections from light captured by its aperture and focused by the optics as a time progression of spots projected onto the sensor's surface.

It follows further that by observing the smooth trajectory, the progression of the spot in the sensor, the "upcoming" trajectory, in other words the location of future spots (reflections of future i.e. yet unobserved-surface voxel illuminations) can be anticipated. The likely locations of successive spots can be narrowed down to within a small subset of the sensor's surface. Each observed actual location informs on the location of the next one. There are mathematical methods (e.g. Kalman filters) to predict future locations accurately along the trajectory and to anticipate with a high degree of probability the exact locations of the spots' pixel traversal trajectory, that is the locations and times of occurrence of pixels that may see the spot in the immediate future (at short nanosecond time intervals).

Moreover, if there is a significant time of flight (ToF), e.g. approximately one microsecond when a LIDAR system scans an object at 500 feet distance, then the actual spatial direction of the incoming light beams should correlate exactly, and the system has sufficient time (one microsecond is 1000 one nanosecond clocks) to compute and select and control the activation of a very small subset of pixels in the sensor.

If the scan beam "falls off" an object (e.g. encountering an unexpected edge of a surface or object), as seen from another perspective, the beam may appear to "jump ahead". The sensor may then fail to detect the signal, because the beam landed unexpectedly beyond the predicted range, beyond the activated pixels ahead in the predicted trajectory. Should such an edge occur, recovery can be instantaneous or nearly instantaneous by searching (for example, activating a sliding window further along the same trajectory to reacquire the beam—the trace across the sensor). Note also that in the case of three or more observers (for example, in a trifocal or tetrahedral scanning LIDAR arrangement), there are always three or more cameras observing the illuminated voxel trajectory on the SOM's surface. Therefore, some subset of these cameras may not have lost the signal and their observations further would help the re-acquisition of the remaining sensors that did temporarily lose track of the signal.

Even when such a jump ahead occurs, due to an edge or an occlusion or a gap, the beam will still closely follow a predictable trajectory, an envelope of possible trajectories that can be predicted accurately from the observed actual scan directory. The unexpected "jump ahead" is along the same predicted trajectory, not actually deviating from it.

Because only a few pixels will be open at any one time, a spatio-temporal filter is created that can effectively screen and therefore mask out (by selective activation, or pixel specific shuttering) the light of extraneous signals, for example, shutter out the ambient light to a very large degree, and enable the system to strongly favor the detection of the tracking beam. As an example, if there are a million pixels in the camera (1000 rows 1000 columns) by traversing along a known (observed) trajectory the camera may only open for photon detection 10 pixels at any one time along the predicted trajectory immediately ahead. Thus, the camera is only exposing (activating) a 1/100,000 fraction of the camera at any one time, and ambient light is thus suppressed, and the tracer signal detection is favored by a factor of 100,000 to 1. Effectively, if ambient illumination on a sunny day way 100,000 lux, it would be reduced to one Lux at the camera.

A Stochastically Informed Multi-view Camera Overlap ("SIMCO") embodiment is illustrated in FIG. 15. A series of N cameras or sensors $C_1 \ldots C_N$ (for example, SPAD or "twitchy pixel" arrays) observes a view (not shown) with overlapping camera fields-of-view. As an example, three cameras $C_1$, $C_3$ and $C_5$ detect reflections (of a laser probe beam—not shown) and report events nearly simultaneously (i.e. within the same short 10 nanosecond time interval) to an Event Concurrency Check (ECC) process or circuit. The ECC confirms the (degree of) concurrency of the three events. Deeming the three events (a subset M, where $3=<M=<N$, in this case M=3) sufficiently concurrent (e.g. within 5 nanoseconds), it concludes that the events must be reflected light having originated from the same voxel illuminated by the laser probe beam. Another circuit or process CVP computes the voxel positions and sends the voxel data on to a downstream perception system for analysis. Optionally, the calibration data for six DoF positions of the M cameras are updated.

360-degree scanned object or person using multiple systems—In a holographic video capture system as described, for example, in U.S. Pat. No. 9,813,673, incorporated herein by reference in its entirety, or other VR immersive motion capture systems many cameras are mounted on rigid frames (camera rigs) around the performer/user. Systems such as described in that disclosure typically require careful setup and calibration.

Figure 16:
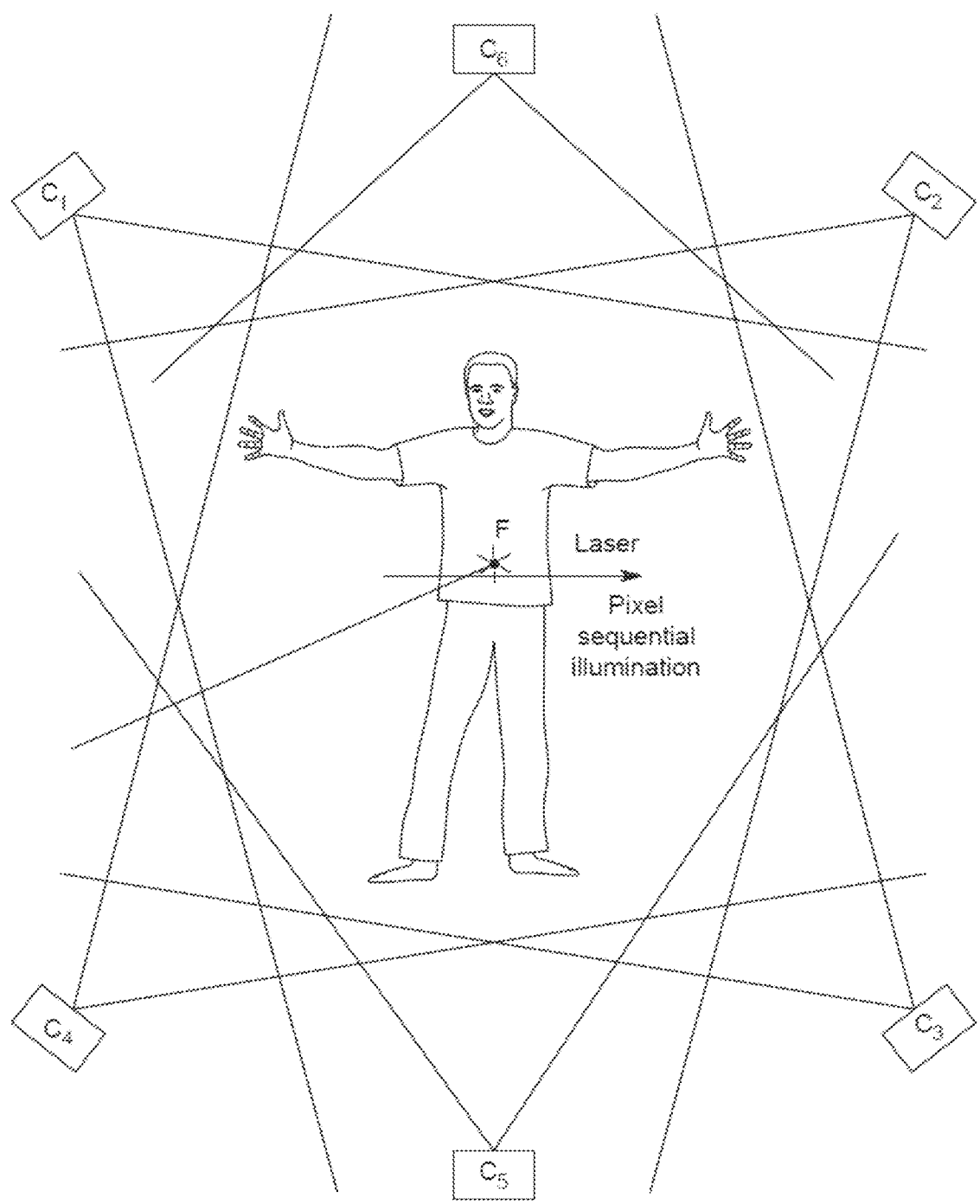
FIG. 16 illustrates an embodiment of an exemplary holographic video capture system.

The system 100, described herein, is able to capture many concurrent events data streams, from any number (N) perspectives (e.g., cameras), then match and pair up each of M events from a subset of M cameras, recorded simultaneously at regular ultra-short (e.g. 10 ns) intervals. Because the system 100 is fully robust to camera motion, continually re-calibrating to any new camera positions in microseconds, camera rigging and calibration are optional. FIG. 16 illustrates an "ad-hoc" spontaneous (self-organizing) "camera crew" equipped with six cameras ($C_1$ ... $C_6$) skipping calibrations and camera rigs and spontaneously capturing the performance of dancer F (e.g. at a party).

Figure 17A:
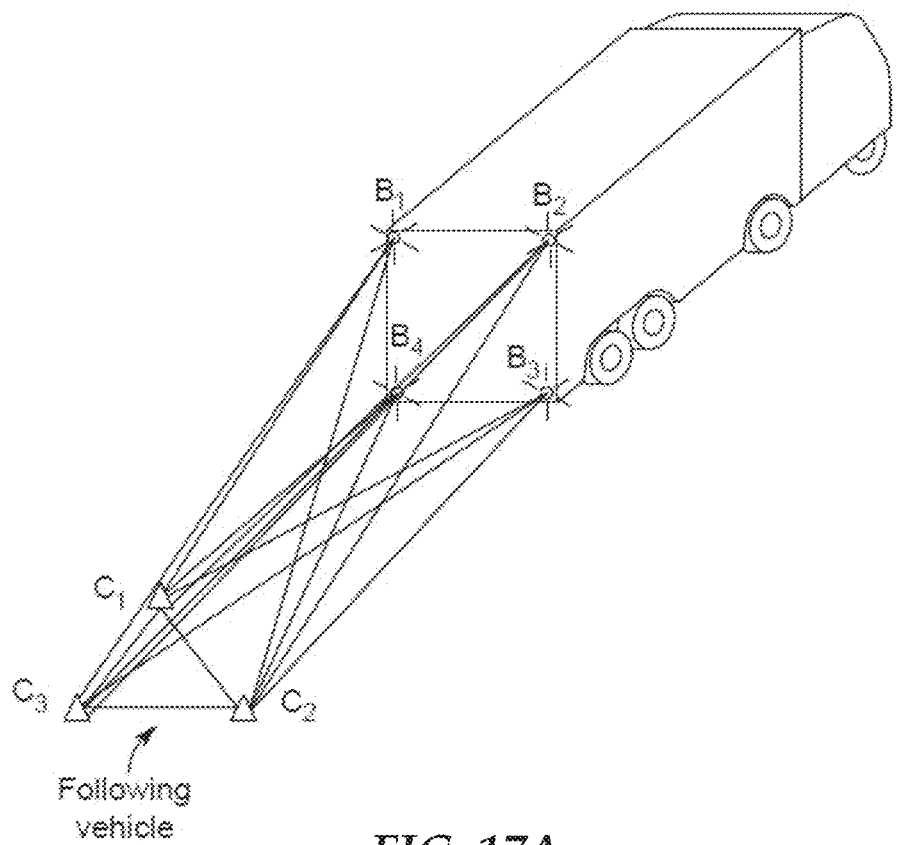
FIGS. 17A and 17B illustrates an embodiment of an exemplary targeted selective 3D fiducial monitoring system.
Figure 17B:
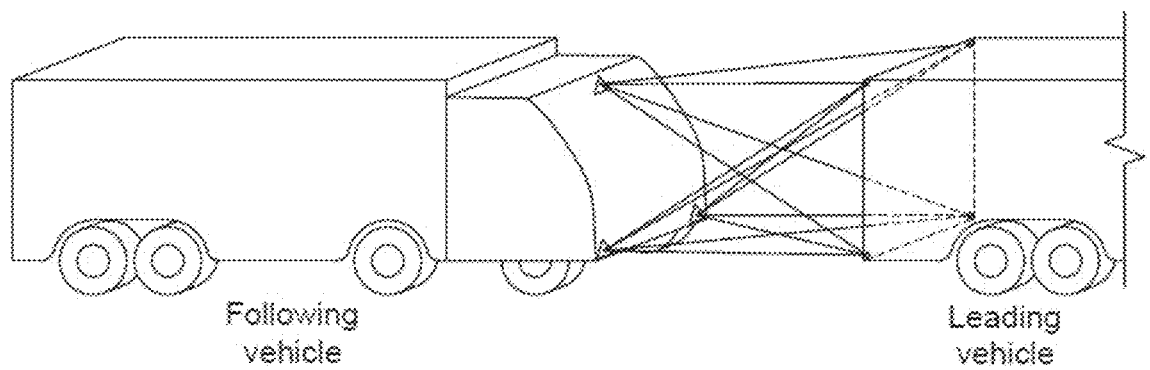

"Blinkers"—Targeted Selective 3D Fiducial Insertion and measurement, RR reflectors, and or blinking laser diode makers $B_1$, $B_2$, $B_3$ and $B_4$, are illustrated in FIGS. 17A and 17B. There are 3 or more cameras ($C_1$, $C_2$, $C_3$, ... etc.) on a following vehicle The cameras may be regular cameras that discover and track the four distinct brightly illuminated points. Or the "Blinkers" might be laser diode sources emitting in sequence (not at the same time) each a bright single wavelength laser pulse that is instantly detected by "twitchy pixel" or SPAD array sensors in the system 100, or, the four points may be laser reflectors that reflect a scanning laser beam and whose reflections are detected by the cameras of system 100. FIG. 17A shows three cameras detecting the four "Blinker" points on the rear of a vehicle. FIG. 13B shows two vehicles in "peloton" formation, with the rear vehicle closely following the front vehicle.

Figure 18:
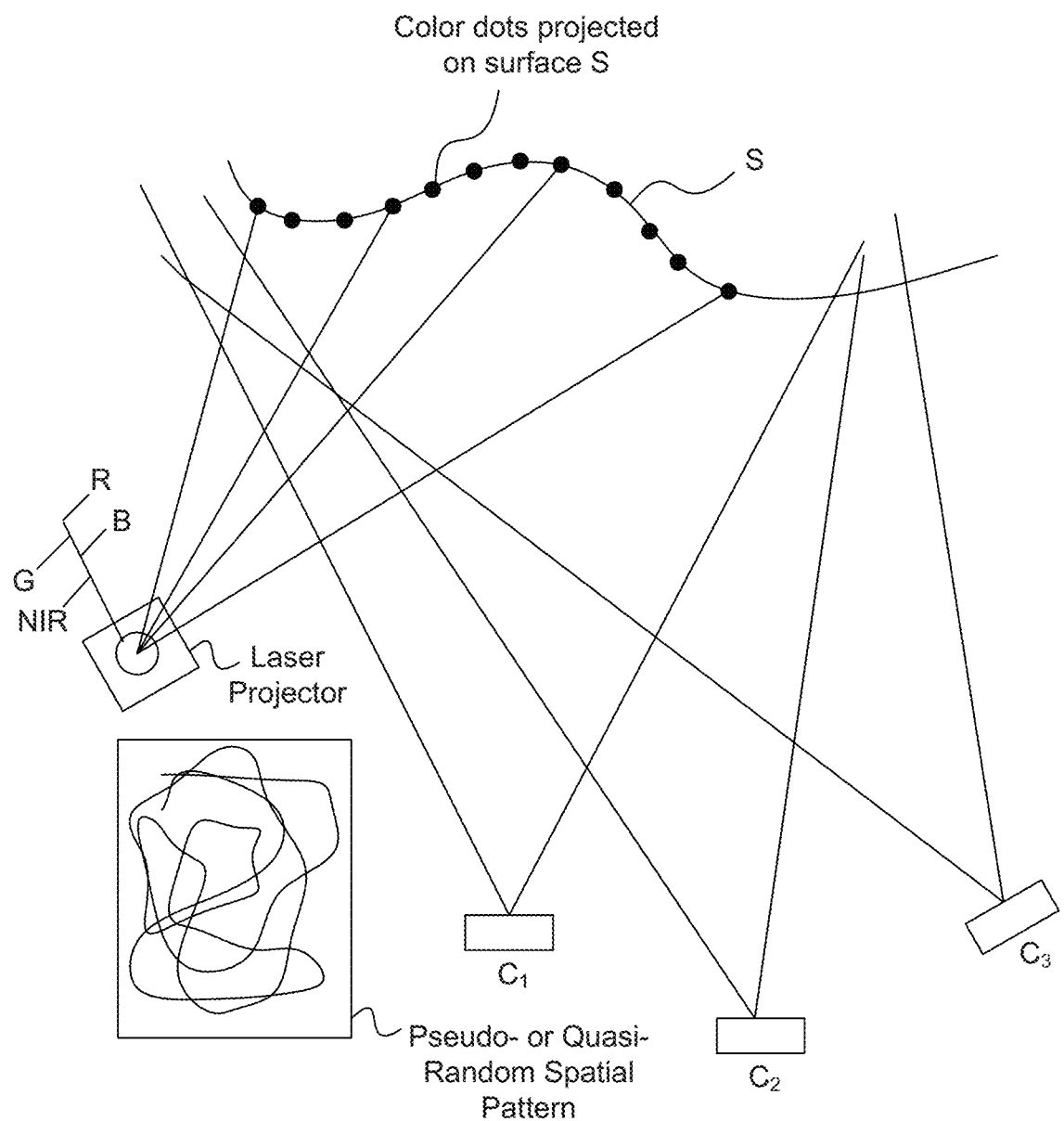
FIG. 18 illustrates an embodiment of an exemplary position determination system utilizing color illumination.

Coded color strings (AKA "Color beads")—A laser projector produces a known unique sequence of colors (for example, R, G, B or NIR) which are projected across a surface in some spatially separate unique pattern, such that each of three or more cameras ($C_1$, $C_2$ and $C_3$) can observe the coded strings of color on the 3D manifold surface and recognize which color is which in the sequence, as illustrated in FIG. 18. A positive spatio-temporal match between three or more views can be established for each colored illumination in the sequence. This means that each illuminated voxel point can be identified by its 3D location and temporal sequence (a unique time stamp in nanoseconds for each voxel). The color sequences along the trajectories provide uniquely identifiable location references, for example, by DeBruin coding, a sequence of three or more colors that is locally unique over a certain time period and over a certain length along the string. Such coding can be sufficient to identify even a fragment of four or more colors, even if gaps and occlusions occur, fragmenting the strings' sequence. The color sequence is a marker that enables the cameras to recognize the time sequence capture in a frame that has captured a long (millisecond) sequence of such illuminations. The system can follow the sequentially illuminated voxels' trajectories, and trace out the spatio-temporal patterns of the color-coded strings of illuminations. With the knowledge that each color bead is an illumination that occurred during a specific nanosecond accurate interval in this frame exposure very accurate surface motions can be observed, with a time and location accuracy far exceeding that of an unassisted fast global shutter camera system.

The color beads, with their unique sequence in the string, function as spatio-temporal markers. Knowledge of the spatial-temporal position of the projector is not strictly required for the system to work. The tri-focal arrangement of three cameras and four matched points are sufficient to decode the sequence (and re-calibrate for the camera positions). However, it is likely that knowing the exact sequence of colors and prior knowledge of the spatio-temporal progression of the pattern in the system FOV can provide important additional clues, and may complement the coding scheme, as well as provide an additional robustness to the tracking system, for example, through a feedback loop, laser color sequence projection may be adjusted in intensity and spatial frequency for the observable surface characteristics of an object, such as variations in surface albedo, structure and roughness.

Some part of the scene in the FoV of the system might be of special or acute interest, of higher saliency—e.g. objects occurring directly in the trajectory ahead, or objects which may present an imminent collision risk, which merit denser color sequence coding requirements. The pattern of projection may be closed form (periodic) Lissajous, open Lissajous (non-repeating) or other forms of pseudo random spatial pattern projection, crossing the surface in dense "cross hatched" patterns. A system like this might be excellent for proving foveated 3D close-ups on objects of interest.

Alternatively, a monochrome system can use three rapid global shutter cameras using an intensity variation coding scheme. In the prior embodiment a string sequence was coded using color variations, to visibly mark the progression of time (the sequence in pixel sequential) along the sequentially projected string, and at the same time to add a spatial identity to each point and a recognizable uniqueness to string section, so as to make it more easily match-able in N tuples in N view motion tracking systems using conventional frame exposure cameras.

Alternative laser light coding schemes might be used, e.g. rapid laser power intensity variations, enabling highly resolved and strictly narrowband filtered conventional cameras to observe the sequence. This method might take less power and gain a greater ambient robustness by using a fairly simple global narrow band pass filter, e.g. applied in the lens stack. Further, there may be 2× greater spatial resolution by using each position—rather than every 4th in an RGB mosaic sensor—, and further, this method should suffer less from spatial aliasing. It should be noted that the source laser light can be adjusted in intensity, with direct feedback to fully utilize say an 8 or 10 bit grey scale accuracy of a standard CMOS camera.

In some embodiments, the system may use widely spaced, interleaved open Lissajous patterns and observe with three or more high-speed global shutter cameras. The intensity coded string-like patterns may fill less than 10% of each successive frame, but after a short sequence of frames they will have captured the entire 3D shape of a surface of an object covering its entire surface with such coded strings in a few (approximately 10) successive frames. Note that with each set of the frames' output by N (three or more) cameras running at 1000 FPS, each set of N frames would be able to observe the progression, and match individual N-tuple correspondences within a very small subset of the total frame area. For example, the system may use N 10 Megapixel cameras, and during each frame exposure only approximately 10% 1 megapixels illuminated.

Following along the string, a section is located by its shape and relative position. Within a section of string there might be only 100 possible positions that need to be matched, located in each of N simultaneously recorded camera frames. In 1 microsecond, 100 codes (or voxels) are projected, one every 10 nanoseconds, so the search space is reduced by $10^{5N}$ orders of magnitude from $10^{7N}$ to $10^{2N}$. For example, for a trifocal set up (N=3) this makes for an initial search of one million combinations in 1 microsecond to match and locate a succession of 100 voxels in space. The latter would appear do-able (GPU 1000 parallel operations per clock).

Figure 19:
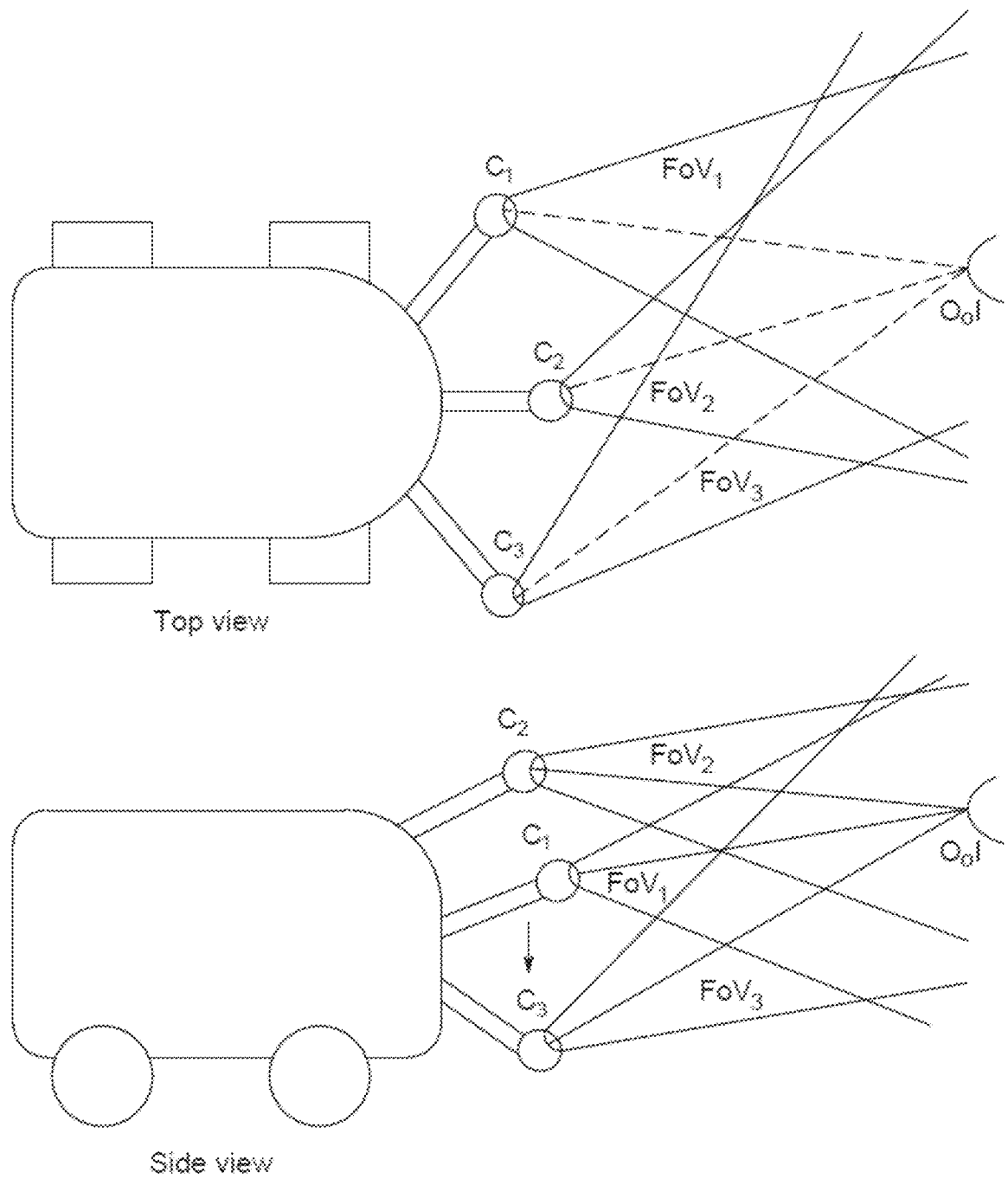
FIG. 19 illustrates an embodiment of an exemplary vehicle with a position determination system.

In FIG. 19, three or more (N) cameras ($C_1$, $C_2$ $C_3$ . . . , $C_i$, . . . $C_N$) are mounted on a roving robot (for example, a robot delivery vehicle) or other vehicle or device. Each of the cameras $C_i$ has a certain field-of-view ($FoV_i$) sampling as part of the environment around the robot. Small actuators can rotate the view of each camera in two directions, such as azimuth (alpha) and elevation (epsilon) over a certain range. Thus, the cameras can foveate like human eyes can. Foveation lets them zoom in and track moving objects in the environment. Analogous to the panning and tilting cameras, a laser probe beam scanning system (may pan and tilt, or rotate itself (actuated by motors), in order to orient itself advantageously to scan an object of interest.

On a delivery robot or other device or vehicle, the pan tilt cameras may be deliberately made to resemble eyeballs so that an observer may understand he or she is being looked at. When implemented in a non-threatening way this may help facilitate user interaction. The eyes would anthropomorphize the machine (make the robot appear more human) and they would be analogous to, but perhaps more biomimetic in appearance than the eyes rendered on a robot screen interface. A simple motion position routine ensures that the laser tip is reflecting on the object of interest and is being tracked by at least three eyes (cameras), and that the system 100 computes the locations of observed voxels in rapid scan succession.

In one exemplary process, an initial quick scan finds the contours and 3D positions of objects. Object contiguous surfaces, holes and edges (contours) are registered by initial quick scan patterns. Occlusion by other (foreground) objects that may block the full view of an object of interest may be discovered in this initial quick scan. For example, if the object of interest is presumed to be a car or pedestrian, a smart CV system will search for the object's expected contours and move the laser brush position and/or some of the cameras rapidly to see if it can eliminate the occlusion.

In a second process stage, deliberate camera or scanner source movements help overcome scan discontinuity due to occlusions. There may be distinct cases of occlusion: 1) a foreground object cast a shadow on the background object or surface or 2) a foreground object blocks part of the view of a background object for at least one of the cameras observing that background object. In case 1) the cameras—usually at least three—currently tracking the trajectory of voxels on the background object will abruptly and simultaneously cease to detect the voxels, and the trajectory in 3d space ends abruptly. It might shift to the new object but there will be an abrupt spatial discontinuity. In case 2) it is highly unlikely that all three (or more) cameras cease to report events simultaneously. With different perspectives the occlusion, if any, of each camera will commence at a different moment of the laser beam's scan trajectory.

Herein lies a major advantage of using a multi view pixel sequential motion tracking system 100. Firstly, an additional ($4^{th}$) camera can pick up when and where the occlusion occurs. Like a control room at a sports event, a smart motion capture system can be made robust to small occlusions (hands or arms of a dancer being captured in a 3D motion capture rig e.g.). Switching instantaneously to another $4^{th}$ camera that is on active standby tracks the same 3D trajectory (the latter is just a matter of checking that the 2D trajectory of the $4^{th}$ camera is consistent with a 2D re-projection of the spatial trajectory computed from the first three cameras up until that point and the observable (shown) and predictable kinetics of the scanners' beam.

Figure 20:
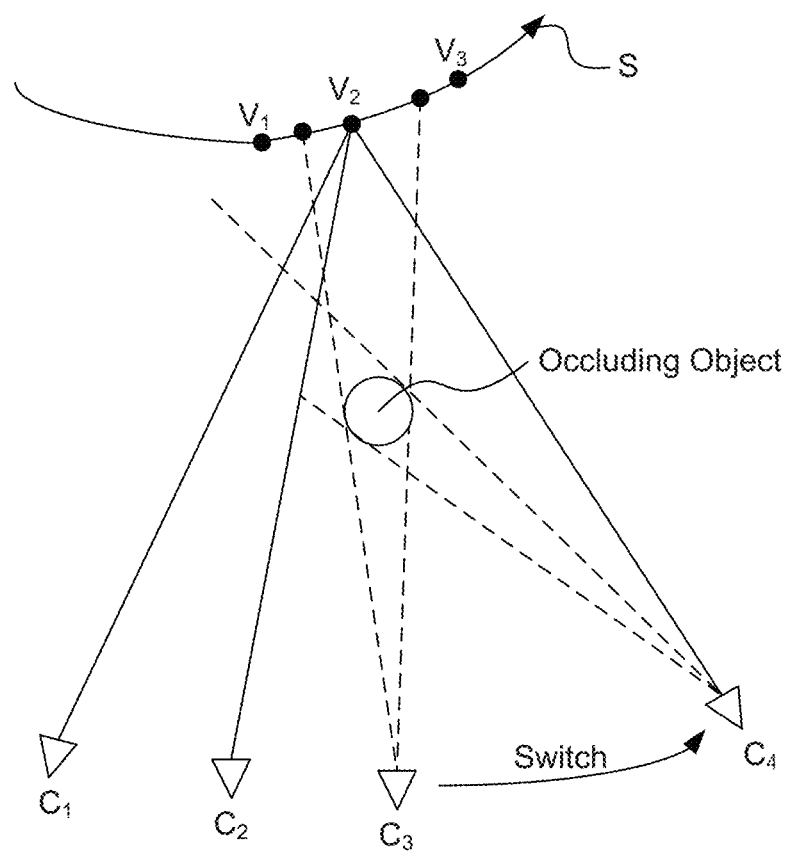
FIG. 20 illustrates an embodiment of an exemplary position determination system that allows swapping out cameras.

As illustrated in FIG. 20, as a scanning spot scans along a trajectory on the surface S, three voxel positions are shown: $V_1$, $V_2$ and $V_3$. Four cameras $C_1$ . . . $C_4$ of the system 100 are shown. The first three can observe laser illumination points such as $V_1$ progressing along the surface S. At some point camera $C_3$ will stop detecting the beam before it reaches $V_2$ and the system automatically switches to a fourth camera $C_4$.

In at least some embodiments, the theoretical minimum feature size is a single pixel because each feature (i.e. the current location where the laser forms an illuminated spot on the manifold) is observed one after another, not at the same time, not all in conjunction, as long as there is enough light illuminating a single pixel in each of three cameras.

The system 100 needs no spatial (pixel) contrast; no spatial patterns are needed neither during illumination nor for observation. The system 100 uses time in a way no other structured light system uses time, eliminating the need for both contrast and for coding and decoding.

The system 100 provides a most effective use of pixels, photons: In principle every pixel observation, every "twitch" counts. Using 1 Megapixel cameras the system can achieve a 1 Megapixel voxel spatial resolution.

Sub-pixel resolution is possible by linear interpolation. The system can exploit the physical, mathematical trajectory scanned by the tip of laser beam as it traverses 3D surfaces of objects ("spatial manifolds"). These trajectories, when projected onto the surfaces of each of the cameras form 2D pixel event trajectories. After observing a series of image points (i.e., a time series of the pixel locations) the system can by linear (or other) interpolation estimate the underlying true 2D scan trajectories, as well as the 3D manifold surface trajectory with an accuracy greater than the fundamental accuracy of each individual observation. Thus, contour lines observed can be fitted in 3D space with greater accuracy onto the 3D manifold.

In at least some embodiments, the system scans can smooth continuous arcs with a fine-tipped laser beam across a 3D manifold, causing trails of "twitched" pixels in each of (at least) three cameras with, in each camera, pixels sequentially asserting their successive locations. These three or more simultaneously observable highly correlated trails of twitching pixel trajectories (time sequential trails of pixel assertion events) clearly stand out statistically from background noise, such as caused by thermal or dark noise in the sensors or ambient light not already filtered out by spatial, temporal and or wavelength specific methods. Statistical methods such as RANSAC can be applied prior to doing a line fit as denoted in FIG. 23, to eliminate any "twitched" pixels that are a statistically significant distance away from the interpolated trajectory 2300, i.e. spatially more than two pixels away and/or temporally out of order or not fitting in the trajectory's temporal sequence.

In at least some embodiments, the system 100 can be efficient and robust by, for example, using sensitive high gain "twitchy" detectors (such as commercially available SPADs) and modest illumination power (such as milliwatt laser diode sources) while capable of overcoming large amounts of sensor and ambient noise.

In at least some embodiments, the system 100 makes efficient use of photons by using a scanning beam that illuminates one point, one voxel location at any one time, and the resulting pixel events are instantaneously time-sequentially observed. Using system feedback, it can be assured that the great majority of the photons emitted are directed at the manifold (or an object) and some result in an observable signal in at least one, preferably at least three of the cameras. Small laser diodes can be very efficient sources of photons and can be fairly easily and efficiently collimated into tight beam.

Dynamics and instant feedback enable ultra-efficient 3D perception. The beam can be adjusted on-the-fly, in intensity, as needed based on the required scan rate, desired accuracy, at a certain distance and adjusting for the albedo of the objects of interest. So, for example, a scene with a large and varying Depth of Field (e.g. typical in interactive AR) can be scanned dynamically and selectively (for example, scanning only certain foreground objects of interest in great detail.)

Foveation saves power. So unlike in typical frame illuminated structure light systems, in at least some embodiments of the system 100, nearly 100% the photons generated by a laser diode can be directed to continuously illuminate a small observable portion of the manifold, and this aspect significantly contributes to the power efficiency of the system 100.

Another embodiment is an AR perception system that can scan objects up to 1 meter away in a 100 degrees by 100 degrees Field of View. The system can utilize any suitable light source, such as a Blu-ray diode laser source ($\lambda \approx 405$ nm) with optical power of around 20 mWatt and a simple 2D 800 micron MEMS resonant mirror that can scan 50,000 lines per second. The system utilizes three or more cameras, such as, for example, three CMOS 1 Mpixel "twitchy pixel" array cameras each with 1000×1000 pixels. In one embodiments, the pixels are no more than 1 micrometer each (shallow 100 photons wells, very sensitive to 405 nm light) with good isolation and minimal cross over. In this example, the array area of the sensor might be no bigger than 1 square mm and providing inexpensive monochrome cameras with 5 t or 6 t binary response "twitchy" pixels, fixed address row and column decoders, no A/D, and simple serial stream outputs. The system can scan points dynamically with the three 1 Mpixel cameras resulting in spatial resolution of up to 0.1 degree where, by interpolation, a spatial accuracy of 0.01 degree (1/10 pixel at the sensor) can be achieved. The system should achieve a spatial accuracy of voxels placement <0.5 mm at 1M distances. For example, a small object of interest in the field (e.g., a hand holding an Apple) with an RoI of 10 degrees by 10 degrees can be scanned by the system at for example, 1,000,000 points per second with 3D foveating on this RoI (for example, a cone of 100 square degrees, $100^{\circ\circ}$, 1% of FoV of $10,000^{\circ\circ}$). With foveation the system would achieve approximately 500-micrometer volumetric accuracy up to 1 m distance while using less than 100 mW of total system resources.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A system to determine a position of one or more objects, comprising:
   one or more transmitters arranged to emit four or more beams of photons to scan a plurality of regions that include the one or more objects;
   three or more cameras arranged to detect one or more reflected beams of photons from each voxel, wherein each voxel represents a sampled surface element of a three-dimensional shaped surface of the plurality of regions; and one or more processor devices that execute instructions to enable performance actions, including:
  employing a position of each pixel in the three or more cameras to detect the beam of photons reflected by each voxel for one or more of the plurality of objects; and
  determining each three-dimensional position of the one or more objects using the position of each pixel in the three or more cameras.

2. The system of claim 1, further comprising:
employing each reflection of the four or more beams of photons to determine a position for each of the three or more cameras.

3. The system of claim 1, further comprising:
employing linear interpolation of each detected reflection of the beam of photons to improve spatial accuracy and temporal resolution of each pixel for the three or more cameras.

4. The system of claim 1, further comprising:
employing overlapping field of views (FOVs) of one or more portions of the reflected beams of photons to determine a volumetric shape of each object positioned within the overlapping FOVs.

5. The system of claim 1, further comprising:
a laser brush that is arranged for manually illuminating an object with a scanning laser beam that creates brush strokes of beams of photons on one or more surfaces of the object.

6. The system of claim 1, further comprising:
automatically selecting three focal perspectives for reflected beams of photons based on an amount of concurrency with each associated field of view.

7. The system of claim 1, further comprising:
employing one or more appendages on a head of user to provide spacing of a position for each of the three or more cameras away from each of the other cameras.

8. The system of claim 1, further comprising:
integrating the actions of claim 1 as a subsystem for one or more of an augmented reality system or a virtual reality system.

9. A method to determine a position of one or more objects, comprising:
  employing one or more transmitters arranged to emit four or more beams of photons to scan a plurality of regions that include the one or more objects;
  employing three or more cameras arranged to detect one or more reflected beams of photons from each voxel, wherein each voxel represents a sampled surface element of a three-dimensional shaped surface of the plurality of regions; and
  employing one or more processor devices to execute instructions that enable performance actions, including:
    employing a position of each pixel in the three or more cameras to detect the beam of photons reflected by each voxel for one or more of the plurality of objects; and
    determining each three-dimensional position of the one or more objects using the position of each pixel in the three or more cameras.

10. The method of claim 9, further comprising:
employing each reflection of the four or more beams of photons to determine a position for each of the three or more cameras.

11. The method of claim 9, further comprising:
employing linear interpolation of each detected reflection of the beam of photons to improve spatial accuracy and temporal resolution of each pixel for the three or more cameras.

12. The method of claim 9, further comprising:
employing overlapping field of views (FOVs) of one or more portions of the reflected beams of photons to determine a volumetric shape of each object positioned within the overlapping FOVs.

13. The method of claim 9, further comprising:
a laser brush that is arranged for manually illuminating an object with a scanning laser beam that creates brush strokes of beams of photons on one or more surfaces of the object.

14. The method of claim 9, further comprising:
automatically selecting three focal perspectives for reflected beams of photons based on an amount of concurrency with each associated field of view.

15. The method of claim 9, further comprising:
employing one or more appendages on a head of user to provide spacing of a position for each of the three or more cameras away from each of the other cameras.

16. The method of claim 9, further comprising:
integrating the actions of claim 1 as a subsystem for one or more of an augmented reality system or a virtual reality system.

17. A computer readable non-transitory storage media that includes instructions for determining a position of one or more objects, wherein execution of the instructions by one or more processors enables actions, comprising:
  employing one or more transmitters arranged to emit four or more beams of photons to scan a plurality of regions that include the one or more objects;
  employing three or more cameras arranged to detect one or more reflected beams of photons from each voxel, wherein each voxel represents a sampled surface element of a three-dimensional shaped surface of the plurality of regions; and
  employing one or more processor devices to execute instructions that enable performance actions, including:
    employing a position of each pixel in the three or more cameras to detect the beam of photons reflected by each voxel for one or more of the plurality of objects; and
    determining each three-dimensional position of the one or more objects using the position of each pixel in the three or more cameras.

18. The computer readable non-transitory storage media of claim 17, further comprising:
employing each reflection of the four or more beams of photons to determine a position for each of the three or more cameras.

19. The computer readable non-transitory storage medium method of claim 17, further comprising:
employing linear interpolation of each detected reflection of the beam of photons to improve spatial accuracy and temporal resolution of each pixel for the three or more cameras.

20. The computer readable non-transitory storage medium of claim 17, further comprising:
employing overlapping field of views (FOVs) of one or more portions of the reflected beams of photons to determine a volumetric shape of each object positioned within the overlapping FOVs.

* * * * *